(12) United States Patent
Kim et al.

(10) Patent No.: US 12,725,538 B2
(45) Date of Patent: Sep. 1, 2026

(54) DISPLAY DEVICE INCLUDING FLAT REGION AND DEFORMED REGION

(71) Applicant: Samsung Electronics Co., Ltd., Suwon-si (KR)

(72) Inventors: Jonghae Kim, Suwon-si (KR); Sunggwan Woo, Suwon-si (KR); Sungho Ahn, Suwon-si (KR); Jihyung Jung, Suwon-si (KR); Seongdae Choi, Suwon-si (KR); Kwangtai Kim, Suwon-si (KR); Donghyun Yeom, Suwon-si (KR); Soyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 18/813,510

(22) Filed: Aug. 23, 2024

(65) Prior Publication Data

US 2024/0412666 A1 Dec. 12, 2024

Related U.S. Application Data

(63) Continuation of application No. PCT/KR2023/002876, filed on Mar. 2, 2023.

(30) Foreign Application Priority Data

Mar. 16, 2022 (KR) ........................ 10-2022-0033035
Mar. 25, 2022 (KR) ........................ 10-2022-0037655
Jun. 24, 2022 (KR) ........................ 10-2022-0077877

(51) Int. Cl.
*G09F 9/30* (2006.01)
*G06F 1/16* (2006.01)
*H04M 1/02* (2006.01)

(52) U.S. Cl.
CPC ............ *G09F 9/301* (2013.01); *G06F 1/1652* (2013.01); *H04M 1/0268* (2013.01)

(58) Field of Classification Search
CPC ..... G09F 9/301; G06F 1/1652; H04M 1/0268
See application file for complete search history.

(56) References Cited

U.S. PATENT DOCUMENTS 8,917,516 B2 12/2014 Kim
9,647,052 B2 5/2017 Youn et al.
(Continued)

FOREIGN PATENT DOCUMENTS

DE 202021102972 U1 8/2021
KR 10-2018-0041775 A 4/2018
(Continued)

OTHER PUBLICATIONS

International Search Report dated May 2, 2023, issued in International Application No. PCT/KR2023/002876.
Extended European Search Report dated Apr. 11, 2024, issued in European Patent Application No. 23712460.7.
(Continued)

*Primary Examiner* — Joseph L Williams
(74) *Attorney, Agent, or Firm* — Jefferson IP Law, LLP

(57) ABSTRACT

A flexible display device comprises: a display panel including a flat region, a deformed region, and a boundary region between the flat region and the deformed region; a support member including a first support plate facing the flat region and the boundary region and a second support plate facing the boundary region and the deformed region; and at least one protective layer disposed between the support member and the display panel and including a gap in a region corresponding to the boundary region, wherein the second support plate may overlap with a portion of the first support plate, the gap, and a coupling portion when the display panel is viewed from above.

20 Claims, 33 Drawing Sheets

(56) References Cited

U.S. PATENT DOCUMENTS

| | | | | |
|---|---|---|---|---|
| 9,768,415 | B2 | 9/2017 | Son et al. | |
| 10,617,017 | B2 | 4/2020 | Park et al. | |
| 11,528,819 | B2 | 12/2022 | Lee | |
| 11,569,473 | B2 | 1/2023 | Soh et al. | |
| 11,665,955 | B2 | 5/2023 | Park et al. | |
| 11,763,701 | B2 | 9/2023 | Song et al. | |
| 2016/0087024 | A1 | 3/2016 | Son et al. | |
| 2020/0004295 | A1 | 1/2020 | Paek et al. | |
| 2021/0191460 | A1* | 6/2021 | Lee | G06F 1/1641 |
| 2021/0216106 | A1 | 7/2021 | Soh et al. | |
| 2021/0223879 | A1 | 7/2021 | Xu et al. | |
| 2021/0255666 | A1 | 8/2021 | Kim et al. | |
| 2022/0147105 | A1* | 5/2022 | Kang | G06F 1/1637 |
| 2022/0164002 | A1 | 5/2022 | An et al. | |
| 2022/0182477 | A1* | 6/2022 | Kim | G06F 1/1652 |
| 2023/0099802 | A1 | 3/2023 | An et al. | |
| 2024/0098917 | A1 | 3/2024 | Lee et al. | |

FOREIGN PATENT DOCUMENTS

| | | | |
|---|---|---|---|
| KR | 10-1935553 | B1 | 1/2019 |
| KR | 10-2020-0002576 | A | 1/2020 |
| KR | 10-2097150 | B1 | 4/2020 |
| KR | 10-2020-0101224 | A | 8/2020 |
| KR | 10-2021-0059329 | A | 5/2021 |
| KR | 10-2021-0089810 | A | 7/2021 |
| KR | 10-2021-0091848 | A | 7/2021 |
| KR | 10-2022-0009544 | A | 1/2022 |
| KR | 10-2022-0032831 | A | 3/2022 |
| KR | 10-2569856 | B1 | 8/2023 |

OTHER PUBLICATIONS

European Office Action dated Feb. 6, 2026, issued in European Patent Application No. 23712460.7.

Indian Office Action dated Apr. 17, 2026, issued in Indian Application No. 202447068213.

* cited by examiner

DISPLAY DEVICE INCLUDING FLAT REGION AND DEFORMED REGION

CROSS-REFERENCE TO RELATED APPLICATION(S)

This application is a continuation application, claiming priority under § 365(c), of an International application No. PCT/KR2023/002876, filed on Mar. 2, 2023, which is based on and claims the benefit of a Korean patent application number 10-2022-0033035, filed on Mar. 16, 2022, in the Korean Intellectual Property Office, of a Korean patent application number 10-2022-0037655, filed on Mar. 25, 2022, in the Korean Intellectual Property Office, and of a Korean patent application number 10-2022-0077877, filed on Jun. 24, 2022, in the Korean Intellectual Property Office, the disclosure of each of which is incorporated by reference herein in its entirety.

TECHNICAL FIELD

The following descriptions relate to a display device including a planar region and a deformable region.

BACKGROUND ART

In order to achieve portability and usability of an electronic device, a flexible display that may provide a large screen display when necessary is being developed. The flexible display may be foldably, rollably or slidably disposed within the electronic device.

DISCLOSURE

Technical Problem

An electronic device including a slidable display may include a planar region that is always exposed to the outside and a deformable region that is exposed to the outside according to a change in state. A structure for preventing a boundary region between the planar region and the deformable region from being visually recognized to the outside may be required.

The technical problems to be achieved in this document are not limited to those described above, and other technical problems not mentioned herein will be clearly understood by those having ordinary knowledge in the art to which the present disclosure belongs, from the following description.

Technical Solution

According to an embodiment, a flexible display device may include a display panel including a planar region, a deformable region and a boundary region between the planar region and the deformable region. The flexible display device may further include a supporter including a first support plate facing the planar region and a part of the boundary region and a second support plate facing at least part of the boundary region and the deformable region and a fastening part connecting a part of the first support plate and a part of the second support plate. The flexible display device may further include at least one protection layer between the supporter and the display panel including a gap under the boundary region. According to an embodiment, the at least one protection layer may include a first protection layer. The at least one protection layer may further include a second protection layer supporting the planar region and the part of the boundary region under the first protection layer. The at least one protection layer may further include a third protection layer supporting the deformable region and another part of the boundary region. According to an embodiment, the second support covers the gap g by including an extension region attached to the fastening part for the connection between the part of the first support plate and the second support plate, and a support region, extending from a part of the extension region that is located under the gap.

According to an embodiment, an electronic device may include a first housing, a second housing coupled to the first housing to be slidable in a first direction with respect to the first housing or in a second direction opposite to the first direction. The electronic device may include a display coupled to the second housing, the display expanding as the second housing moves in the first direction, or contracting as the second housing moves in the second direction. The display may include a display panel including a planar region, a deformable region and a boundary region between the planar region and the deformable region. The display may further include a supporter including a first support plate facing the planar region and a part of the boundary region and a second support plate facing at least part of the boundary region and the deformable region and a fastening part connecting a part of the first support plate and a part of the second support plate. According to an embodiment, the display may further include at least one protection layer between the supporter and the display panel and including a gap under the boundary region. According to an embodiment, the second plate may include an extension region extending from the deformable region to the boundary region. According to an embodiment, when the display panel is viewed from above, the extension region overlaps with a part of the first support plate, the gap and the fastening part.

According to an embodiment, a flexible display device may include a display panel including a planar region, a deformable region and a boundary region disposed between the planar region and the deformable region. The flexible display device may further include a window disposed on a surface of the display panel. The flexible display device may further include a supporter including a first support plate facing another surface of the display panel under the planar region and a second support plate facing the other surface of the display panel in the boundary region and the deformable region and including an opening parallel to a boundary between the planar region and the deformable region. The flexible display device may further include at least one protection layer disposed between the second support plate and the display panel and including a color. According to an embodiment, the protection layer may protrude from a surface of the protection layer into a space between the first support plate and the second support plate.

Advantageous Effects

According to an embodiment, the electronic device can separate the protection layer and/or the supporter under the flexible display panel. The electronic device can be configured to reduce external visibility of the boundary region by providing a structure that minimizes a step occurring in the separated boundary region.

The effects that can be obtained from the present disclosure are not limited to those described above, and any other effects not mentioned herein will be clearly understood by those having ordinary knowledge in the art to which the present disclosure belongs, from the following description. In addition, the combination of features as shown and explained in connection with the drawings should not be understood as limiting the invention as such (in particular not to those features which are not part of the independent claims) but should nevertheless be understood to be disclosed as specific combinations of features as shown in those drawings.

MODE FOR INVENTION

Figure 1:
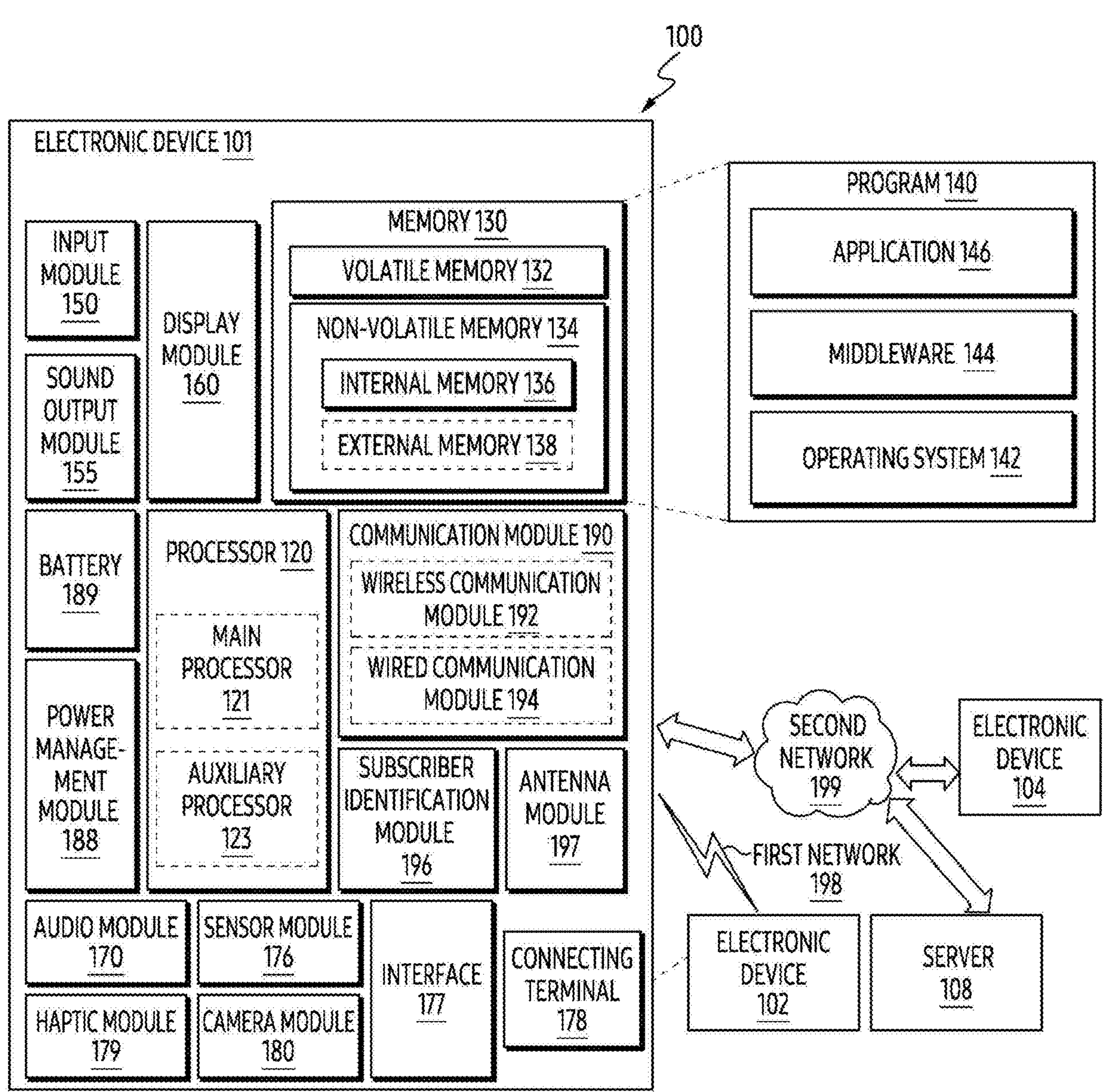
FIG. 1 is a block diagram of an electronic device in a network environment according to various embodiments.

FIG. 1 is a block diagram illustrating an electronic device 101 in a network environment 100 according to various embodiments. Referring to the embodiment of FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor

123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., by wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
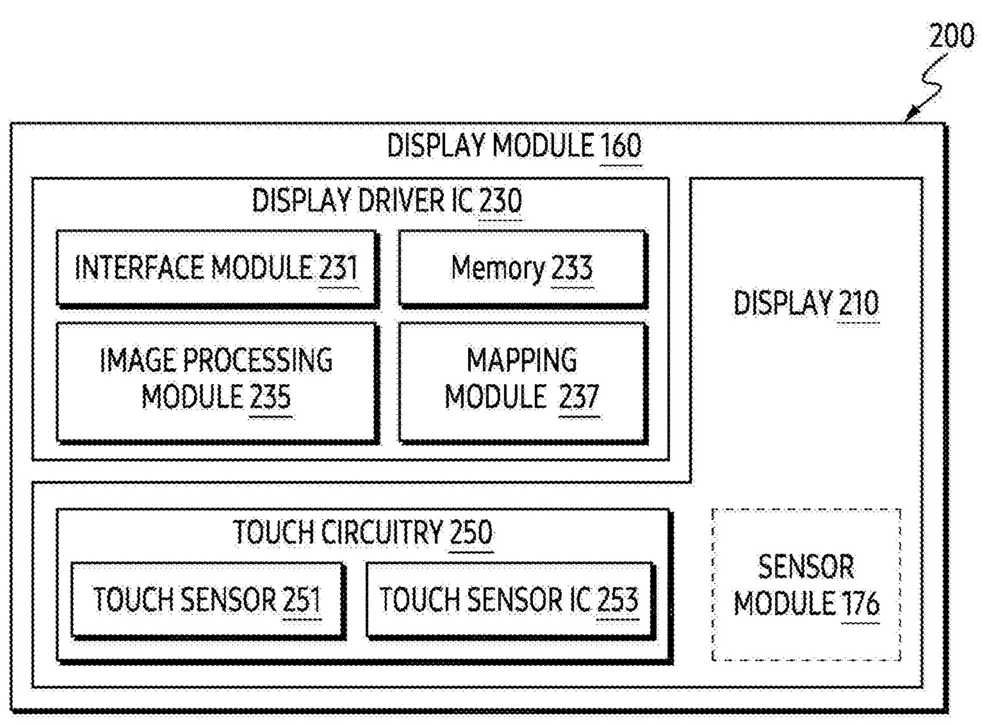
FIG. 2 is a block diagram of a display module according to various embodiments.

FIG. 2 is a block diagram 200 illustrating the display module 160 according to various embodiments.

Referring to the embodiment of FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
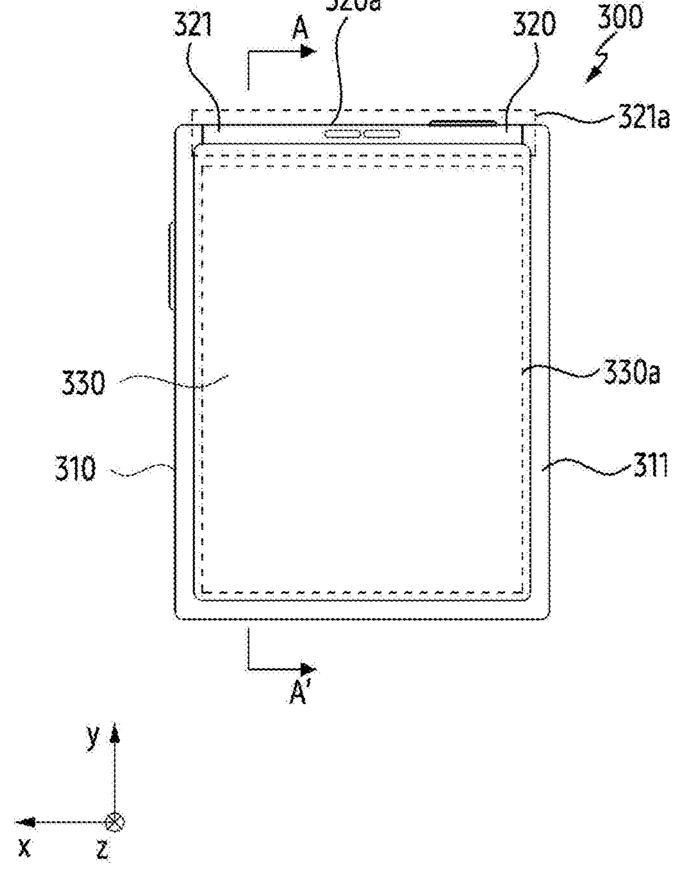
FIG. 3A is a front view of a first state of an electronic device according to an embodiment.
Figure 3B:
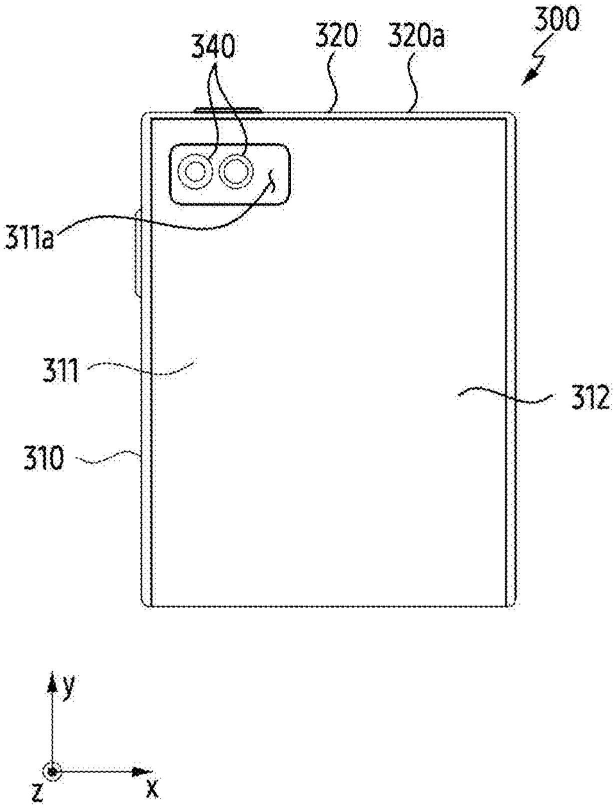
FIG. 3B is a rear view of a first state of an electronic device according to an embodiment.
Figure 3C:
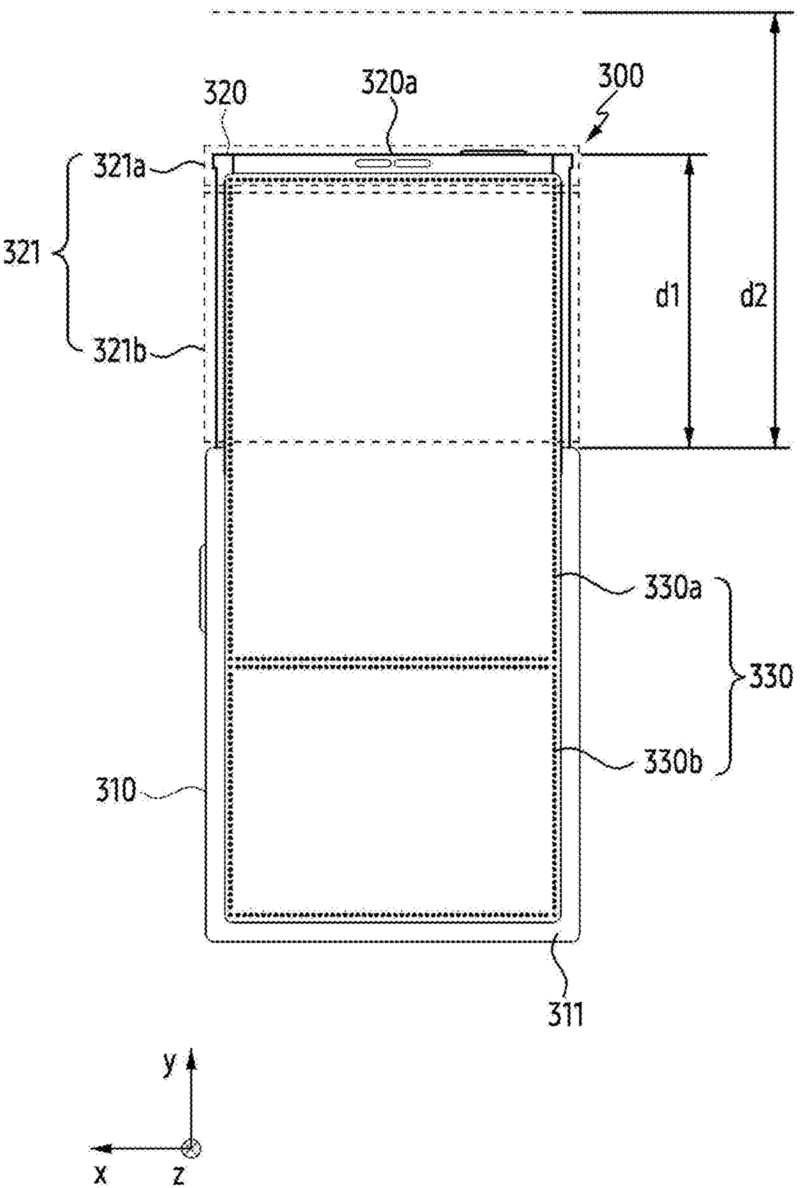
FIG. 3C is a front view of a second state of an electronic device according to an embodiment.
Figure 3D:
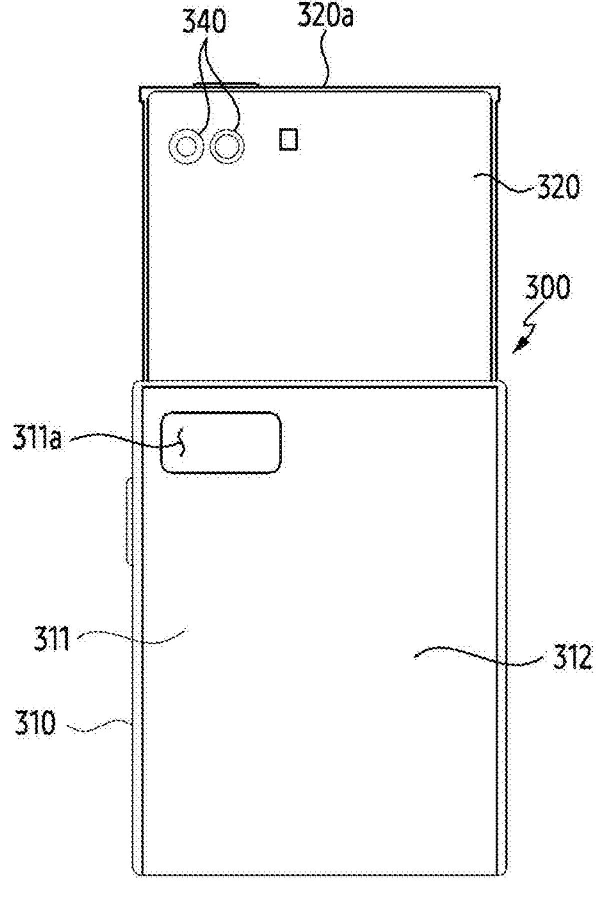
FIG. 3D is a rear view of the second state of the electronic device according to an embodiment.

FIG. 3A is a front view of a first state of an electronic device according to an embodiment, FIG. 3B is a rear view of a first state of an electronic device according to an embodiment, FIG. 3C is a front view of a second state of an electronic device according to an embodiment, and FIG. 3D is a rear view of the second state of the electronic device according to an embodiment.

Referring to the embodiments of FIGS. 3A, 3B, 3C, and 3D, an electronic device 300 (e.g., the electronic device 101 in FIG. 1) according to an embodiment includes a first housing 310, a second housing 320, a display 330 (e.g., the display module 160 in FIG. 1), and a camera 340 (e.g., the camera module 180 in FIG. 1). According to an embodiment, the second housing 320 is slidable with respect to the first housing 310. For example, the second housing 320 may move within a specified distance along a first direction (e.g., the +y direction) with respect to the first housing 310. When the second housing 320 moves in the first direction, a distance between a side surface 320*a* of the second housing 320 facing the first direction and the first housing 310 may increase. For another example, the second housing 320 may move in a range within a specified distance along a second direction (e.g., the −y direction) opposite to the first direction with respect to the first housing 310. When the second housing 320 moves in the second direction, the distance between the side surface 320*a* of the second housing 320 facing the first direction and the first housing 310 may be reduced. According to an embodiment, the second housing 320 may linearly reciprocate with respect to the first housing 310 by sliding relative to the first housing 310. For example, at least a part of the second housing 320 may be slid-in into the first housing 310 or slid-out from the first housing 310.

According to an embodiment, the electronic device 300 may be referred to as a "slidable electronic device" as the second housing 320 is designed to be slidable with respect to the first housing 310. According to an embodiment, the electronic device 300 may be referred to as a "rollable electronic device" as at least a part of the display 330 is designed to be wound inside the second housing 320 (or the first housing 310) based on the slide movement of the second housing 320.

According to an embodiment, the first state of the electronic device 300 may be defined as a state (e.g., a contracted state or a slide-in state) in which the second housing 320 moved in the second direction (e.g., −y direction). For example, in the first state of the electronic device 300, the second housing 320 may be movable in the first direction but may not be movable in the second direction. In the first state of the electronic device 300, a distance between the side surface 320*a* of the second housing 320 and the first housing 310 increases as the second housing 320 moves, but may not decrease. For another example, in the first state of the electronic device 300, a part of the second housing 320 may be slid-out from the first housing 310, but may not be slid-in into the first housing 310. According to an embodiment, the first state of the electronic device 300 may be defined as a state in which the second region 330*b* of the display 330, i.e. a boundary region, is not visually exposed from the outside of the electronic device 300. For example, in the first state of the electronic device 300, since the second region 330*b* of the display 330 is located inside an inner space (not illustrated) of the electronic device 300 formed by the first housing 310 and/or the second housing 320, the second region 330*b* of the display 330 may not be visible from the outside of the electronic device 300.

According to an embodiment, the second state of the electronic device 300 may be defined as a state (e.g., an extended state or a slide-out state) in which the second housing 320 moves in the first direction (e.g., +y direction). For example, in the second state of the electronic device 300, the second housing 320 may be movable in the second direction but may not be movable in the first direction. In the second state of the electronic device 300, a distance between the side surface 320*a* of the second housing 320 and the first housing 310 may decrease as the second housing 320 moves, but may not increase. For another example, in the second state of the electronic device 300, a part of the second housing 320 may be slid-in into the first housing 310, but may not be slid-out from the first housing 310. According to an embodiment, the second state of the electronic device 300 may be defined as a state in which the second region 330*b* of the display 330 is visually exposed from the outside of the electronic device 300. For example, in the second state of the electronic device 300, since the second region 330*b* of the display 330 slides out from the inner space of the electronic device 300, the second region 330*b* of the display 330 may be visible from the outside of the electronic device 300.

According to an embodiment, when the second housing 320 moves from the first housing 310 in the first direction, at least a part of the second housing 320 and/or the second region 330*b* of the display 330 may be slid-out from the first housing 310 by a slide-out length d1 corresponding to the moving distance of the second housing 320. According to an embodiment, the second housing 320 may reciprocate within a length d2 that is a specified distance. According to an embodiment, the slide-out length d1 may have a size of approximately 0 to a length d2.

According to an embodiment, the state of the electronic device 300 may be convertible between the second state and/or the first state by manual operation by the user or automatic operation by a drive module (not illustrated) located inside the first housing 310 or the second housing 320. According to an embodiment, the driving module may trigger an operation based on a user input. According to an embodiment, the user input for triggering the operation of the driving module may include a touch input, a force touch input, and/or a gesture input through the display 330. According to another embodiment, the user input for triggering the operation of the driving module may include a sound input (voice input) or an input of a physical button exposed to the outside of the first housing 310 or the second housing 320. According to an embodiment, the driving module may be driven in a semi-automatic manner, in which an operation is triggered when a manual operation due to an external force of the user is detected.

According to an embodiment, the first state of the electronic device 300 may be referred to as a first shape, and the second state of the electronic device 300 may be referred to as a second shape. For example, the first shape may include a normal state, a reduced state, or a closed state, and the second shape may include an open state. According to an embodiment, the electronic device 300 may form a third state (e.g., an intermediate state) that is a state between the first state and the second state. For example, the third state may be referred to as a third shape, and the third shape may include a free stop state.

According to an embodiment, the display 330 may be visible (or viewable) from the outside through the front direction (e.g., the −z direction) of the electronic device 300 so that visual information may be displayed to the user. For example, display 330 may include a flexible display. According to an embodiment, the display 330 may be disposed in the second housing 320 and may be slid-out of the inner space (not illustrated) of the electronic device 300 or slide-in into the inner space of the electronic device 300 according to the movement of the second housing 320. The inner space of the electronic device 300 may mean a space within the first housing 310 and the second housing 320 formed by the combination of the first housing 310 and the second housing 320. For example, in the first state of the electronic device 300, at least a part of the display 330 may be slid-in by being rolled into the inner space of the electronic device 300. When the second housing 320 moves in the first direction while at least a part of the display 330 is slid-in into the inner space of the electronic device 300, at least a part of the display 330 may be slid-out from the inner space of the electronic device 300. For another example, when the second housing 320 moves in the second direction, at least a part of the display 330 may be slid-in into the inner space of the electronic device 300 by being rolled into the inside of the electronic device 300. As at least a part of the display 330 slides-out or slides-in, the region of the display 330 visible from the outside of the electronic device 300 may be expanded or reduced. According to an embodiment, the display 330 may include a first region 330*a* and a second region 330*b*.

According to an embodiment, the first region 330*a* of the display 330 may mean a region of the display 330 that may be fixedly visible from outside of the electronic device 300 regardless of whether the electronic device 300 is in a second state or a first state. For example, the first region 330*a* may mean a partial region of the display 330 that is not rolled into the inner space of the electronic device 300. According to an embodiment, when the second housing 320 moves, the first region 330*a* may move together with the second housing 320. For example, when the second housing 320 moves in the first direction or the second direction, the first region 330*a* may move in the first direction or the second direction on the front surface of the electronic device 300 together with the second housing 320.

According to an embodiment, the second region 330*b* of the display 330 may be connected to the first region 330*a*, and may be slid-in into the inner space of the electronic device 300 or slid-out from the inner space of the electronic device 300 according to the movement of the second housing 320. For example, the second region 330*b* of the display 330 may be rolled into the inner space of the electronic device 300 in the first state of the electronic device 300. In the first state of the electronic device 300, the second region 330*b* of the display 330 may be slid into the inner space of the electronic device 300 and thus may not be visible from the outside. For another example, in the second state of the electronic device 300, the second region 330*b* of the display 330 may be in a state of sliding-out from the inner space of the electronic device 300. The second region 330*b* of the display 330 may be visible from the outside of the electronic device 300 in the second state.

According to an embodiment, in the first state of the electronic device 300, an area of the display 330 visible from the outside of the electronic device 300 may include only the first region 330*a* of the display 330. The area of the display 330 visible from the outside of the electronic device 300 in the second state of the electronic device 300 may include at least a part of the first region 330*a* and the second region 330*b* of the display 330.

According to an embodiment, the first housing 310 of the electronic device 300 may include a book cover 311 surrounding the inner space of the first housing 310 and a rear plate 312 surrounding the rear surface of the book cover 311. The second housing 320 of the electronic device 300 may include a front cover 321 surrounding the inner space of the electronic device 300.

According to an embodiment, the front cover 321 may include a first cover region 321*a* of the front cover 321 that is not inserted into the first housing 310 and a second cover region 321*b* that is inserted into the inside of the first housing 310 or slid out from the inside of the first housing 310. The first cover region 321*a* of the front cover 321 may always be visible regardless of whether the electronic device 300 is in the second state or the first state. According to an embodiment, at least a part of the first cover region 321*a* of the front cover 321 may form a side surface 320*a* of the second housing 320. According to an embodiment, the second cover region 321*b* of the second housing 320 may not be visible in the first state but may be visible in the second state.

The camera 340 may obtain an image of a subject based on receiving light from the outside of electronic device 300. According to an embodiment, the camera 340 may include one or a plurality of lens, an image sensor, and/or an image signal processor. According to an embodiment, the camera 340 may be disposed in the second housing 320 to face the rear surface of the electronic device 300 opposite to the front surface of the electronic device 300 in which the first region 330*a* of the display 330 is disposed. For example, the camera 340 may be disposed on the front cover 321 of the second housing 320, and be visible from the outside of the electronic device 300 through the opening 311*a* formed in the book cover 311, when the electronic device 300 is in the first state. For another example, the camera 340 may be disposed on the front cover 321 of the second housing 320, and covered by the book cover 311 and/or the rear plate 312 when the electronic device 300 is in the first state, so that it may not be visible outside the electronic device 300.

According to an embodiment, the camera 340 may include a plurality of cameras. For example, the camera 340 may include a wide-angle camera, an ultra-wide-angle camera, a telephoto camera, a proximity camera, and/or a depth camera. However, the camera 340 is not necessarily limited to including a plurality of cameras, and may include one camera.

According to an embodiment, the camera 340 may further include a camera (not illustrated) facing the front surface of the electronic device 300 on which the first region 330*a* of the display 330 is disposed. When the camera 340 faces the front surface of the electronic device 300, the camera 340 may be an under display camera (UDC) disposed under the display 330 (e.g., in the +z direction from the display 330), but is not limited thereto.

According to an embodiment, the electronic device 300 may include a sensor module (not illustrated) and/or a camera module (not illustrated) disposed under the display 330. The sensor module may detect an external environment based on information (e.g., light) received by passing through the display 330. According to an embodiment, the sensor module may include at least one of a receiver, a proximity sensor, an ultrasonic sensor, a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, a motor encoder, or an indicator. According to an embodiment, at least a part of the sensor module of the electronic device 300 may be visually exposed to the outside through a partial region of the display 330. According to an embodiment, the electronic device 300 may detect a slide-out length (e.g., a length d1) by using the sensor module. According to an embodiment, the electronic device 300 may generate slide-out information on a slide-out degree detected by the sensor. For example, the electronic device 300 may detect and/or identify the degree of slide-out of the second housing 320 by using slide-out information. According to an embodiment, the slide-out information may include information on a slide-out length of the second housing 320.

According to an embodiment, the coupling shape of the first housing 310 and the second housing 320 is not limited to the shape and coupling shown in FIGS. 3A, 3B, 3C, and 3D, and may be implemented by a combination and/or coupling of other shapes or components.

Figure 4A:
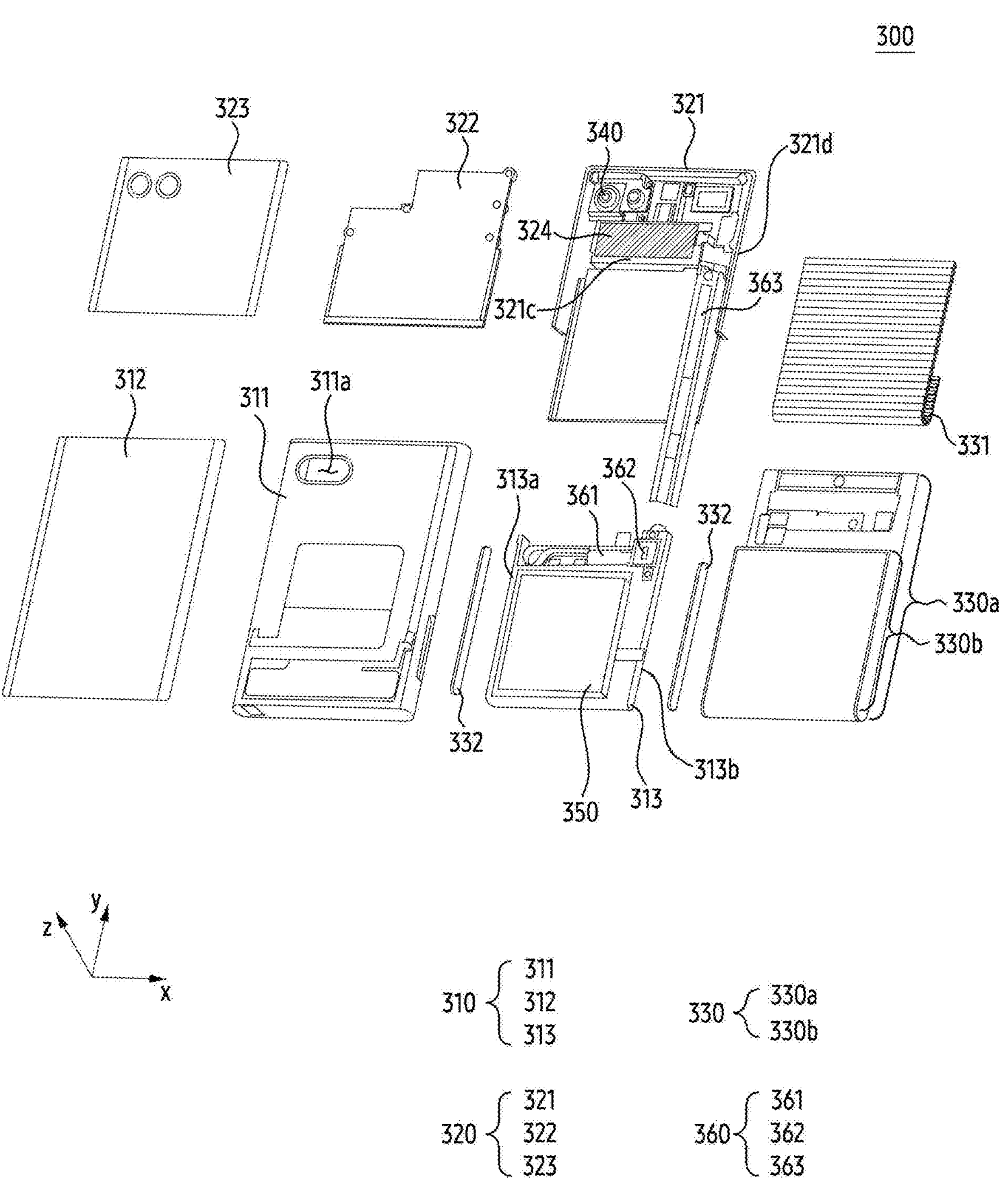
FIG. 4A is an exploded perspective view of an electronic device according to an embodiment.
Figure 4B:
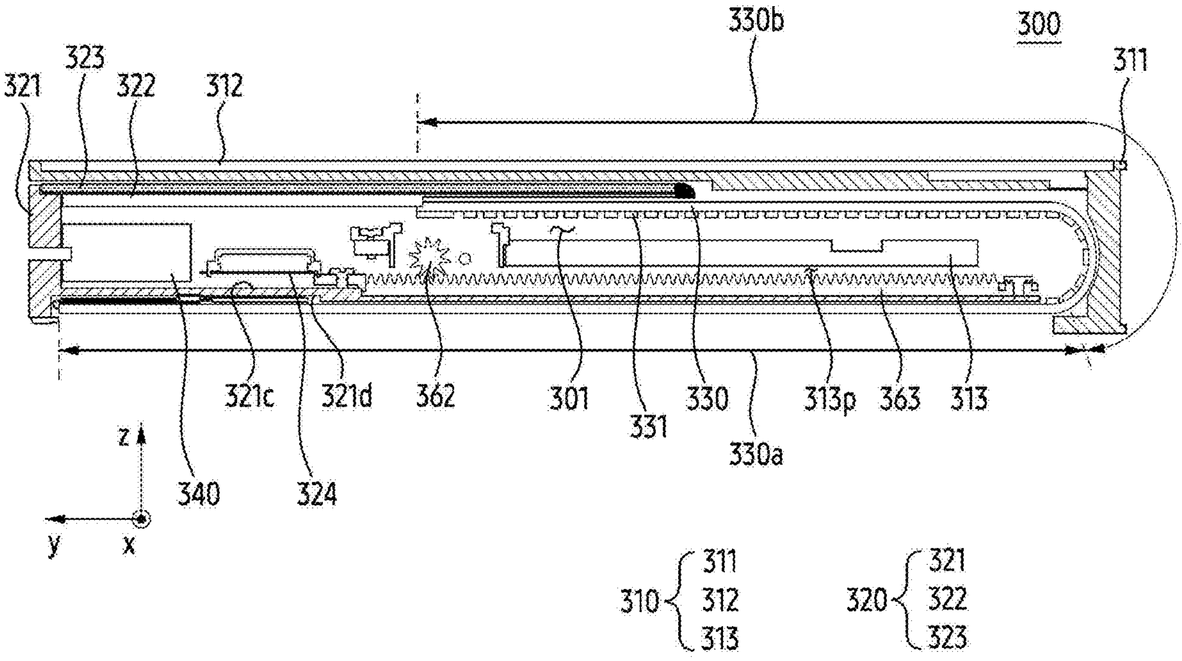
FIG. 4B is a cross-sectional view illustrating an example in which an electronic device according to an embodiment is cut along A-A' of FIG. 3A.

FIG. 4A is an exploded perspective view of an electronic device according to an embodiment, and FIG. 4B is a cross-sectional view illustrating an example in which an electronic device according to an embodiment is cut along A-A' of FIG. 3A.

Referring to the embodiments of FIGS. 4A and 4B, according to an embodiment, an electronic device 300 may include a first housing 310, a second housing 320, a display 330, a camera 340, a battery 350 (e.g., a battery 189 in FIG. 1), and a driving unit 360. According to an embodiment, the first housing 310 and the second housing 320 may be combined with each other to form an inner space 301 of the electronic device 300. For example, in the first state of the electronic device 300, the second region 330*b* of the display 330 may be accommodated in the inner space 301.

According to an embodiment, the first housing 310 may include a book cover 311, a rear plate 312, and a frame cover 313. According to an embodiment, the book cover 311, the rear plate 312, and the frame cover 313 included in the first housing 310 may be coupled to each other, and thus may not move when the second housing 320 moves with respect to the first housing 310. According to an embodiment, the book cover 311 may form at least a part of an outer surface of the electronic device 300. For example, the book cover 311 may form at least a part of the side surface of the electronic device 300 and at least a part of the rear surface of the electronic device 300. According to an embodiment, the book cover 311 may provide a surface on which the rear plate 312 is seated. The rear plate 312 may be seated on one surface of the book cover 311.

According to an embodiment, the frame cover 313 may support internal components of the electronic device 300. For example, the frame cover 313 may accommodate at least a part of the battery 350 and the driving unit 360. The battery 350 and the driving unit 360 may be accommodated in at least one of recesses or holes included in the frame cover 313. According to an embodiment, the frame cover 313 may be surrounded by the book cover 311. For example, in the first state of the electronic device 300, one surface 313*a* of the frame cover 313 on which the battery 350 is disposed may face at least a part of the book cover 311 and/or the second region 330*b* of the display 330. For another example, in the first state of the electronic device 300, another surface 313*b* of the frame cover 313 facing the one surface 313*a* of the frame cover 313 may face the first region 330*a* of the display 330 or the front cover 321. For example, the frame cover 313 may include aluminum as a material, but is not limited thereto.

According to an embodiment, the second housing 320 may include a front cover 321, a rear cover 322, and a slide cover 323. According to an embodiment, when the second housing 320 relatively moves with respect to the first housing 310, the front cover 321, the rear cover 322, and the slide cover 323 may be coupled to each other and may move together with the second housing 320. The front cover 321 may support internal components of the electronic device 300. For example, a printed circuit board 324 on which electronic components (e.g., the processor 120 in FIG. 1) of the electronic device 300 and/or the camera 340 are disposed may be disposed on one surface 321*c* of the front cover 321 facing the inner space 301. The other surface 321*d* of the front cover 321 facing the one surface 321*c* of the front cover 321 may face the first region 330*a* of the display 330 when the electronic device 300 is in the first state. According to an embodiment, the rear cover 322 may be coupled to the front cover 321 to protect components of the electronic device 300 disposed on the front cover 321. For example, the rear cover 322 may cover a part of the one surface 321*c* of the front cover 321. According to an embodiment, the slide cover 323 may be disposed on the rear cover 322 (e.g., in the +z direction) to form an outer surface of the electronic device 300 together with the rear plate 312 and the book cover 311. The slide cover 323 may be coupled to one surface of the rear cover 322 to protect the rear cover 322 and/or the front cover 321.

According to an embodiment, when the electronic device 300 is in the first state, at least a part of the display 330 may be rolled into the inner space 301, and thus may be bent. According to an embodiment, the display 330 may cover at least a part of the frame cover 313 and at least a part of the front cover 321. For example, when the electronic device 300 is in the first state, the display 330 may cover the other surface 321*d* of the front cover 321, pass between the front cover 321 and the book cover 311, and extend toward the inner space 301. The display 330 may surround the frame cover 313 after passing between the front cover 321 and the book cover 311. The display 330 may cover the one surface 313*a* of the frame cover 313 in the inner space 301. According to an embodiment, when the second housing 320 moves in the first direction, the second region 330*b* of the display 330 may be slid out from the inner space 301. For example, as the second housing 320 moves in the second direction, the display 330 may pass between the front cover 321 and the book cover 311 and slide-out from the inner space 301.

According to an embodiment, the electronic device 300 may include a support bar 331 for supporting the display 330 and a guide rail 332. For example, the support bar 331 may include a plurality of bars coupled to each other and may be manufactured in a shape corresponding to the shape of the second region 330*b* of the display 330. According to an embodiment, as the display 330 moves, the support bar 331 may move together with the display 330. According to an embodiment, in the first state in which the second region 330*b* of the display 330 is wound in the inner space 301, the support bar 331 may be wound in the inner space 301 together with the second region 330*b* of the display 330. As the second housing 320 moves in the first direction, the support bar 331 may move together with the second region 330*b* of the display 330. According to an embodiment, the guide rail 332 may guide the movement of the support bar 331. For example, as the display 330 moves, the support bar 331 may move along the guide rail 332 coupled to the frame cover 313. According to an embodiment, the guide rail 332 may be coupled to the frame cover 313. For example, the guide rail 332 may include a plurality of guide rails 332 that are disposed at both peripheries of the frame cover 313 that are spaced apart from each other in a third direction (e.g., +x direction) substantially perpendicular to the first direction (e.g., +y direction).

According to an embodiment, the driving unit 360 may provide a driving force to the second housing 320 so that the second housing 320 may relatively move with respect to the first housing 310. According to an embodiment, the driving unit 360 may include a motor 361, a pinion gear 362, and a rack gear 363. The motor 361 may receive power from the battery 350 to provide a driving force to the second housing 320. According to an embodiment, since the motor 361 is disposed in the first housing 310, it may not move when the second housing 320 moves with respect to the first housing 310. For example, the motor 361 may be disposed in a recess formed in the frame cover 313. According to an embodiment, the pinion gear 362 is coupled to the motor 361 and may be rotated by a driving force provided from the motor 361. According to an embodiment, the rack gear 363 may engage with the pinion gear 362 and move according to rotation of the pinion gear 362. For example, the rack gear 363 may reciprocate linearly in the first direction or the second direction according to the rotation of the pinion gear 362. According to an embodiment, the rack gear 363 may be disposed in the second housing 320. For example, the rack gear 363 may be coupled to the front cover 321 included in the second housing 320. According to an embodiment, the rack gear 363 may be movable inside the operating space 313*p* formed in the frame cover 313.

According to an embodiment, when the pinion gear 362 rotates along the first rotation direction (e.g., clockwise in FIG. 4B), the rack gear 363 may move in the first direction (e.g., the +y direction). When the rack gear 363 moves in the first direction, the second housing 320 coupled to the rack gear 363 may move in the first direction. As the second housing 320 moves in the first direction, an area of the display 330 visible from the outside of the electronic device 300 may be expanded. When the pinion gear 362 rotates along a second rotation direction (e.g., counterclockwise in FIG. 4B), the rack gear 363 may move in a second direction (e.g., −y direction). When the rack gear 363 moves in the second direction, the second housing 320 coupled to the rack gear 363 may move in the second direction. As the second housing 320 moves in the second direction, an area of the display 330 visible from the outside of the electronic device 300 may be reduced.

In the above description, it has been described that the motor 361 and the pinion gear 362 are disposed in the first housing 310, and the rack gear 363 is disposed with the second housing 320, but embodiments are not limited thereto. According to embodiments, the motor 361 and the pinion gear 362 may be disposed in the second housing 320, and the rack gear 363 may be disposed in the first housing 310.

Figure 5:
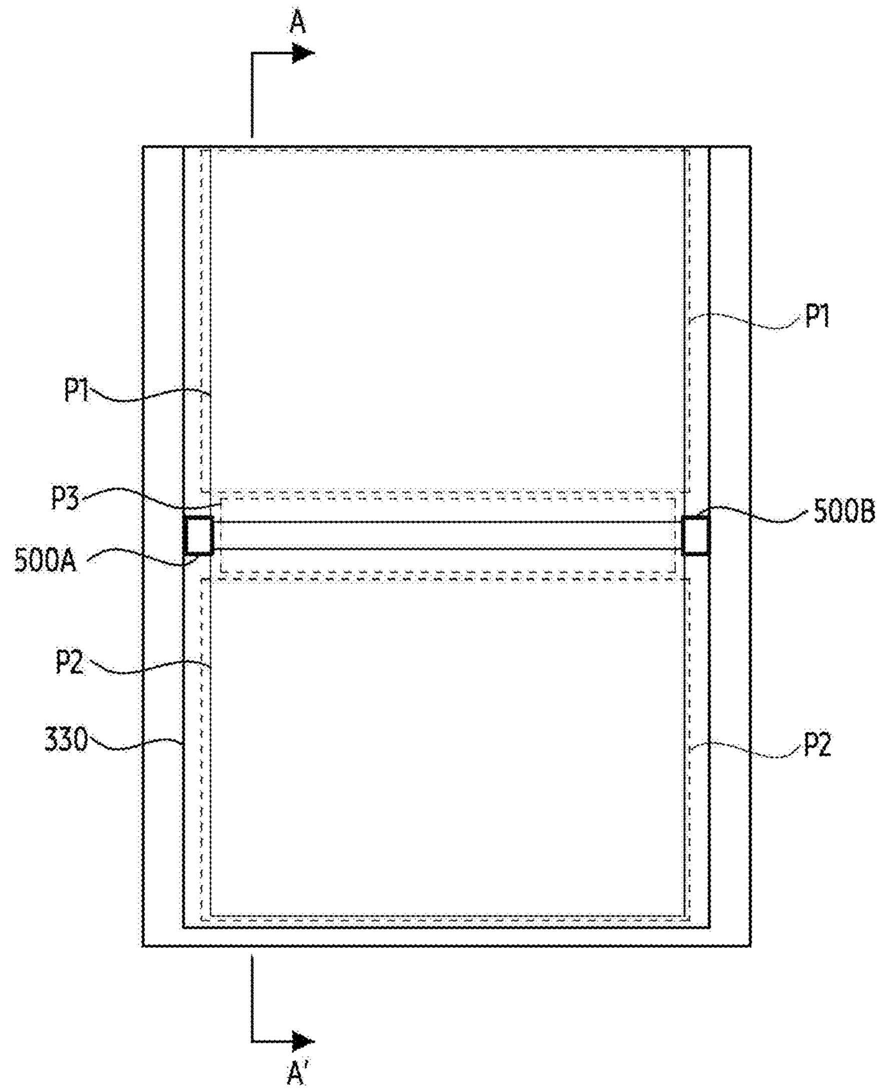
FIG. 5 is a front view of second state illustrating a boundary region of a display in an electronic device, according to an embodiment.

FIG. 5 is a front view of second state illustrating a boundary region of a display in an electronic device, according to an embodiment.

Referring to the embodiment of FIG. 5, the display 330 of the electronic device 300 may include a first region p1 (e.g., a first region 330*a* of FIG. 4A) and a second region p2 (e.g., a second region 330*b* of FIG. 4A). The display 330 may be referred to as a flexible display device that is deformable according to the state of the electronic device 300. The first region p1 of the display 330 may mean the region of the display 330 visible from the outside of the electronic device 300 regardless of the state of the electronic device 300. The first region p1 may mean a partial region of the display 330 that is not rolled into the inner space of the electronic device 300. Since the first region p1 substantially maintains a plane, it may be referred to as a planar region.

According to an embodiment, the second region p2 of the display 330 may extend from the first region p1, may be slid-in into the inner space of the electronic device 300, or may be slid-out from the inner space of the electronic device 300 to the outside according to the movement of the second housing 320 (e.g., the second housing 320 of FIG. 3A). The second region p2 may be substantially planar with the first region p1 or may be rolled in the second housing 320 to form a curved surface according to the state of the electronic device 300. Since the second region p2 changes to a plane or a curved surface according to a state (e.g., a first state, a second state, or a third state) of the electronic device, the second region p2 may be referred to as a deformable region.

According to an embodiment, the display 330 may further include a third region p3. The third region p3 may be disposed between the first region p1 and the second region p2. The display 330 may include different structures based on the third region p3. For example, since the first region p1 substantially maintains a plane, the support part supporting the first region p1 of the display 330 may have a structure that is not deformed. Since the second region p2 is deformed according to the state of the electronic device 300, the support part supporting the second region p2 of the display 330 may have a deformable structure. The third region p3 may be a region extending from the first region p1 to maintain a plane. For example, the third region p3 may include a structure different from that of the first region p1 and the second region p2. The third region p3 may form a plane with the first region p1, even though the third region p3 includes a structure different from that of the first region p1. The third region p3 may maintain the plane regardless of the state change of the electronic device 300. The third region p3 may be referred to as a boundary region or a transition region in terms of being disposed between the first region p1 which is a planar region and the second region p2 which is a deformable region.

According to an embodiment, in the third region p3 of the display 330, a step may occur according to the different structures of the first region p1 and the second region p2, or a part of the third region p3 may be visually recognized by a difference in reflectance. The structure of the electronic device 300 or the display 330 capable of reducing the visibility of the third region p3 will be described in detail with reference to FIGS. 6A to 13B.

According to an embodiment, a structure for preventing visibility of the third region p3 of the display 330 may be formed at both end parts 500A and 500B of the third region p3. The display 330 may include an active region that transmits visual information to the outside, and/or an inactive region that pixels are not disposed or dummy patterns that are not driven exist. The inactive region may be disposed in a periphery of the display 330. The structure formed at both ends 500A and 500B may be in contact with the inactive region of the display 330 or may be disposed within the inactive region, and thus may not be visually recognized to the outside regardless of the driving of the display 330.

Figure 6A:
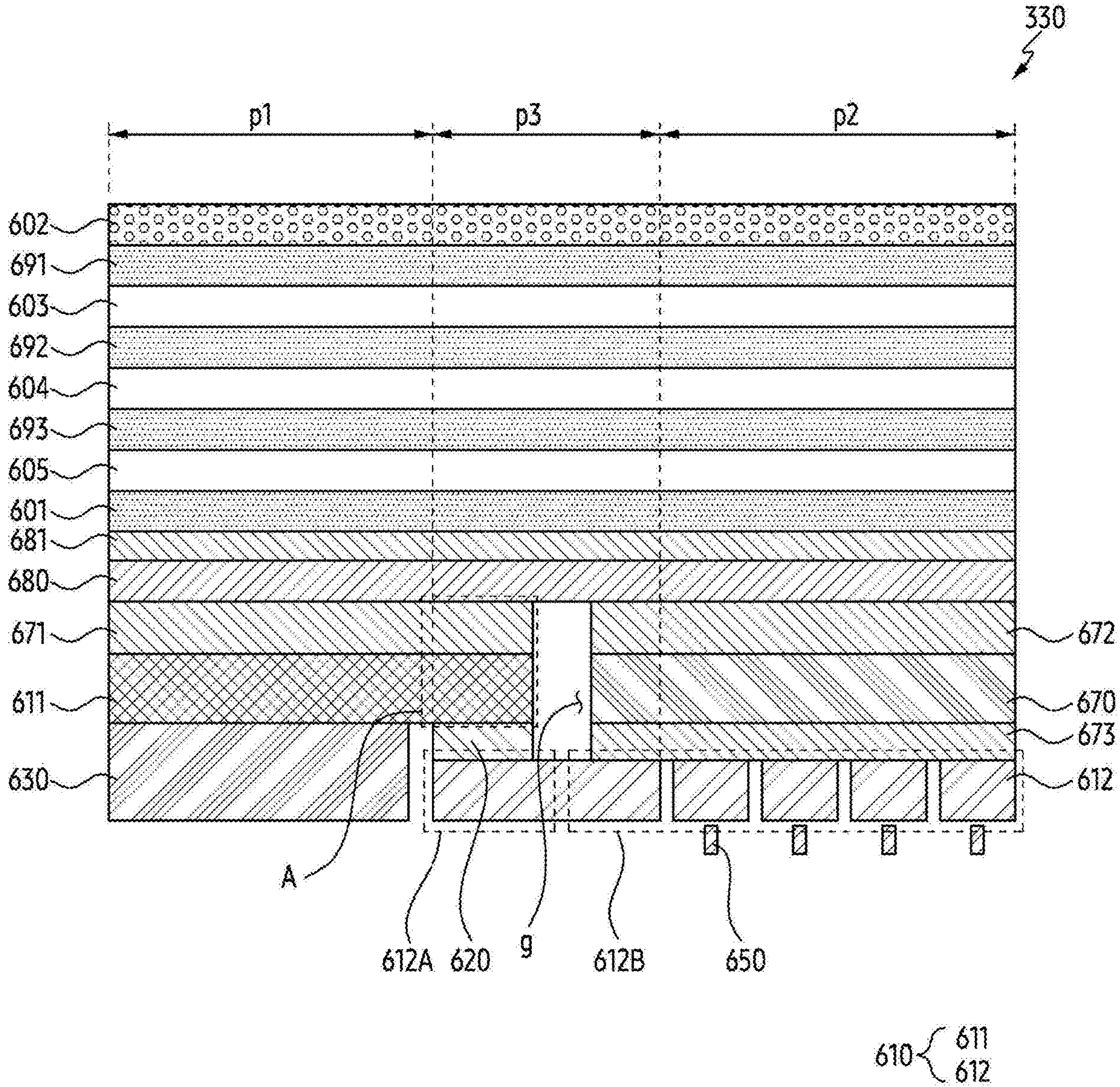
FIG. 6A is a cross-sectional view illustrating an example in which the electronic device of FIG. 5 is cut along A-A'.
Figure 6B:
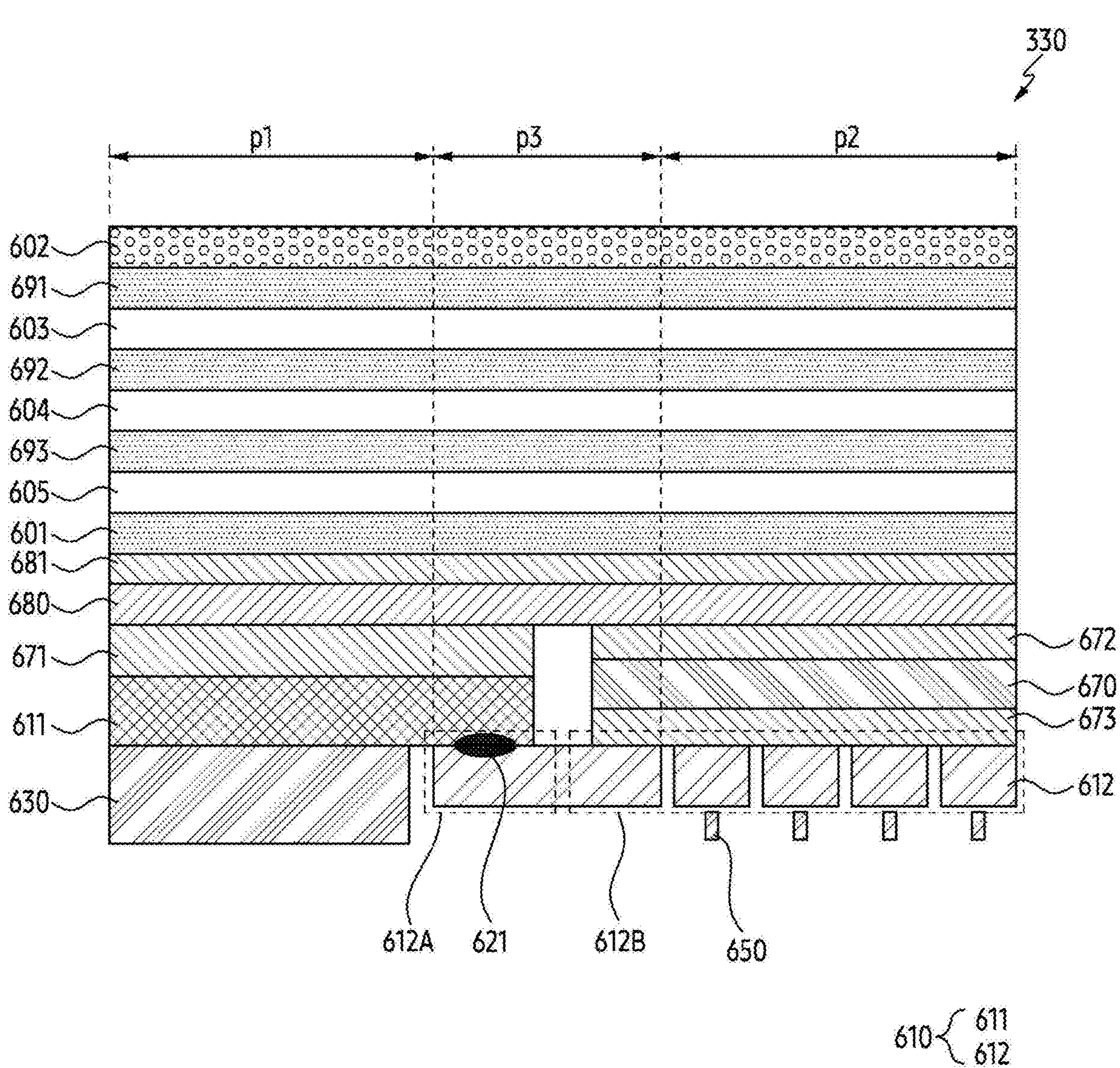
FIG. 6B illustrates an example in which a part of the display of FIG. 6A is deformed.
Figure 6C:
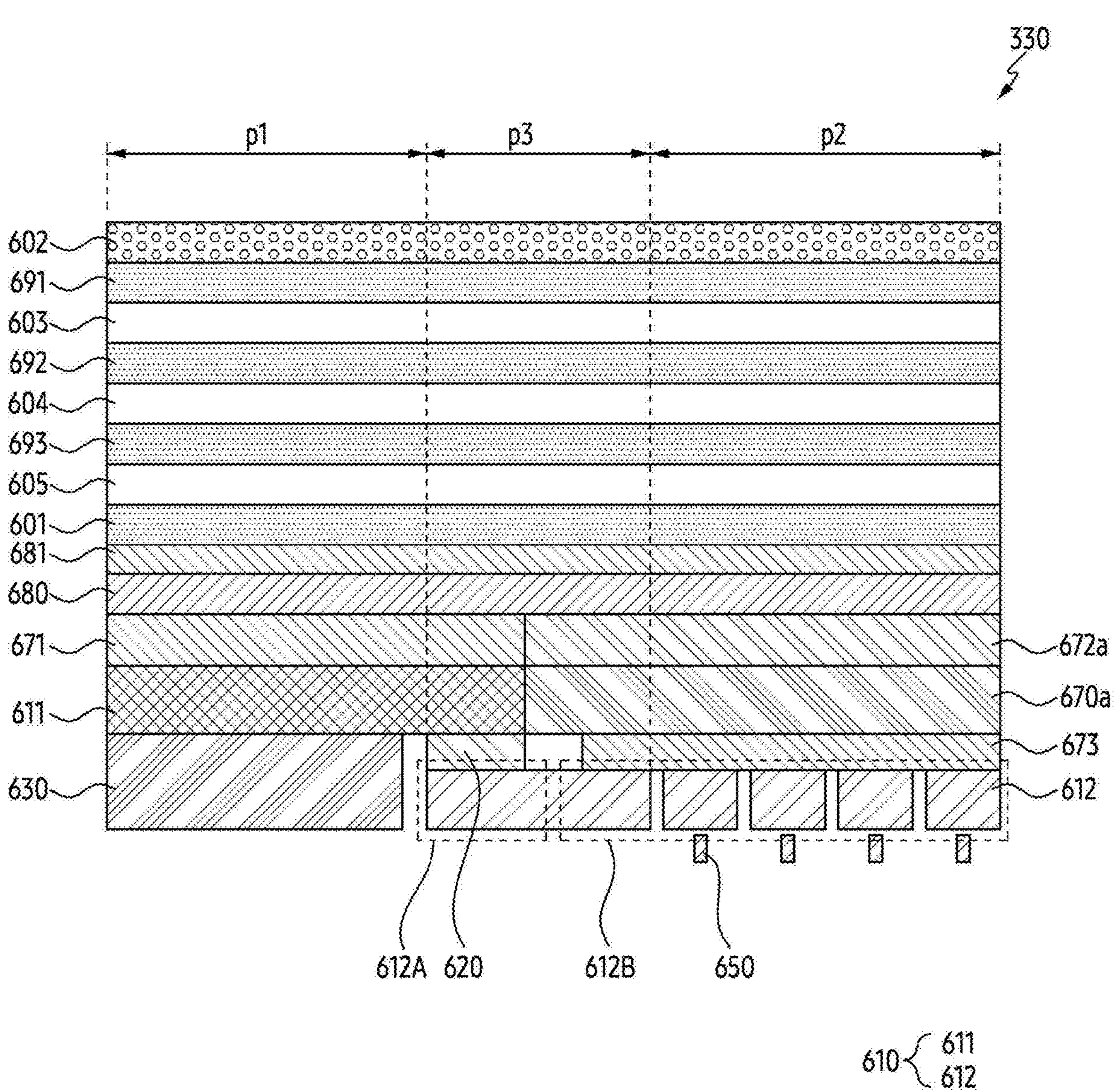
FIG. 6C illustrates an example of a display including a third protection layer in contact with the first support plate of FIG. 6A.
Figure 6D:
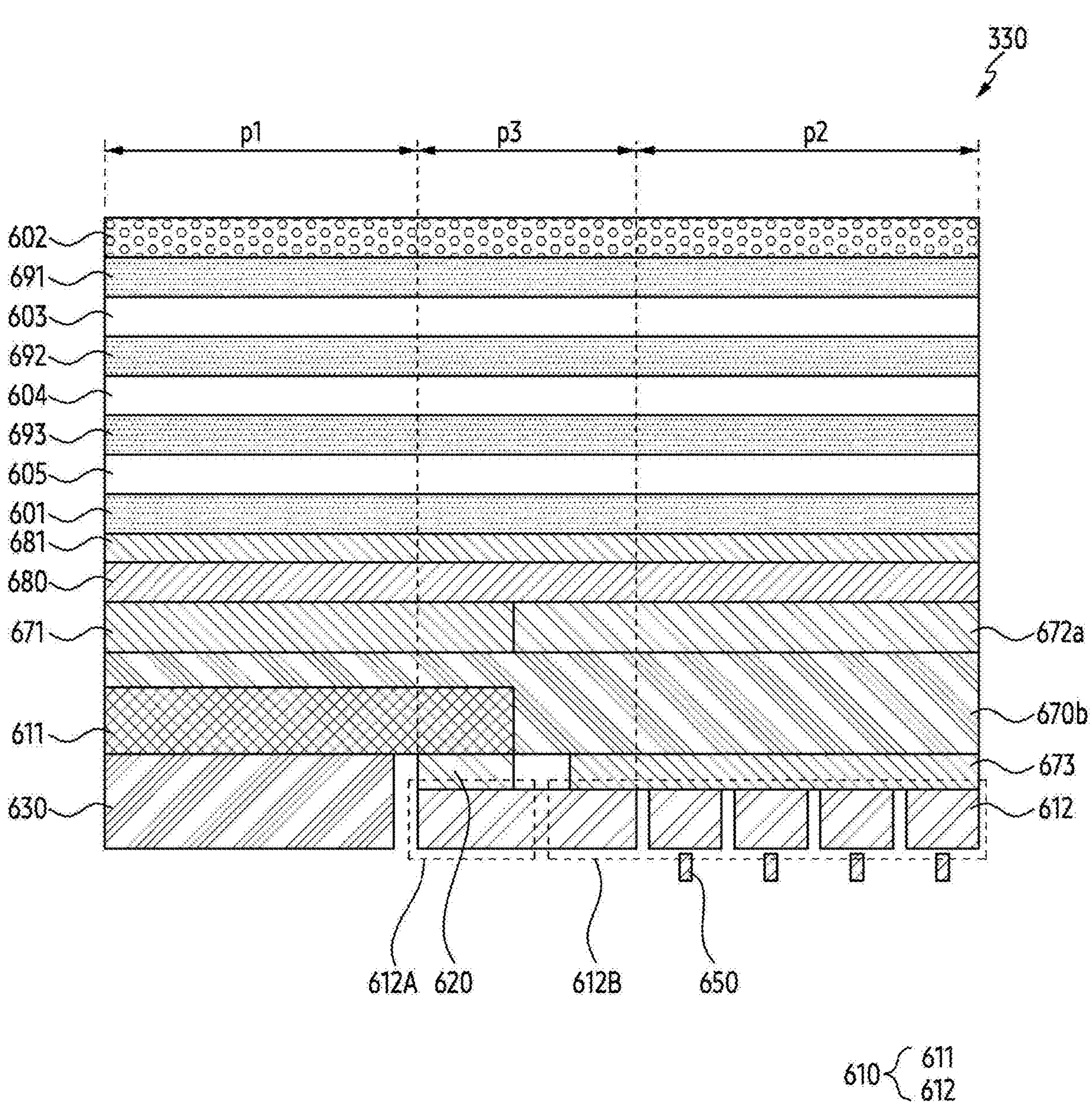
FIG. 6D illustrates an example of a display including a third protection layer extending to one surface of the first support plate of FIG. 6C.

FIG. 6A is a cross-sectional view illustrating an example in which the electronic device of FIG. 5 is cut along A-A'. FIG. 6B illustrates an example in which a part of the display of FIG. 6A is deformed. FIG. 6C illustrates an example of a display including a third protection layer in contact with the first support plate of FIG. 6A. FIG. 6D illustrates an example of a display including a third protection layer extending to one surface of the first support plate of FIG. 6C.

Figure 6E:
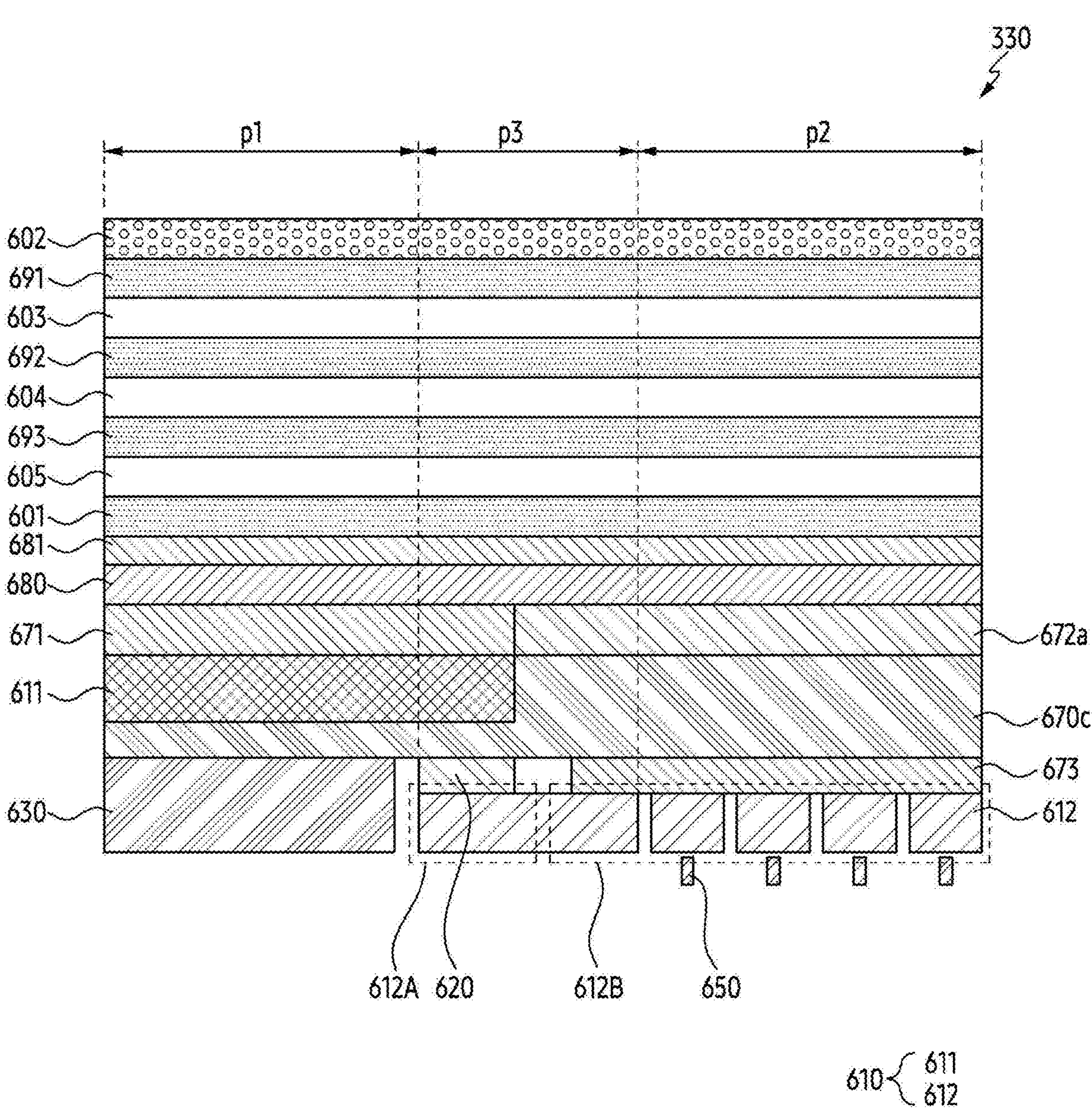
FIG. 6E illustrates an example of a display including a third protection layer extending to the other surface of the first support plate of FIG. 6C.
Figure 6F:
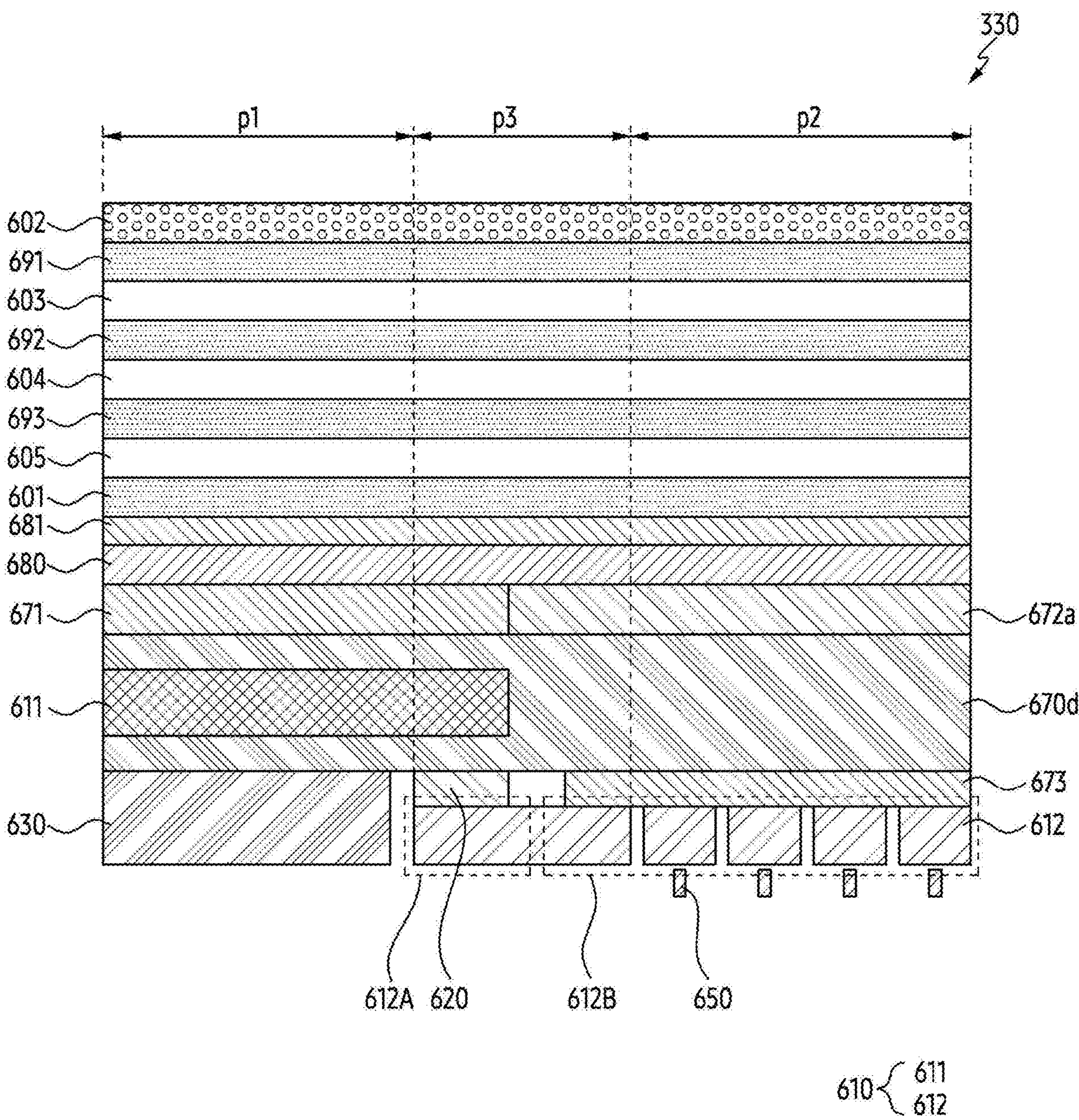
FIG. 6F illustrates an example of a display including a third protection layer extending to the other surface of the first support plate of FIG. 6D.

FIG. 6E illustrates an example of a display including a third protection layer extending to the other surface of the first support plate of FIG. 6C. FIG. 6F illustrates an example of a display including a third protection layer extending to the other surface of the first support plate of FIG. 6D. In the embodiments of FIGS. 6A to 6F, the shown components, i.e. the different layers, are exemplarily only and not limiting for the present disclosure. Accordingly, one or more components may be omitted.

Referring to the embodiments of FIGS. 6A, 6B, 6C, and 6D, the display 330 includes a display panel 601, and a window 692, any may include a first protection layer 680, a second protection layer 671, a third protection layer 670, and a supporter 610 including a first support plate 611 and a second support plate 612.

According to an embodiment, the window 692 is disposed on one surface of the display panel 601 facing the outside of the electronic device (e.g., the electronic device 300 of FIG. 3A) to protect the display panel 601 and transmit light emitted from the display panel 601 to the outside to provide visual information. The display 330 may further include a coating layer 602, a first layer 691, a window 692, a second layer 693, and adhesive layers 603, 604, and 605 disposed between the first layer 691, the window 692, and the second layer 693. According to an embodiment, the first layer 691, the window 692, and the second layer 693 may include at least a part of a transparent portion. For example, the coating layer 602, the first layer 691, the window 692, and the second layer 693 may include a transparent portion in order to transmit light emitted from the display panel 601 to the outside. The coating layer 602, the first layer 691, the window 692, and/or the second layer 693 may include a polymer material or a glass material. For example, since the window 692 is formed of glass material, overall rigidity of layers disposed on one surface of the display panel 601 facing the outside of the electronic device (e.g., the electronic device 300 of FIG. 3*a*) may be ensured. The window 692 may include an ultra-thin glass (UTG) formed of a thin film glass material. As another example, the window 692 may include a polymer material such as polyimide (PI).

The first layer 691, the second layer 693, and/or the coating layer 602 may include a thin film formed of polyimide (PI) and polyethylene terephthalate (PET).

According to an embodiment, the first layer 691 may be a layer for protecting the window 692. The first layer 691 may be referred to as a protection film. The first layer 691 may include a polymer material such as PET. The adhesive layer 603 disposed between the first layer 691 and the window 692 may have a lower viscosity or a thinner thickness than the other adhesive layers 604 and 605. When replacement or removal of the first layer 691 is required, the adhesive layer 603 disposed between the first layer 691 and the window 692 may be configured to have an adhesive force lower than that of the other adhesive layers 604 and 605 in order to remove the first layer 691.

The second layer 693 may be a layer for protecting the display panel 601. The second layer 693 may include a protective layer of a polymer material such as PET or a polarizing layer. When the polarizing plate is not included in the display panel 601, the second layer 693 may reinforce the rigidity of the display panel 601.

The coating layer 602 may be formed of a material having rigidity higher than that of the first layer 691 and the second layer 693. The coating layer 602 may have scratch-resistance property. Although it has been described that the coating layer 602 is disposed on the first layer 691, it may be disposed at various positions. For example, the coating layer 602 may be disposed between the first layer 691 and the window 692, or may be disposed between the window 692 and the second layer 693. The coating layer 602 may be disposed between the first layer 691 and the window 692 to surround the side surface of the first layer 691 or the side surface of the window 692. The coating layer 602 may be disposed between the second layer 693 and the window 692 to surround the side surface of the second layer 693 or the side surface of the window 692. The coating layer 602 may be a film stacked on one surface of the first layer 691, the second layer 693, or the window 692. The coating layer 602 may be formed by a coating liquid coated on one surface of the first layer 691, the second layer 693, or the window 692.

According to an embodiment, the coating layer 602 may include an anti-reflection (AR) coating, a low reflection (LR) coating, a shatter proof (SP) coating, an anti-fingerprint (AF) coating, and the like.

According to an embodiment, the adhesive layers 603, 604, and 605 may be transparent adhesive layers capable of transmitting light. The adhesive layers 603, 604, and 605 may include a pressure sensitive adhesive (PSA) or an optical clear adhesive (OCA).

According to an embodiment, the display 330 may further include protection layers disposed on the other surface of the display panel 601. The protection layers may include a first protection layer 680, a second protection layer 671, and a third protection layer 670.

According to an embodiment, the first protection layer 680 may be disposed on the other surface of the display panel 601. For example, the window 692 may be disposed on one surface of the display panel 601, and the first protection layer 680 may be disposed on the other surface facing one surface of the display panel 601. The first protection layer 680 may be attached to the other surface of the display panel 601 by an adhesive layer 681. The first protection layer 680 may be a film for protecting the display panel 601. The first protection layer 680 may be formed of a polymer material such as PET.

According to an embodiment, the first layer 691, the second layer 693, the window 692, the display panel 601, and the first protection layer 680 may be disposed under the first region p1 (e.g., the first region p1 of FIG. 5), the second region p2 (e.g., the second region p2 of FIG. 5), and the third region p3 of the display 600. In the first region p1, the display 330 may be disposed on the second housing (e.g., the second housing 320 of FIG. 3A or 3C). The first region p1 may be a region exposed to the outside of the electronic device regardless of the state of the electronic device 300. The first region p1 may be formed substantially in a plane. The first region p1 may be referred to as a planar region. In this regard, the term "planar" describes a region that is substantially flat. The first region p1 may be a region of the display 330 supported by the first support plate 611. In the first state, the second region p2 may be rolled into the inside of the first housing (e.g., the first housing 310 of FIG. 3A or 3C). In the second state, the second region p2 may be slid-out from the first housing 310 to the outside, according to the movement of the second housing 320, to form substantially a same plane as the first region p1. Hence, in a slid-out state, the first region (p1) and the second region (p2) are arranged adjacent to each other in a same horizontal plane. The second region (p2) may have a curved surface in which a part thereof is bent inside the electronic device or may be exposed to the outside to be formed in a plane, and thus may be referred to as a deformable region. In this regard, the term "deformable" means that the appearance of the second region p2 may be temporarily changed. The second region p2 may be a region supported by the second support plate 612. The second region p2 may be a region supported by a lattice structure in the second support plate 612. The second region p2 may be a region in which the second support plate 612 is supported by the support bar 650. The support bar 650 may be configured to prevent deformation of the second support plate 612 due to a repulsive force caused by bending of the second support plate 612 of the supporter 610. The third region p3 may be disposed between the first region p1 and the second region p2. The third region p3 may be referred to as a boundary region including a boundary between the first region p1 and the second region p2. The third region p3 may be a region in which regions other than the region supported by the support bar 650 of the second support plate 612 are disposed. The third region p3 may include a boundary between the first region p1 and the second region p2 of the display 330. The third region p3 may include a space g surrounded by the protection layers 671, 670, 673, and 680.

The first protection layer 680 may support the display panel 601 while protecting the other surface (e.g., the lower part) of the display panel 601. For example, the first protection layer 680 may protect the display panel 601 from the first support plate 611 or the second support plate 612 having rigidity.

According to an embodiment, the display 330 may further include a second protection layer 671 and a third protection layer 670. The second protection layer 671 may support a part of the first region p1 and the third region p3 of the display 330. A part of the third region p3 may be in contact with the first region p1. The third protection layer 670 may be spaced apart from the second protection layer 671 and may support a remainder part of the second region p2 and the third region p3 of the display 330. The remainder part of the third region p3 may be in contact with the second region p2. According to an embodiment, the second protection layer 671 may be disposed between the first protection layer 680 and the first support plate 611. The second protection layer 671 may include an adhesive member that bond the first support plate 611 and the first protection layer 680. Under a part of the first region p1 and the third region p3, the adhesive member may have different characteristics from the adhesive layers 672 and 673 disposed on the remainder part of the second region p2 and the third region p3, in order to protect the display panel 601 from the first support plate 611 or to support the display panel 601. For example, an elastic modulus (e.g., Young's modulus) of an adhesive member included in the second protection layer 671 disposed under a part of the first region p1 and the third region p3 may be different from an elastic modulus of the adhesive layers 672 and 673. The second protection layer 671 may further include an additional protection layer.

According to an embodiment, the third protection layer 670 may prevent damage to the display panel 601 due to an impact transmitted from the support bar 650 (e.g., the support bar 331 of FIG. 4A). The third protection layer 670 may be disposed between the display panel 601 and the support bar 650 to reduce an impact caused by the support bar 650. The third protection layer 670 may be formed of a polymer material having elasticity. For example, the third protection layer 670 may include thermoplastic polyurethane (TPU), PET, PI, or a combination thereof. The third protection layer 670 may include an adhesive layer 672 for bonding to the first protection layer 680 and an adhesive layer 673 for bonding to the second support plate 612. The adhesive layers 672 and 673 may be PSA or OCA.

According to an embodiment, the second protection layer 671 may include one surface in contact with the first protection layer 680 and another surface facing the one surface. The supporter 610 may support the display panel 601, the window 692, the first layer 691, and the second layer 693. The supporter 610 may include a first support plate 611 supporting the first region p1 of the display panel 601 and a second support plate 612 supporting the second region p2 of the display panel 601. The first support plate 611 and the second support plate 612 may be structures separated from each other. The first support plate 611 or the second support plate 612 may include a metal such as carbon fiber reinforced polymer (CFRP), glass fiber reinforced plastics (GFRP), or stainless used steel (SUS). The first support plate 611 may be in contact with the other surface of the second protection layer 671. The first support plate 611 may support the display 330 or the first region p1 of the display panel 601. The first support plate 611 may support a part of the third region p3 in contact with the boundary of the first region p1 of the display 330. The first support plate 611 may be formed of a material having rigidity to support a part of the first region p1 and the third region p3 of the display 330 or the display panel 601.

According to an embodiment, when the display 330 is viewed from above, the first support plate 611 may be disposed to overlap the first region p1 and the region A of the third region p3. When the display 330 is viewed from above, the second support plate 612 may be disposed to overlap the second region p2 and the third region p3. When the display 330 is viewed from above, a part of the first support plate 611 and a part of the second support plate 612 in the region A in the third region p3 may be disposed to overlap each other.

According to an embodiment, the third protection layer 670 may include one surface facing the first protection layer 680 and another surface facing the one surface. The third protection layer 670 may be coupled to the first protection layer 680 through the adhesive 6 layer 672 attached to the one surface, and may be coupled to the second support plate 612 through the adhesive layer 673 attached to the other surface. The second support plate 612 may support the second region p2 and a portion of the third region p3 that is in contact with the periphery of the second region p2. For example, the second support plate 612 may include an extension region 612A extending to the third region p3 and a support region 612B supporting the second region p2 of the display panel 601. In the support region 612B, the second support plate 612 may support the protection layer 670 and the adhesive layers 672 and 673. When the display panel 601 is viewed from above, the extension region 612A of the second support plate 612 may overlap a part of the first support plate 611 and the fastening part 620. According to an embodiment, the third protection layer 670 is illustrated as being disposed on a part of the third region p3, but is not limited thereto.

According to an embodiment, the support region 612B of the second support plate 612 may overlap the second region p2. The second region p2, which is the deformable region of the display 330, may be configured to be deformed according to the state of the electronic device (e.g., the electronic device 300 of FIG. 3A). The support region 612B of the second deformable support plate 612 may include a structure for providing a deformable shape of the second region p2. For example, the support region 612B of the second support plate 612 may include openings or spaced spaces formed substantially parallel to the boundary between the first region p1 and the second region p2. As another example, the support region 612B of the second support plate 612 may include a recess formed in a substantially parallel direction from the boundary, instead of an opening. The recess or openings may be formed in a direction substantially parallel to the extending direction (+x direction) of the support bar 650 (e.g., the support bar 331 of FIG. 4A). According to an embodiment, the support region 612B of the second support plate 612 may include the mixed recess and the opening. The mixed recesses and openings may be formed in a direction substantially parallel to the extension direction (+x direction) of the support bar 650. The second support plate 612 may be formed to be divided from each other by the openings or spaced spaces. The divided parts of the second support plate 612 may be connected to each other so as to be deformable based on the state of the electronic device 300. For example, the divided parts of the second support plate 612 may be linked to each other, such as chain coupling or hinge coupling. The divided parts of the second support plate 612 may be deformed according to the state of the electronic device 300 to guide a shape of the second region p2. The extension region 612A of the second support plate 612 may not include openings or spaced spaces included in the second region p2. The second support plate 612 disposed in the third region p3 may not include openings or spaces.

According to an embodiment, layers disposed in a direction in which one side of the first protection layer 680 facing the supporter 610 may have a space g. The space g may be a space surrounded by at least a part of the second protection layer 671, the first support plate 611, the second support plate 612, the third protection layer 670, the fastening part 620, and the adhesive layers 672 and 673. The space g may be disposed in the third region p3. For example, the display 330 of FIG. 6A may include the space g surrounded by the second protection layer 671, the first support plate 611, the second support plate 612, the third protection layer 670, the fastening part 620, and the adhesive layers 672 and 673. Since the fastening part 620 is not included, the display 330 of FIG. 6B may include a space surrounded by the second protection layer 671, the first support plate 611, the second support plate 612, the third protection layer 670, and the adhesive layers 672 and 673. The display 330 of FIG. 6C or FIG. 6D may include a space surrounded by the second protection layer 671, the second support plate 612, the third protection layer 670*a* or 670*b*, the fastening part 620, and the adhesive layer 673. The space g may form a separation structure between layers disposed under the first region p1 and layers disposed in the second region p2. The space g is shown to be disposed at a boundary between the first region p1 and the second region p2, but is not limited thereto. For example, the space may be disposed under the first region p1 or the second region p2.

Referring to the embodiment of FIG. 6A, according to an embodiment, the display 330 may further include the fastening part 620. The fastening part 620 may be disposed between the first support plate 611 and the second support plate 612. When the display 330 is viewed from above, the extension region 612A of the second support plate 612 may overlap a part of the first support plate 611, the fastening part 620 may be disposed between the first support plate 611 and the second support plate 612 in the overlapping region, and may couple the first support plate 611 and the second support plate 612. For example, the fastening part 620 may include a PSA or an OCA.

Referring to the embodiment of FIG. 6B, the extension region 612A of the second support plate 612 may be in contact with a part of the first support plate 611 or may be slightly spaced apart from each other. For example, when the display 330 is viewed from above, the extension region 612A of the second support plate 612 may overlap a part of the first support plate 611. In the overlapping region of the first support plate 611 and the second support plate 612, a junction part 621 for fastening the first support plate 611 and the second support plate 612 through welding may be formed. According to an embodiment, the joint part 621 may be a part in which the first support plate 611 and the second support plate 612 are thermal junction by welding. For example, the fastening part 620 may be hardened by mixing a part of the first support plate 611 melted by heat and a part melted by heat. According to an embodiment, the fastening part 620 or the joint part 621 may connect the third region p3 that is a discontinuous section between the first region p1 in which the second protection layer 671 and the first support plate 611 are disposed, and the second region p2 in which the third protection layer 670 and the second support plate 612 are disposed. For example, the fastening part 620 or the joint part 621 may reduce abrupt deformation of the discontinuous section by connecting the third region p3, which is a discontinuous section of the first support plate 611 and the second support plate 612. The fastening part 620 or the joint part 621 may reduce deformation of the discontinuous section to reduce occurrence of a step in the third region p3 between the first region p1 and the second region p2. The fastening part 620 or the joint part 621 may reduce visual recognition of the third region p3 in the outside of the electronic device due to the step.

According to an embodiment, the display 330 may further include a support bar 650 (e.g., the support bar 331 of FIG. 4A). The support bar 650 may be disposed under the second support plate 612. The support bar 650 may be disposed to correspond to the divided parts of the second support plate 612. The support bar 650 may be deformed according to the state of the electronic device 300. For example, shapes of the support bar 650 may be guided by a guide rail 332 disposed in the second housing 320. The support bar 650 may be attached to the second support plate 612. The support region 612B of the second support plate 612 may provide a shape corresponding to a deformed shape of the support bar 650.

According to an embodiment, the display 330 may further include a cushion layer 630. The cushion layer 630 may be formed of an elastic material and may be damping the impact transmitted to the display 330. For example, the cushion layer 630 may be formed of a porous material or sponge. The cushion layer 630 may be disposed in a partial region of the first support plate 611. As shown in FIG. 6A, the cushion layer 630 may be disposed on one surface of the first support plate 611 to have a thickness corresponding to a distance from one surface of the first support plate 611 to one surface of the second support plate 612 facing the support bar 650. According to an embodiment, as shown in FIG. 6B, the cushion layer 630 may have a thickness longer than a distance between one surface of the first support plate 611 and the one surface of the second support plate 612. The thickness of the cushion layer 630 may vary. For example, the thickness of the cushion layer 630 may be thinner than the distance from one surface of the first support plate 611 on which the cushion layer 630 is disposed to the one surface of the second support plate 612. However, the location of the cushion layer 630 is not limited thereto. The cushion layer 630 may be in contact with a part of the second support plate 612. For example, the cushion layer 630 may be in contact with a part of the second support plate 612 (e.g., extension region 612A) within the third region p3.

Referring to the embodiment of FIG. 6C, the third protection layer 670*a* may be in contact with the first support plate 611. The third protection layer 670*a* may remove a space (e.g., a space g of FIG. 6A) between the first support plates 611. For example, the third protection layer 670*a* in contact with the first support plate 611 may reduce recognition of the third region p3, which is a discontinuous section between the first region p1 and the second region p2, from the outside.

According to an embodiment, the third protection layer 670*a* may have a color to prevent the third protection layer 670*a* from being visible from the outside of the display 330. The third protection layer 670*a* may have a color similar to that of the support plate. For example, the third protection layer 670*a* may have a black color. For another example, an opaque liquid may be applied and coated, or an opaque layer may be added on the third protection layer 670*a*.

According to an embodiment, the third protection layer 670*a* may be attached by the first protection layer 680 and the adhesive layer 672*a*. In order to provide adhesive force to the third protection layer 670*a* extending to the side surface of the first support plate 611, the adhesive layer 672*a* may contact the second protection layer 671. A surface of the third protection layer 670*a* in contact with the adhesive layer 672*a* may be substantially planar with a surface of the first support plate 611 in contact with the second protection layer 671.

According to an embodiment, the third protection layer 670*a* may be integrally formed with the first support plate 611 without an adhesive member.

According to an embodiment, the second protection layer 671 may include an adhesive member that bonds the first support plate 611 with the first protection layer 680. Under the first region p1, the adhesive member for protecting the display panel 601 from the first support plate 611 or supporting the display panel 601 may have different characteristics from the adhesive layer 672*a* disposed under the second region p2. For example, the adhesive member of the second protection layer 671 may include a material that may be firmly adhered to the first support plate 611, in order to prevent external viewing of the boundary region of the protection layers or support plates under the third region p3. The adhesive layer 672*a* may include a material that may be deformed while maintaining the adhesive force between the third protection layer 670*a* disposed under the second region p2.

According to an embodiment, the third protection layer 670*a*, which removes a step from the first support plate 611 and has a color, may prevent viewing of the boundary region under the third region p3 outside the display 330.

According to an embodiment, the fastening part 620 has been described as a separate adhesive member, but is not limited thereto, and may be replaced with a joint part (e.g., the joint part 621 of FIG. 6B) by welding, when the spaced distance between the first support plate 611 and the second support plate 612 is less than or equal to the reference interval.

According to an embodiment, layers disposed in a direction in which one surface of the first protection layer 680 facing the supporter 610 may have a space (e.g., a space g of FIG. 6A). The space may be a space surrounded by at least a part of the first support plate 611, the second support plate 612, the third protection layer 670*a*, the fastening part 620, or the adhesive layer 673 under the third region p3. The space is expressed as being disposed under the third region p3, but is not limited thereto. For example, the space may be disposed under the first region p1 or the second region p2.

Referring to the embodiment of FIG. 6D, the third protection layer 670*b* may extend between the first support plate 611 and the second protection layer 671 while being in contact with a side surface of the first support plate 611. For example, the third protection layer 670*b* may surround a side surface of the first support plate 611 facing the third protection layer 670*b* and a side surface of the first support plate 611 facing the second protection layer 671.

According to an embodiment, the fastening part 620 is described as a separate adhesive member, but is not limited thereto, and when the spaced distance between the first support plate 611 and the second support plate 612 is less than or equal to a reference interval, the fastening part 620 may be replaced by a joint part by welding.

According to an embodiment, the third protection layer 670*b* may be disposed on a surface of the first support plate 611 facing the second protection layer 671 to reduce the occurrence of a step due to tolerances or the like in the manufacturing process of the first support plate 611 and the third protection layer 670*b*. A surface facing the second protection layer 671 of the third protection layer 670*b* and the adhesive layer 672*a* may be substantially planar. The third protection layer 670*b* may provide continuity at the boundary of the first support plate 611. The third protection layer 670*b* may prevent the third region p3 from viewing from the outside by reducing the step or space between the first support plate 611 and the third protection layer 670*b* and ensuring continuity of the third region p3 between the first region p1 and the second region p2.

Referring to the embodiment of FIG. 6E, the third protection layer 670*c* may extend between the first support plate 611 and the cushion layer 630 while being in contact with the side surface of the first support plate 611. For example, the third protection layer 670*c* may surround a side surface of the first support plate 611 facing the third protection layer 670*c* and a surface of the first support plate 611 facing the cushion layer 630.

Referring to the embodiment of FIG. 6E, the third protection layer 670*c* may be disposed on a surface of the first support plate 611 facing the cushion layer 630 to reduce the occurrence of a step due to tolerances or the like in the manufacturing process of the first support plate 611 and the third protection layer 670*c*. A surface facing the cushion layer 630 of the third protection layer 670*c* and the adhesive layer 673 may be substantially planar. A surface facing the second protection layer 671 of the first support plate 611 and a surface facing the adhesive layer 672*a* of the third protection layer 670*c* may be substantially planar. The third protection layer 670*c* disposed under the first support plate 611 may be formed of an elastic polymer material (TPU, PET, and PI), thereby reducing transmission of an external impact to the first support plate 611. The third protection layer 670*c* may prevent the display panel 601 from being damaged by reducing the impact transmitted to the first support plate 611.

According to an embodiment, the fastening part 620 is described as a separate adhesive member, but is not limited thereto, and when the spaced distance between the first support plate 611 and the second support plate 612 is less than or equal to a reference interval, the fastening part 620 may be replaced by a joint part by welding.

Referring to the embodiment of FIG. 6F, the third protection layer 670*d* may surround at least a part of the first support plate 611. For example, the third protection layer 670*d* may include a part disposed on the surface of the first support plate 611 facing the cushion layer 630 and a part extending between the first support plate 611 and the second protection layer 671 while being in contact with the side surface of the first support plate 611 to reduce the occurrence of a step due to tolerances or the like in the manufacturing process of the first support plate 611 and the third protection layer 670*d*. The part extending between the first support plate 611 and the second protection layer 671 may reduce a step generated during a manufacturing process.

According to an embodiment, the fastening part 620 is described as a separate adhesive member, but is not limited thereto, and when the spaced distance between the first support plate 611 and the second support plate 612 is less than or equal to a reference interval, the fastening part 620 may be replaced by a joint part by welding.

Referring back to FIGS. 6E and 6F, layers disposed in a direction in which one surface of the third protection layer 670*c* or 670*d* facing the supporter 610 may have a space (e.g., a space g of FIG. 6A). The space may be a space surrounded by at least a part of the second support plate 612, the third protection layer 670*c* or 670*d*, the fastening part 620, or the adhesive layer 673. The space may form a divided structure between layers disposed under the first region p1 and layers disposed under the second region p2. The space is shown to be disposed under the third region p3, but is not limited thereto. For example, the space may be disposed under the first region p1 or the second region p2.

According to the above-described embodiment, the display 330 may provide a structure for reducing the viewing of the third region p3 between the first region p1 and the second region p2. The fastening part 620 may connect the divided first support plate 611 and the second support plate 612. The display panel 601 supported by the first support plate 611 and the second support plate 612 connected by the fastening part 620 or the joint part 621 may maintain a substantially planar shape and may not include a step. By reducing the occurrence of a step in the display 330 including the display panel 601, the display 330 may prevent the boundary region from being viewed from the outside of the electronic device 300.

Figure 6G:
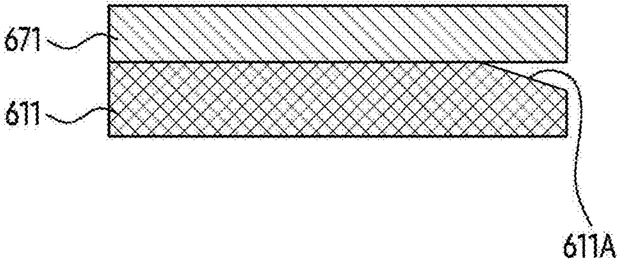
FIGS. 6G and 6H are deformed examples of the first support plate in region A of the display of FIG. 6A.
Figure 6H:
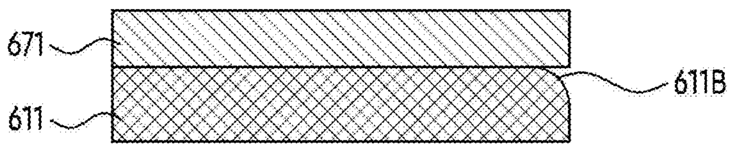

FIGS. 6G and 6H are deformed examples of the first support plate in region A of the display of FIG. 6A.

The periphery part of the first support plate 611 and the second support plate 612 are expressed as being formed at right angles, but are not limited thereto.

Referring to the embodiment of FIG. 6G, the first support plate 611 may be chamfered. The first support plate 611 in contact with the second protection layer 671 may include a chamfered edge portion 611A. The edge portion 611A of the first support plate 611 may be chamfered to prevent damage to one surface of the display panel 601 facing the first support plate 611.

Referring to the embodiment of FIG. 6H, the first support plate 611 may be rounded. The first support plate 611 in contact with the second protection layer 671 may include a rounded edge portion 611B. The edge portion 611B of the first support plate 611 may be rounded to prevent damage to the one surface of the display panel 601 facing the first support plate 611.

Although the first support plate 611 is described as being chamfered or rounded, the edge of the second support plate 612 may also be rounded or chamfered. It is possible to prevent the third region p3 from being visible to the outside by removing the sharp parts of the first support plate 611 and the second support plate 612. Damage to the display panel 601 may be prevented by smoothing the corner of the edge portion (e.g., 611A or 611B) of the first support plate 611 and the edge portion of the second support plate 612. By means of the aforedescribed configuration, an external visibility of the third region p3 can be reduced by providing a structure that minimizes a step (or e.g., an elevation) occurring in the third region p3 (i.e. the boundary region).

Figure 7A:
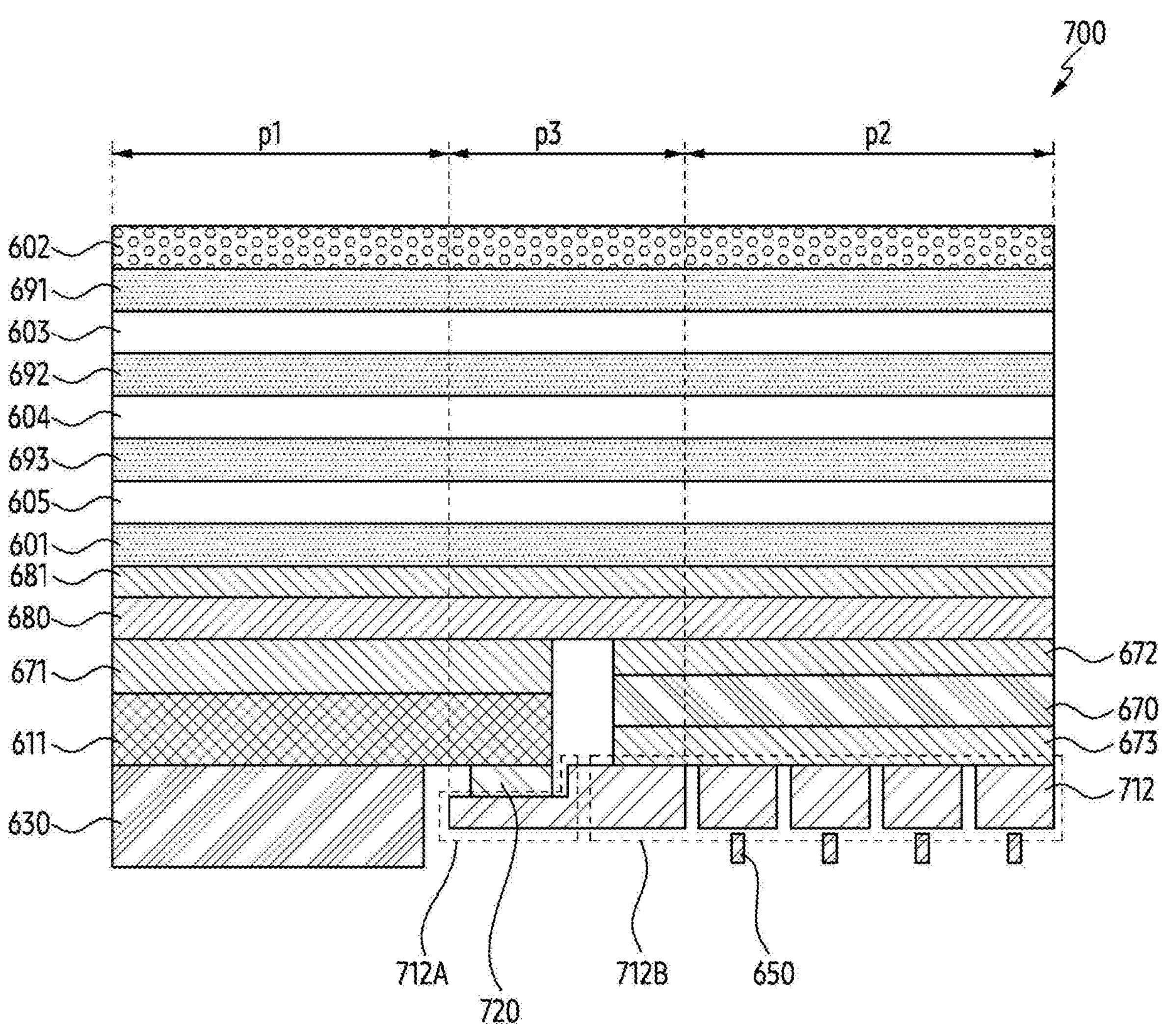
FIG. 7A is a deformed example of a second support plate of a display according to an embodiment.
Figure 7B:
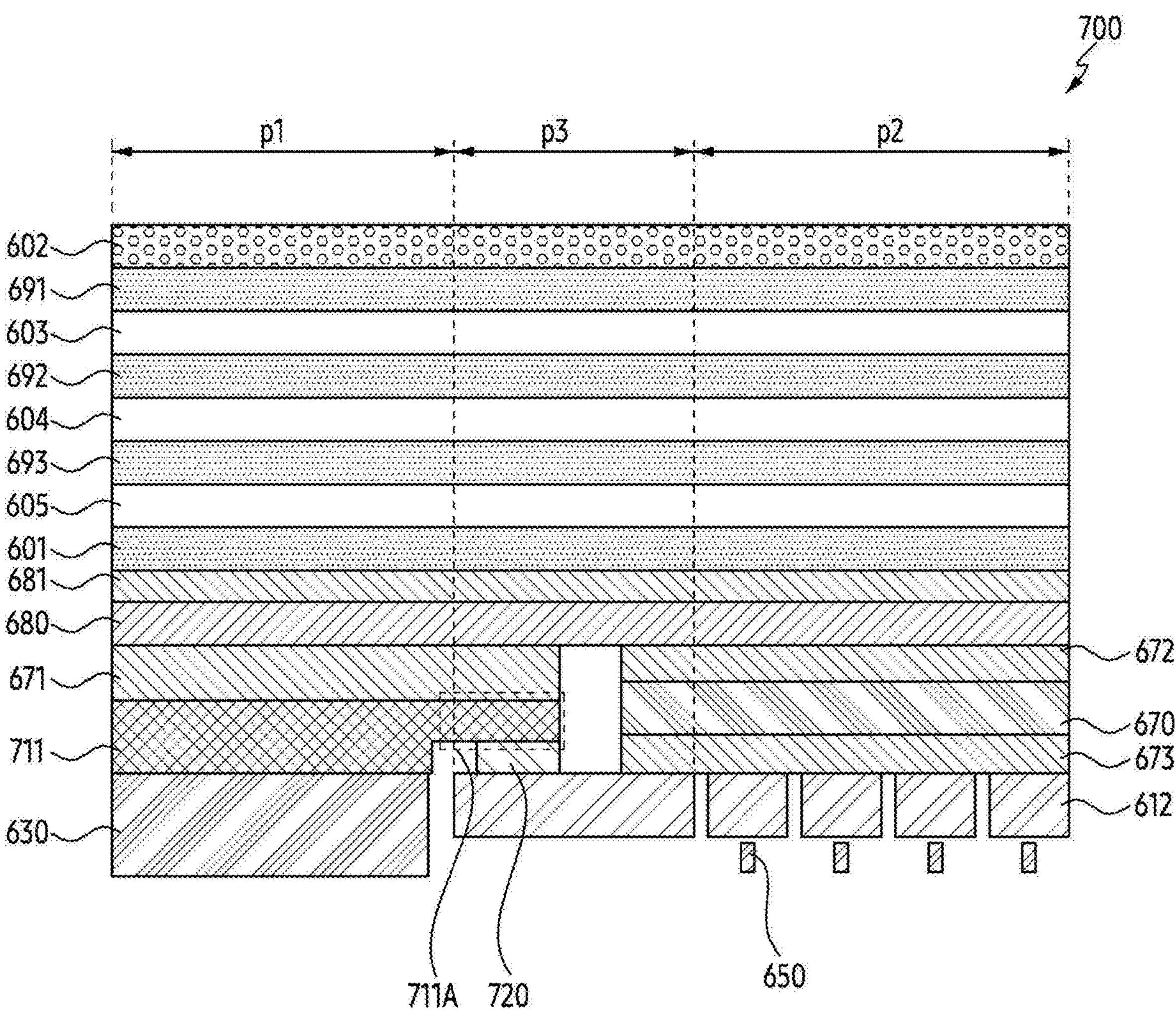
FIG. 7B is a deformed example of a first support plate of a display according to an embodiment.

FIG. 7A is a deformed example of a second support plate of a display according to an embodiment. FIG. 7B is a deformed example of a first support plate of a display according to an embodiment. The embodiments of FIGS. 7A and 7B, i.e. the specifically disclosed arrangement of layers, may be combined with any of the aforedescribed embodiments unless such combination is not contradictory.

Referring to the embodiments of FIGS. 7A and 7B, a display 700 may include a display panel 601, a window 692, a first protection layer 680, a second protection layer 671, and a third protection layer 670.

The configurations of the display panel 601, the window 692, the first layer 691, the second layer 693, the adhesive layers 603, 604 and 605, the first protection layer 680, the second protection layer 671, and/or the third protection layer 670 may be similar to those included in the display 330 of FIGS. 6A to 6F. Description of the same and similar configuration as described in FIGS. 6A to 6F will be omitted.

According to an embodiment, the window 692 may be disposed on one surface of the display panel 601 facing the outside of the electronic device (e.g., the electronic device 300 of FIG. 3A) to protect the display panel 601 and transmit light emitted from the display panel 601 to the outside to provide visual information. The display 330 may further include a coating layer 602, a first layer 691, a window 692, a second layer 693, and adhesive layers 603, 604, and 605 disposed between the first layer 691, the window 692, and the second layer 693.

According to an embodiment, layers disposed in a direction in which one surface of the first protection layer 680 facing the first support plate and the second support plate is facing may have a space (e.g., a space g of FIG. 6A). The space may be a space surrounded by at least a part of the first protection layer 680, the first support plate 611 or 711, the second support plate 612 or 712, the second protection layer 671, the third protection layer 670, the fastening part 720, or the adhesive layers 672 or 673. The space may form a divided structure between layers disposed under the first region p1 and layers disposed under the second region p2. The space is expressed as being disposed under the third region p3, but is not limited thereto. For example, the space may be disposed under the first region p1 or the second region p2.

According to an embodiment, the fastening part 720 is described as a separate adhesive member, but is not limited thereto, and when the spaced distance between the first support plate 611 or 711 and the second support plate 612 or 712 is less than or equal to the reference interval, the fastening part 720 may be replaced by a joint part by welding.

Referring to the embodiment of FIG. 7A, according to an embodiment, adhesive layers 672 and 673 may be disposed on both surfaces of the third protection layer 670. The third protection layer 670 may be coupled to the first protection layer 680 and the second support plate 712 by the adhesive layers 672 and 673.

According to an embodiment, the first support plate 611 may be disposed between the cushion layer 630 and the second protection layer 671. The cushion layer 630 may reduce the impact transferred to the first support plate 611 to prevent damage to the display panel 601. Although the thickness of the cushion layer 630 is expressed to be thicker than that of the second support plate 712, the thickness of the cushion layer 630 may be formed to have various thicknesses. For example, the thickness of the cushion layer 630 may be less than or equal to the distance from one surface of the first support plate 611 on which the cushion layer 630 is disposed to one surface of the second support plate 712 facing the support bar 650.

According to an embodiment, the second support plate 712 may include an extension region 712A and a support region 712B. The support region 712B may support the second region p2 of the display panel 601. When the display panel 601 is viewed from above, the extension region 712A of the second support plate 712 may overlap a part of the first support plate 611 and the fastening part 720 under the third region p3.

According to an embodiment, the support region 712B of the second support plate 712 may be disposed on a part of the second region p2 and the third region p3. The divided parts of the support region 712B of the second support plate 712 may be disposed under the second region p2. The divided parts of the second support plate 712 may be connected to be deformable, based on the state of the electronic device 300. For example, the divided parts of the second support plate 712 may be linked to each other, such as chain coupling or hinge coupling. The divided part of the second support plate 712 may be deformed according to the state of the electronic device 300 by the support bar 650 to guide the shape of the second region p2. The extension region 712A of the second support plate 712 may be formed of one member different from the support region 712B disposed under the second region p2. For example, the extension region 712A may not include openings or spaced spaces of the second region p2.

According to an embodiment, the fastening part 720 may connect the first support plate 611 and the second support plate 712. When the display 700 is viewed from above, the extension region 712A may have a recess in which the fastening part 720 will be seated in a region overlapping the first support plate 611 or the fastening part 720. The fastening part 720 may be disposed in a recess formed in the extension region 712A of the second support plate 712 to fasten the extension region 712A to the first support plate 611. According to an embodiment, the fastening part 720 may be an adhesive member such as a double-sided tape, but is not limited thereto, and the first support plate 611 and the second support plate 712 may be coupled to each other through welding.

Referring to the embodiment of FIG. 7B, according to an embodiment, both surfaces of the third protection layer 670 may include adhesive layers 672 and 673. The third protection layer 670 may be coupled to the first protection layer 680 and the second support plate 612 by the adhesive layers 672 and 673.

According to an embodiment, the first support plate 711 may be disposed between the cushion layer 630 and the second protection layer 671. The cushion layer 630 may reduce the impact transferred to the first support plate 711 to prevent damage to the display panel 601.

Although the thickness of the cushion layer 630 is expressed to be thicker than that of the second support plate 612, the thickness of the cushion layer 630 may be formed to have various thicknesses. For example, the thickness of the cushion layer 630 may be less than or equal to the distance from one surface of the first support plate 711 on which the cushion layer 630 is disposed to one surface of the second support plate 612 facing the support bar 650.

According to an embodiment, the first support plate 711 and the second support plate 612 may be connected to each other by the fastening part 720. The region 711A of the first support plate 711 overlapping the extension region 612A (e.g. extension region 612A in FIG. 6A) of the second support plate 612 may provide a recess in which the fastening part 720 will be seated.

According to this configuration, when the display panel 601 is viewed from above, the region 711A of the first support plate 711 may overlap a part of the extension region 612A of the second support plate 612 and the fastening part 720 under the third region p3. According to an embodiment, the fastening part 720 may connect the first support plate 711 and the second support plate 612. The fastening part 720 may be disposed in a recess formed under the region 711A of the first support plate 711 to fasten the first support plate 711 to the second support plate 612.

According to an embodiment, the fastening part 720 is described as a separate adhesive member, but is not limited thereto, and when the distance between the first support plate 711 and the second support plate 612 is less than or equal to a reference interval, the fastening part 720 may be replaced by a joint part by welding.

According to the above-described embodiment, the display 700 may provide a structure for reducing the viewing of the third region p3 between the first region p1 and the second region p2. The fastening part 720 may connect the separated first support plate 611 or 711 and the second support plate 612 or 712 to each other. The display panel 601 supported by the first support plate 611 or 711 and the second support plate 612 or 712 connected by the fastening part 720 may maintain a substantially planar shape and reduce a step. The display 700 may prevent the boundary region under the third region p3 from being viewed from the outside of the electronic device 300 by reducing the step of the display 700 including the display panel 601.

Figure 8A:
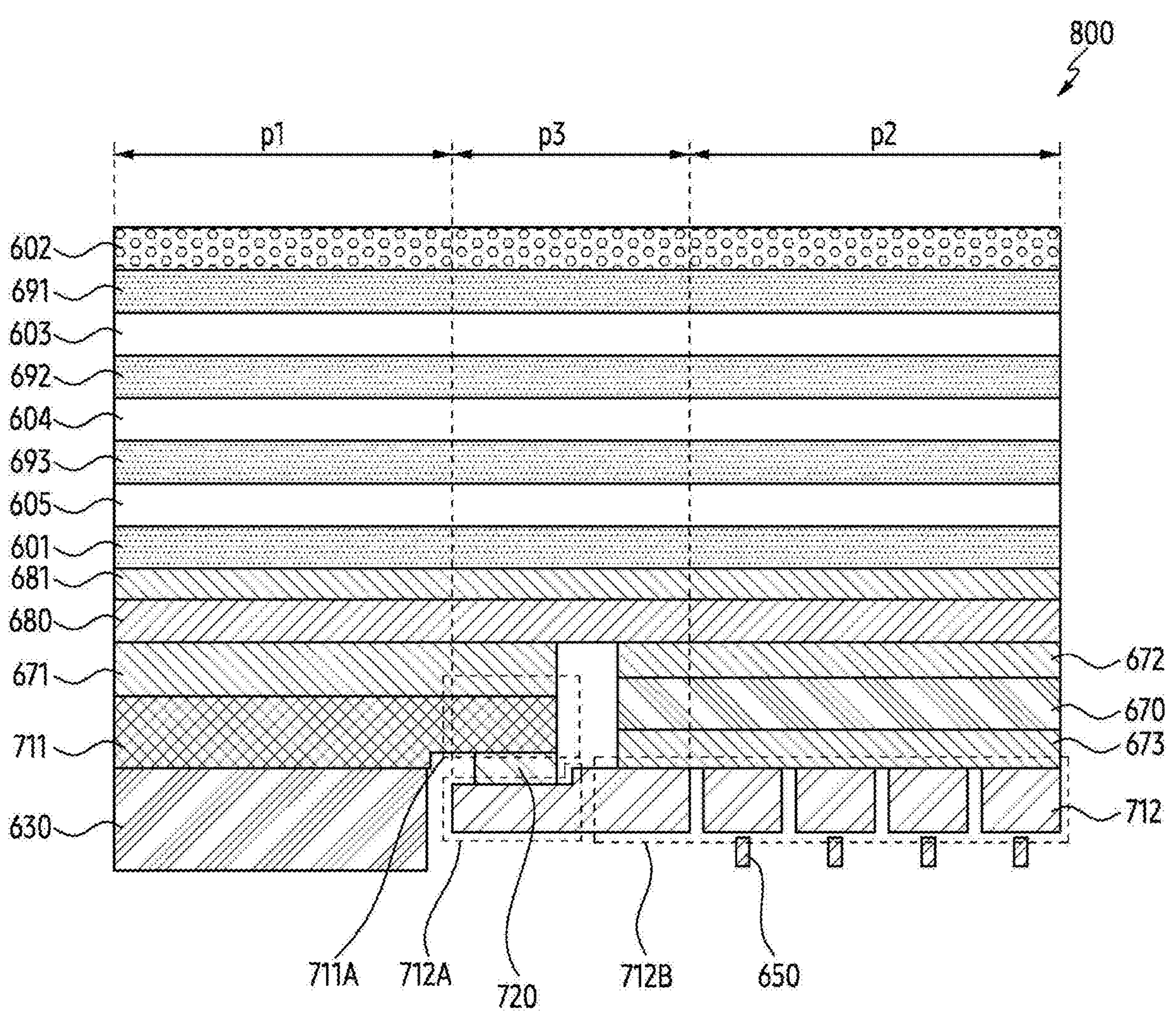
FIGS. 8A and 8B are deformed examples of the first support plate and the second support plate of the display, according to an embodiment.
Figure 8B:
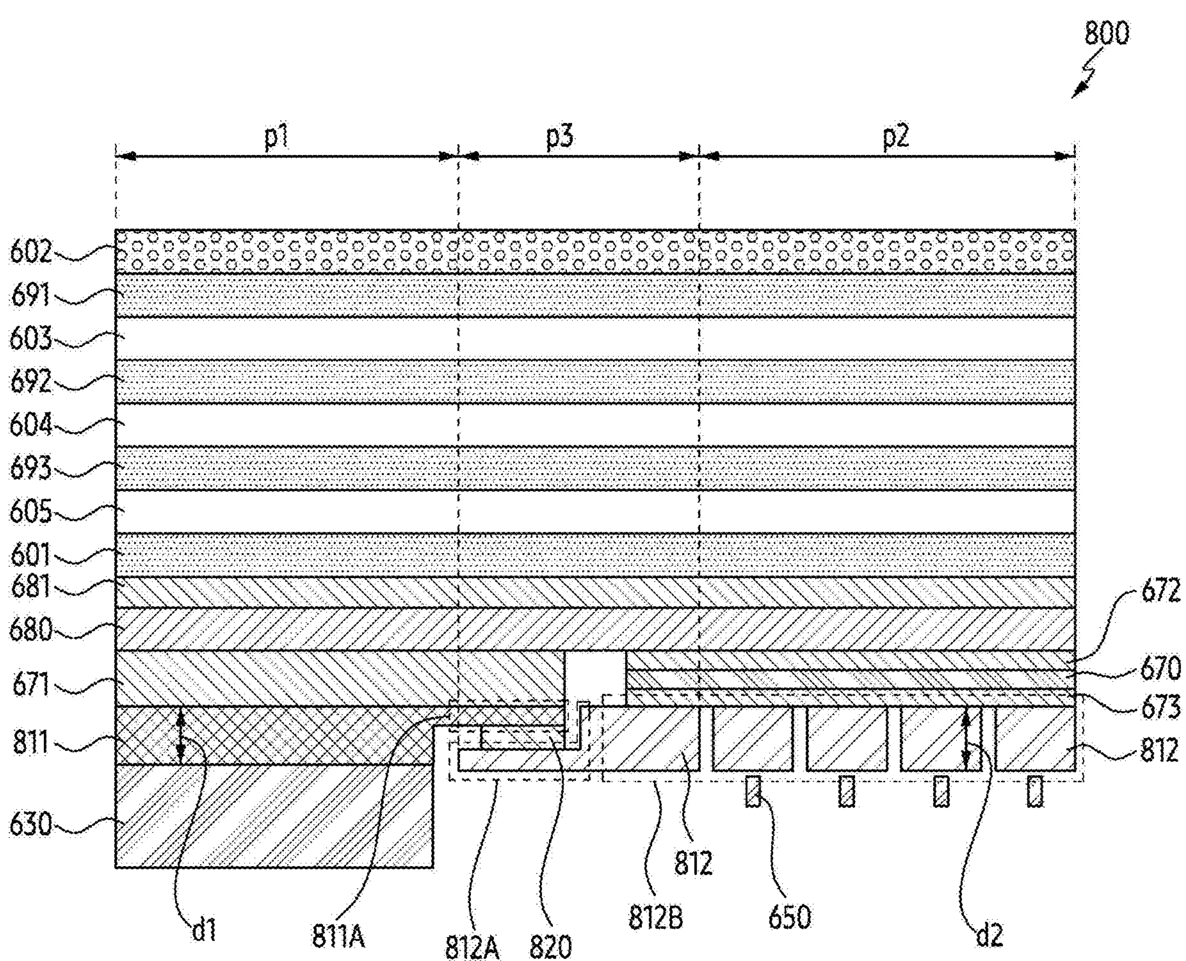

FIGS. 8A and 8B are deformed examples of the first support plate and the second support plate of the display, according to an embodiment. The embodiments of FIGS. 8A and 8B, i.e. the specifically disclosed arrangement of layers, may be combined with any of the aforedescribed embodiments unless such combination is not contradictory.

Referring to the embodiments of FIGS. 8A and 8B, a display 800 may include a display panel 601, a window 692, a first protection layer 680, a second protection layer 671, and a third protection layer 670.

The configurations of the display panel 601, the window 692, the first layer 691, the second layer 693, the adhesive layers 603, 604, 605, the first protection layer 680, the second protection layer 671, and the third protection layer 670 may be similar to those included in the displays 330 and 700 of FIGS. 6A to 7B. A description of the same and similar configuration as described in FIGS. 6A to 7B will be omitted.

According to an embodiment, the window 692 may be configured to protect the display panel 601 by being attached to one surface of the display panel 601 facing the outside of the electronic device (e.g., the electronic device 300 of FIG. 3A), and provide visual information by transmitting light emitted from the display panel 601 to the outside. The display 800 may include the coating layer 602, the first layer 691, the window 692, the second layer 693, and adhesive layers 603, 604, and 605 disposed between the first layer 691, the window 692, and the second layer 693.

According to an embodiment, layers disposed in a direction in which one surface of the first protection layer 680 facing the first support plate and the second support plate is facing may have a space (e.g., a space g of FIG. 6A). The space may be a space surrounded by at least a part of the protection layer 680, the first support plate 711 or 811, the second support plate 712 or 812, the second protection layer 671, the third protection layer 670, the fastening part 720 and 820, or the adhesive layers 672 and 673. The space may form a divided structure of layers disposed under the first region p1 and layers disposed under the second region p2. The space is expressed as being disposed under the third region p3, but is not limited thereto. For example, the space may be disposed under the first region p1 or the second region p2.

Referring to the embodiment of FIG. 8A, according to an embodiment, both surfaces of the third protection layer 670 may include adhesive layers 672 and 673. The third protection layer 670 may be coupled to the first protection layer 680 and the second support plate 712 by the adhesive layers 672 and 673.

According to an embodiment, the first support plate 711 may be disposed between the cushion layer 630 and the second protection layer 671. The cushion layer 630 may reduce the impact transmitted to the first support plate 711 to prevent damage to the display panel 601. Although the thickness of the cushion layer 630 is expressed to be thicker than that of the second support plate 712, the thickness of the cushion layer 630 may be formed to have various thicknesses. For example, the thickness of the cushion layer 630 may be less than or equal to the distance from one surface of the first support plate 711 on which the cushion layer 630 is disposed to one surface of the second support plate 712 facing the support bar 650.

According to an embodiment, the second support plate 712 may include the extension region 712A and the support region 712B. The support region 712B may support a part of the second region p2 and the third region p3 of the display panel 601. When the display panel 601 is viewed from above, the extension region 712A of the second support plate 712 may overlap a part of the first support plate 711 and the fastening part 720 under the third region p3.

According to an embodiment, the support region 712B of the second support plate 712 may be disposed on a part of the second region p2 and the third region p3. The divided parts of the second support plate 712 may guide the shape of the second region p2 that is deformed according to the state of the electronic device 300 by the support bar 650. The extension region 712A of the second support plate 712 may be formed as a single member differently from the divided part under the second region p2.

When the display 800 is viewed from above, each of the first support plate 711 and the second support plate 712 may form a recess for seating the fastening part 720 in region overlapping each other. The first support plate 711 and the second support plate 712 may be connected to each other by the fastening part 720. When the display 800 is viewed from above, the extension region 712A may have a recess in which the fastening part 720 will be seated in a region overlapping the first support plate 711 or the fastening part 720. The fastening part 720 may be disposed in a recess formed under the extension region 712A of the second support plate 712 to fasten the extension region 712A to the first support plate 711.

According to an embodiment, the region 711A of the first support plate 711 overlapping the extension region 712A of the second support plate 712 may provide a recess in which the fastening part 720 will be seated. The fastening part 720 may be disposed in a space surrounded by a recess formed under the first support plate 711 and a recess formed under the second support plate 712 to connect the first support plate 711 and the second support plate 712. According to an embodiment, the fastening part 720 may be an adhesive member such as a double-sided tape, but is not limited thereto, and the first support plate 711 and the second support plate 712 may be coupled by welding.

Referring to the embodiment of FIG. 8B, the first support plate 811 and the second support plate 812 may be disposed on substantially the same surface. For example, the distance between the first support plate 811 and the display panel 601 may be substantially the same distance between the second support plate 812 and the display panel 601. According to an embodiment, the thickness of the first support plate 811 may be the first length d1, and the thickness of the second support plate 812 may be the second length d2. The first length d1 may be formed equal to the second length d2.

According to an embodiment, in a case that the second length d2 which is the thickness of the second support plate 812 becomes thicker, or the thickness of at least one of the adhesive layers 672 and 673 or the third protection layer 670 becomes thin, when the display 800 is viewed from the side surface (e.g., the side surface in the +y direction or the −y direction in FIG. 3A) of the electronic device 300 (e.g., the electronic device 300 in FIG. 3A), a side surface of the first support plate 811 under the third region (e.g., the third region p3 of FIG. 5) between the first region p1 and the second region p2 may overlap a side surface of the second support plate 812 under the third region p3.

According to an embodiment, when the second support plate 812 extends to the third region p3, it may interfere with the first support plate 811. The first support plate 811 and the second support plate 812 may form a recess to prevent interference between the first support plate 811 and the second support plate 812. For example, the first support plate 811 may form a recess in the region 811A overlapping the extension region 812A of the second support plate 812. When the display 800 is viewed from a side surface of the electronic device 300 (e.g., a side surface in the +y direction or the −y direction of FIG. 3A), the second support plate 812 may form a recess in the extension region 812A of the second support plate 812 overlapping the region 811A of the first support plate 811. The fastening part 820 may be disposed in a space surrounded by the first support plate 811 and the second support plate 812, and may connect the first support plate 811 and the second support plate 812. According to an embodiment, the fastening part 720 or 820 is described as a separate adhesive member, but is not limited thereto, and when the spaced distance between the first support plate 711 or 811 and the second support plate 712 or 812 is less than or equal to the reference interval, the fastening part 720 or 820 may be replaced by a joint part by welding. According to an embodiment, the first support plate 811 may be disposed between the cushion layer 630 and the second protection layer 671. The cushion layer 630 may reduce the impact transferred to the first support plate 811 to prevent damage to the display panel 601. The thickness of the cushion layer 630 disposed on the first support plate 811 may be formed to have various thicknesses.

In an embodiment, the cushion layer 630 may be disposed on the first support plate 811 and the extension region 812A. For example, the cushion layer 630 may be disposed on the first support plate 811 and the second support plate 812 on the third region p3.

According to the above-described embodiment, the display 800 may provide a structure for reducing the viewing of a boundary between the first region p1 and the second region p2. The fastening part 720 or 820 may connect the separated first support plate 711 or 811 and the second support plate 712 or 812 to each other. The display panel 601 supported by the first support plate 711 or 811 and the second support plate 712 or 812 connected by the fastening part 720 or 820 may maintain a substantially planar shape and may not include a step. The display 800 may prevent the boundary region from being viewed from the outside of the electronic device 300.

According to an embodiment, the first support plate 711 and the second support plate 712 of FIG. 8A may form a recess in overlapping regions to provide a space in which the fastening part 720 may be disposed, and thus the first support plate 711 and the second support plate 712 may be connected to each other.

According to an embodiment, in a case of forming a recess in each of the first support plate 811 and the second support plate 812 of FIG. 8B, the first support plate 811 and the second support plate 812 may be disposed to overlap each other, when the display 800 is viewed from the side. Space efficiency may be improved through overlapping arrangements of the first support plate 811 and the second support plate 812.

Figure 9A:
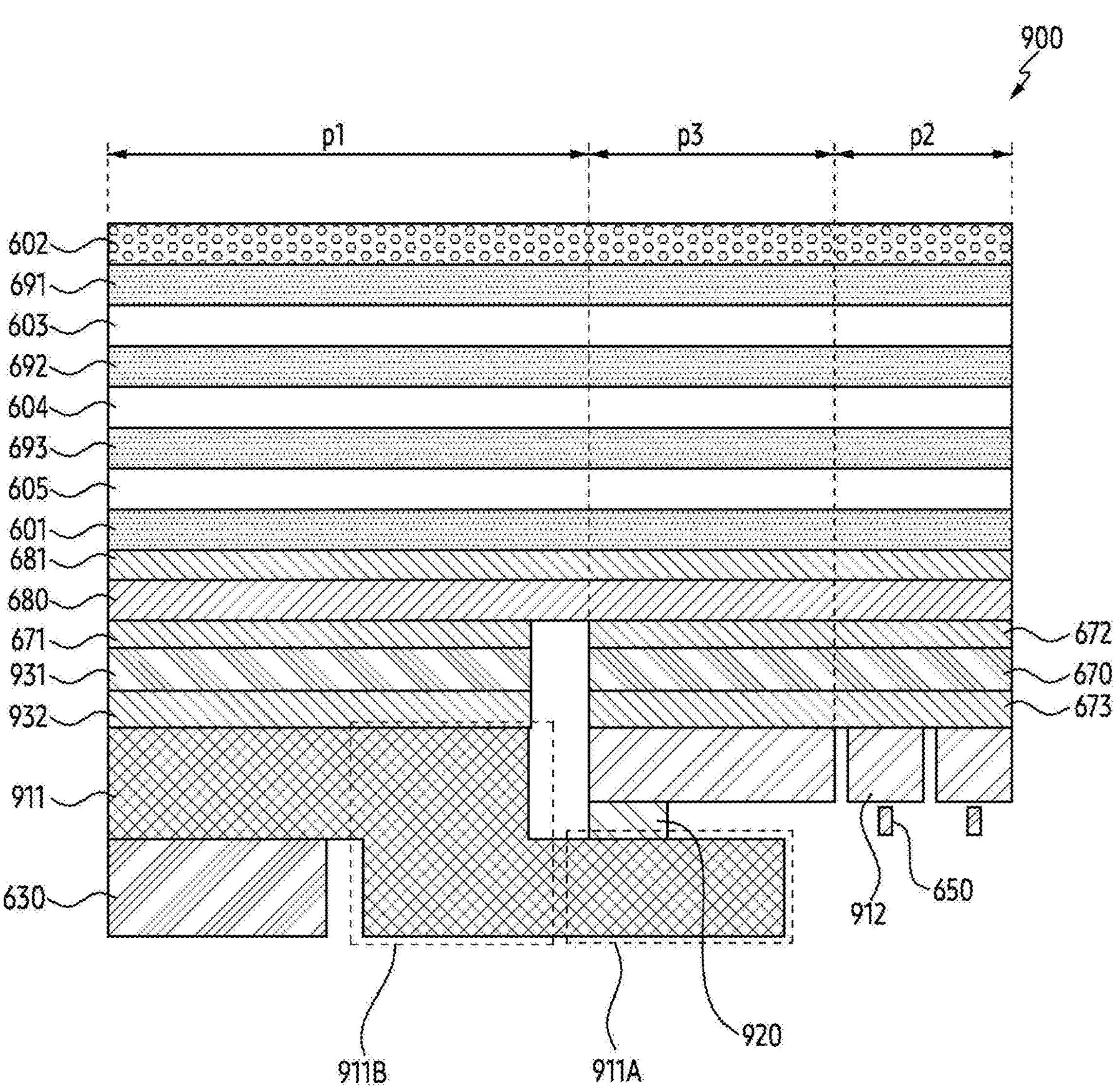
FIG. 9A illustrates a bent first support plate of a display according to an embodiment.
Figure 9B:
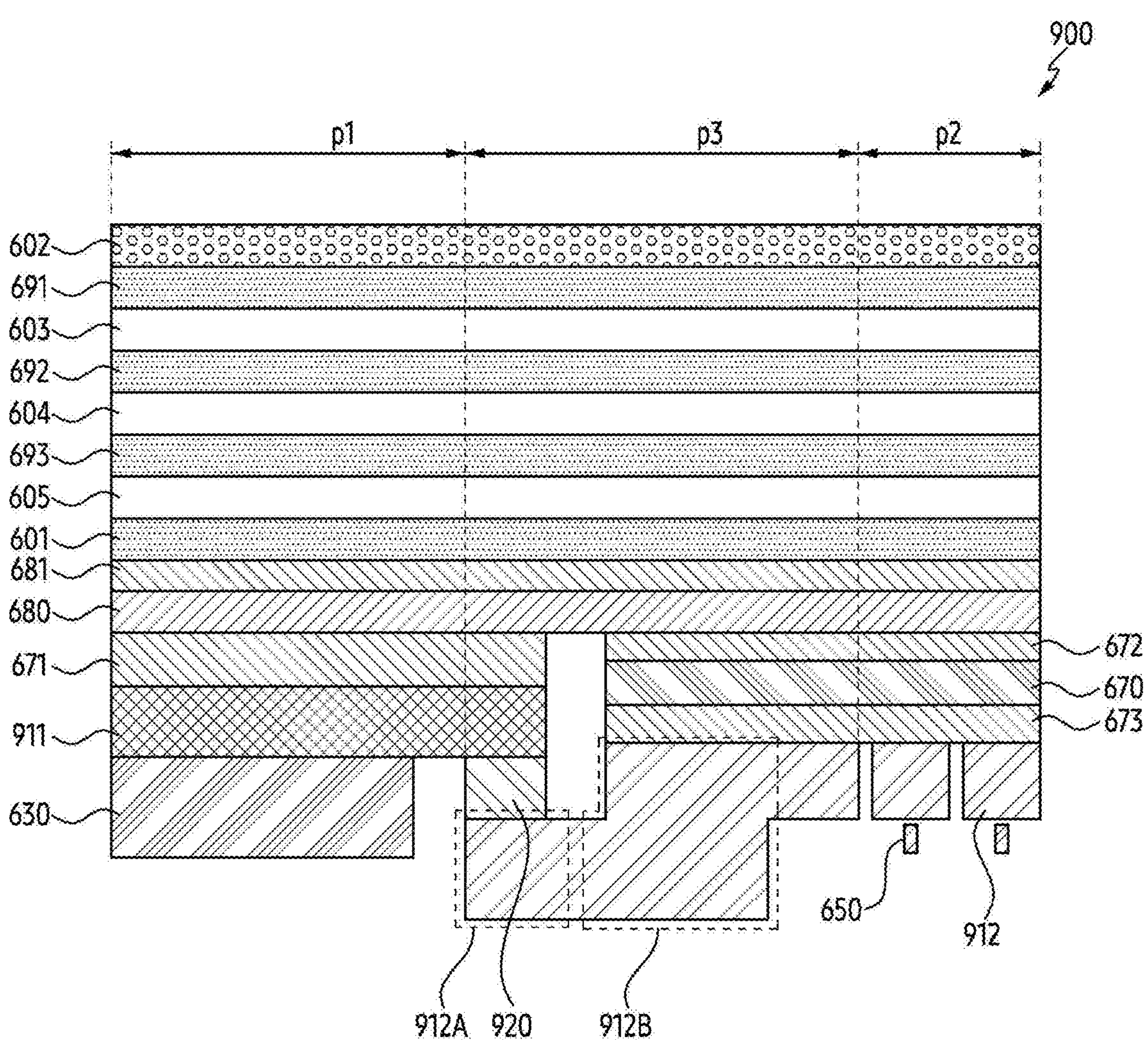
FIG. 9B illustrates a bent second support plate of a display according to an embodiment.
Figure 9C:
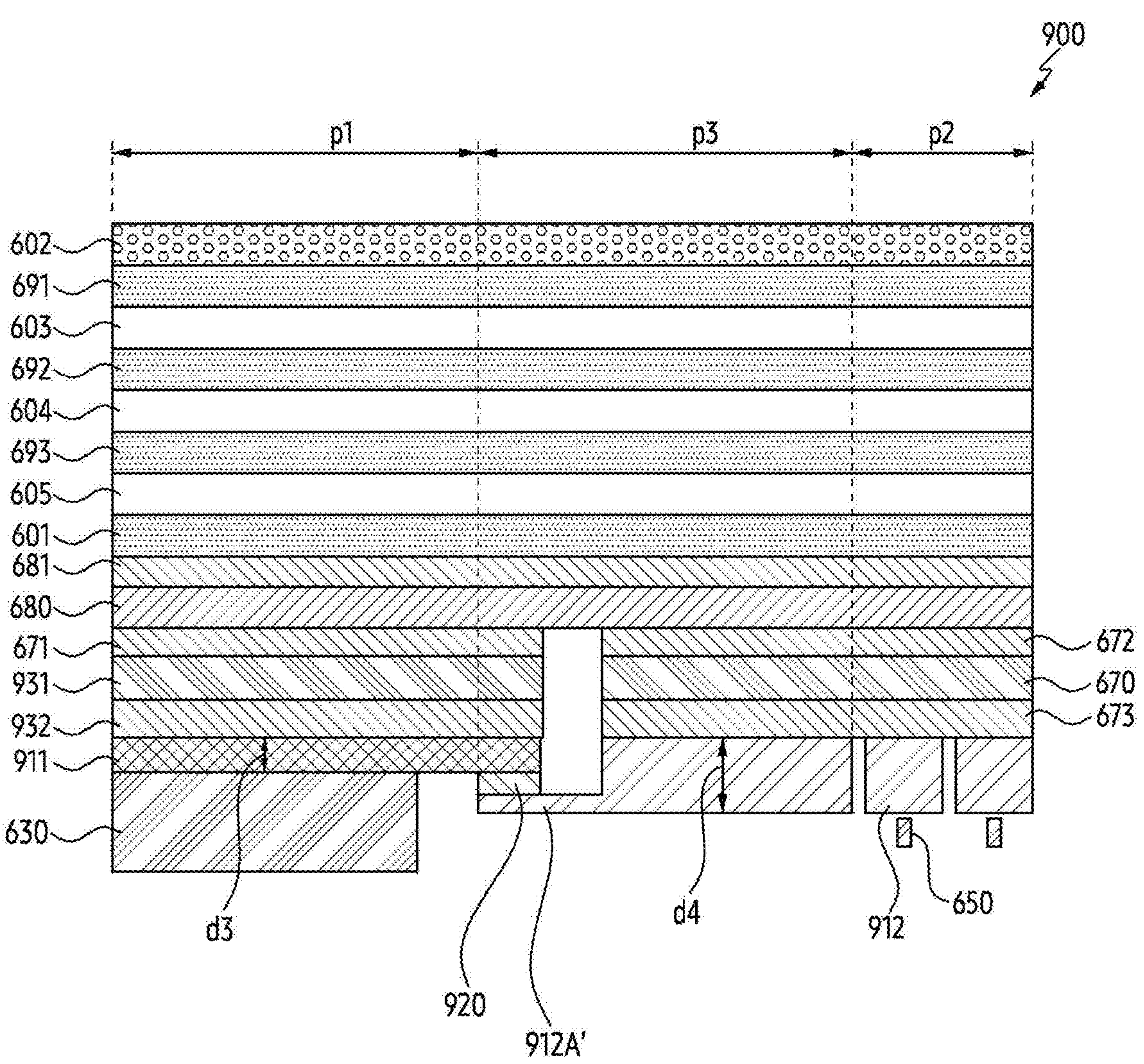
FIG. 9C illustrates a first support plate and a second support plate having different thicknesses from each other in a display according to an embodiment.

FIG. 9A illustrates a bent first support plate of a display according to an embodiment. FIG. 9B illustrates a bent second support plate of a display according to an embodiment. FIG. 9C illustrates a first support plate and a second support plate having different thicknesses from each other in a display according to an embodiment. The embodiments of FIGS. 9A to 9C, i.e. the specifically disclosed arrangement of layers, may be combined with any of the aforedescribed embodiments unless such combination is not contradictory.

Referring to the embodiments of FIGS. 9A, 9B, and 9C, a display 900 may include a display panel 601, a window 692, a first protection layer 680, a second protection layer 671, and a third protection layer 670.

The configurations of the display panel 601, the window 692, the first layer 691, the second layer 693, the adhesive layers 603, 604, 605, the first protection layer 680, the second protection layer 671, and the third protection layer 670 may be similar to those included in the displays 330, 700, and 800 of FIGS. 6A to 8B. A description of the same and similar configuration as described in FIGS. 6A to 8B will be omitted.

According to an embodiment, since the window may be disposed on one surface of the display panel 601 facing the outside of the electronic device (e.g., the electronic device 300 of FIG. 3A) to protect the display panel 601 and transmit light emitted from the display panel 601 to the outside, it may be configured to provide visual information. The display 900 may further include a coating layer 602, a first layer 691, a window 692, a second layer 693, the first layer 691, the window 692, and adhesive layers 603, 604, and 605 disposed between the second layers 693.

According to an embodiment, layers disposed in a direction in which one surface of the first protection layer 680 facing the first support plate and the second support plate is facing may have a space. According to an embodiment, layers disposed in a direction where one surface of the first protection layer 680 facing the first support plate and the second support plate is facing may have spaces. The space may be a space surrounded by at least a part of the first protection layer 680, the fourth protection layer 931, the second protection layer 671, the first support plate 911, the second support plate 912, the third protection layer 670, the fastening part 920, or the adhesive layers 672, 673, and 932 under the third region p3. The space may form a divided structure between layers disposed under the first region p1 and layers disposed under the second region p2. The space is expressed as being disposed under the third region p3, but is not limited thereto. For example, the space may be disposed under the first region p1 or the second region p2.

Referring to the embodiment of FIG. 9A, the fourth protection layer 931 may be disposed between the first support plate 911 and the second protection layer 671. The fourth protection layer 931 may include a polymer having elasticity that is the same as or similar to the third protection layer 670. The fourth protection layer 931 may be formed of a TPU material. For example, the adhesive layer 932 may be a PSA or an OCA.

According to an embodiment, the first support plate 911 may support a part of the first region p1 and the third region p3 of the display panel 601. The second support plate 912 may support a part of the second region p2 and the third region p3. For example, the first support plate 911 may at least partially overlap the second support plate 912 under the third region p3. The first support plate 911 may include a bending region 911B and an extension region 911A. Under the first region p1, the first support plate 911 may include a bending region 911B extending in a first direction in which another surface (e.g., a surface facing the cushion layer 630) facing one surface in contact with the adhesive layer 932 faces and bent in a second direction substantially perpendicular to the first direction. The bending region 911B may be bent toward the third region p3 in which the second support plate 912 is positioned. The first support plate 911 may further include the extension region 911A extending from the bending region 911B to the third region p3. The extension region 911A may overlap a part of the second support plate 912 under the third region p3 when the display 900 is viewed from above. The region overlapping the second support plate 912 may be a part of the extension region 911A. The second support plate 912 may not overlap the support bar 650 in a region overlapping the first support plate 911 and may overlap the support bar 650 in a region not overlapping the first support plate 911. For example, the support bar 650 may be disposed under the second region p2. The second support plate 912 may be supported by the support bar 650 under the second region p2, and may not be in contact with the support bar under the third region p3.

According to an embodiment, the first support plate 911 may be disposed between the cushion layer 630 and the second protection layer 671 (or the adhesive layer 932). The first support plate 911 may be coupled to the fourth protection layer 931 through the adhesive layer 932. The cushion layer 630 may reduce the impact transferred to the first support plate 911 to prevent damage to the display panel 601. The thickness of the cushion layer 630 may be formed to various thicknesses.

In an embodiment, the cushion layer 630 may be disposed under the first support plate 911. The cushion layer 630 may have a shape corresponding to the shape of the first support plate 911 in order to be disposed in the bending region 911B. For example, the cushion layer 630 may have a step part corresponding to the bending region 911B of the first support plate 911.

According to an embodiment, a space may be formed between the extension region 911A of the first support plate 911 and the bending region 911B and the second support plate 912. A fastening part 920 may be disposed between the extension region 911A of the first support plate 911 and the second support plate 912. The fastening part 920 may couple the extension region 911A of the first support plate 911 and the second support plate 912. According to an embodiment, the fastening part 920 may be an adhesive member such as a double-sided tape, but is not limited thereto, and the first support plate 911 and the second support plate 912 may be coupled by welding.

Referring to the embodiment of FIG. 9B, according to an embodiment, adhesive layers 672 and 673 may be disposed on both surfaces of the third protection layer 670. The third protection layer 670 may be coupled to the first protection layer 680 and the second support plate 912 by the adhesive layers 672 and 673.

According to an embodiment, the first support plate 911 may be disposed between the cushion layer 630 and the second protection layer 671. The cushion layer 630 may reduce the impact transferred to the first support plate 911 to prevent damage to the display panel 601. The thickness of the cushion layer 630 may be formed to various thicknesses. In an embodiment, the cushion layer 630 may be disposed on the first support plate 911 and the extension region 912A. For example, on the first region p1, the cushion layer 630 may be disposed in the extension region 912A of the first support plate 911 and the second support plate 912.

According to an embodiment, the first support plate 911 may support the first region p1 of the display panel 601. The second support plate 912 may support a part of the first region p1, the second region p2, and the third region p3. under the third region p3, the second support plate 912 may include a bending region 912B extending in a first direction facing another surface (e.g., the surface facing the support bar 650) facing one surface in contact with the adhesive layer 673 and bent in a second direction substantially perpendicular to the first direction. The bending region 912B may be bent toward the first region p1 where the first support plate 911 is positioned. The second support plate 912 may further include the extension region 912A extending from the bending region 912B. The extension region 912A may overlap the first support plate 911 when the display 900 is viewed from above. According to an embodiment, the fastening part 920 may be disposed between the extension region 912A of the second support plate 912 and the first support plate 911 by the space formed by the bending region 912B and the extension region 912A. The fastening part 920 may include an adhesive member and may couple the first support plate 911 and the second support plate 912.

According to an embodiment, the fastening part 920 is described as a separate adhesive member, but is not limited thereto, and when the spaced distance between the first support plate 911 and the second support plate 912 is less than or equal to a reference interval, the fastening part 920 may be replaced by a joint part by welding.

Referring to the embodiment of FIG. 9C, the first support plate 911 and the second support plate 912 may be disposed on substantially a same surface. For example, the distance between the first support plate 911 and the display panel 601 may be the same as the distance between the second support plate 912 and the display panel 601. According to an embodiment, the thickness of the first support plate 911 may be a third length d3, and the thickness of the second support plate 912 may be a fourth length d4. The third length d3 may be shorter than the fourth length d4.

According to an embodiment, the first support plate 911 having a thickness of the third length d3 may ensure a space in which the fastening part 920 may be disposed. For example, the fastening part 920 may be disposed in a region overlapping the first support plate 911 and a part of the second support plate 912.

According to an embodiment, the second support plate 912 may include an extension region 912A' extending to the first region p1. The extension region 912A' of the second support plate 912 may overlap the first support plate 911. The fastening part 920 may be disposed between the extension region 912A' of the second support plate 912 and the first support plate 911. The fastening part 920 may couple the extension region 912A' of the first support plate 911 and the second support plate 912. The fastening part 920 may be an adhesive member such as double-sided tape. According to an embodiment, the first support plate 911 and the second support plate 912 may be connected by welding between the first support plate 911 and the extension region 912A' without disposing the fastening part 920.

In an embodiment, the cushion layer 630 is illustrated to be disposed on the first support plate 911 under the first region p1, but is not limited thereto. The cushion layer 630 may be disposed on the first support plate 911 and the extension region 912A'. For example, the cushion layer 630 may be disposed on the first support plate 911 and the second support plate 912 under the first region p1.

According to the above-described embodiment, the display 900 may provide a structure for reducing the viewing of the third region p3 between the first region p1 and the second region p2. The fastening part 920 may connect the separated first support plate 911 and the second support plate 912 to each other. The display panel 601 supported by the first support plate 911 and the second support plate 912 connected by the fastening part 920 may maintain a substantially planar shape and reduce a step. The display 900 may prevent the boundary region from being viewed from the outside of the electronic device 300.

According to an embodiment, the first support plate 911 may provide the bending region 911B and the extension region 911A to form a space in the overlapping region of the first support plate 911 and the second support plate 912 of FIG. 9A. The extension region 911A may be spaced apart from the second support plate 912 to provide a space in which the fastening part 920 may be disposed, and thus the first support plate 911 and the second support plate 912 may be connected to each other.

According to an embodiment, the second support plate 912 may provide the bending region 912B and the extension region 912A to provide a space for the fastening part 920 to be disposed in the overlapping region of the first support plate 911 and the second support plate 912 of FIG. 9B. The fastening part 920 disposed between the extension region 912A and the first support plate 911 may connect the first support plate 911 and the second support plate 912.

According to an embodiment, the first support plate 911 may be thinly formed to provide a space in which the fastening part 920 will be disposed in the overlapping region of the first support plate 911 and the second support plate 912 of FIG. 9C. The second support plate 912 may provide the extension region 912A' extending toward the first region p1. The extension region 912A' may overlap a part of the thinly formed first support plate 911. The first support plate 911 and the second support plate 912 may be connected to each other by a fastening part 920 disposed between the first support plate 911 and the extension region 912A'.

The display 900 may reduce the occurrence of a step under the third region p3 by connecting the separated first support plate 911 and the second support plate 912.

Figure 10:
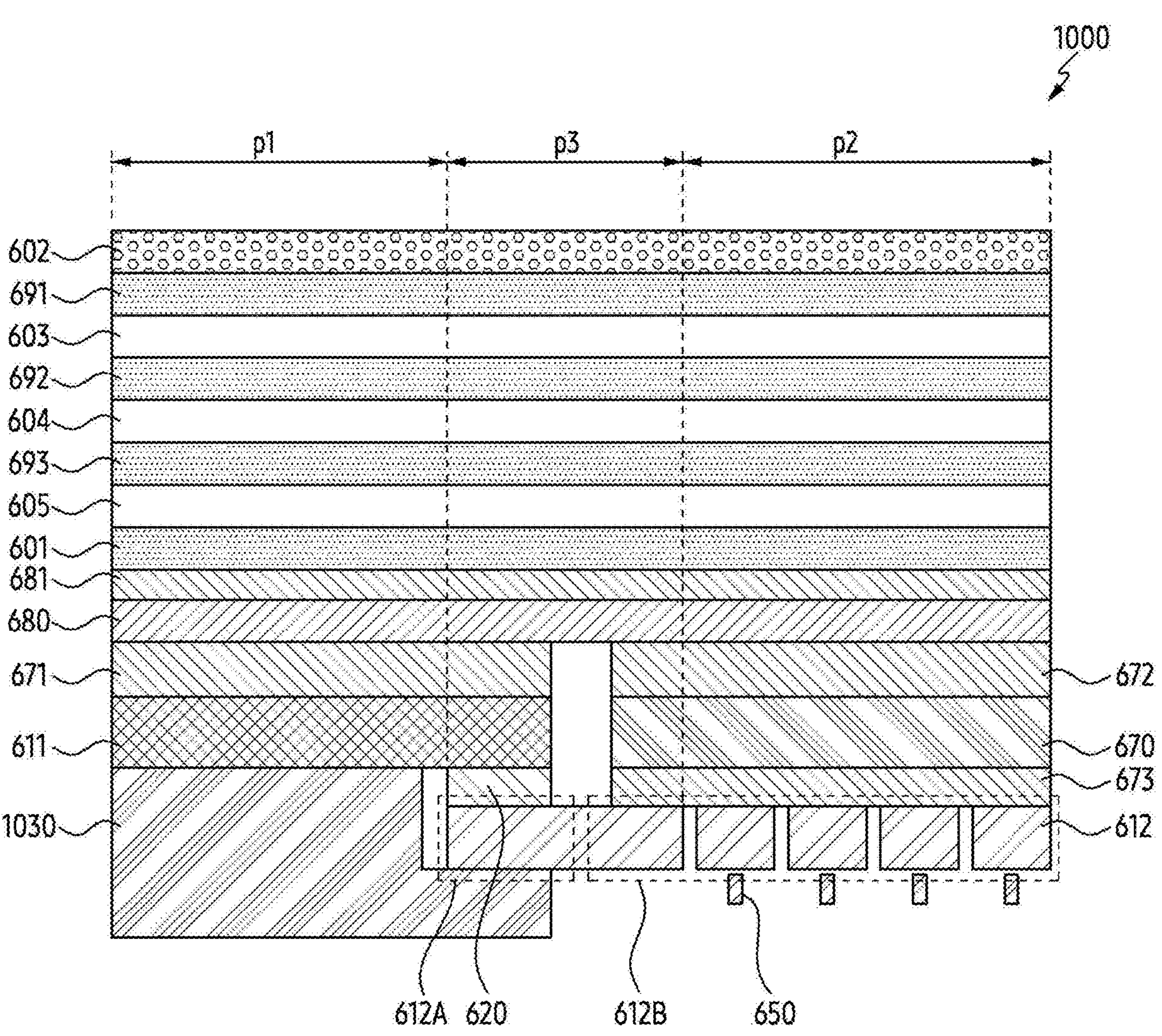
FIG. 10 is a deformed example of a cushion layer of a display according to an embodiment.

FIG. 10 is a deformed example of a cushion layer of a display according to an embodiment. The embodiments of FIG. 10, i.e. the specifically disclosed arrangement of layers, may be combined with any of the aforedescribed embodiments unless such combination is not contradictory.

Referring to the embodiment of FIG. 10, a display 1000 may include a display panel 601, a window 692, a first protection layer 680, a second protection layer 671, and a third protection layer 670.

The configuration of the display 1000 excluding the cushion layer 1030 may be the same as or similar to that of the display 330 of FIG. 6A. For example, the configurations of the display panel 601, the window 692, the first layer 691, the second layer 693, the adhesive layers 603, 604, 605, the first protection layer 680, the second protection layer 671, the third protection layer 670, the support bar 650, the first support plate 611 and the second support plate 612 may be the same as the configuration included in the displays 330, 700, 800, and 900 of FIGS. 6A to 9C. A description of the same and similar configuration as described in FIGS. 6A to 9C will be omitted.

According to an embodiment, the window 692 may be disposed on one surface of the display panel 601 facing the outside of the electronic device (e.g., the electronic device 300 of FIG. 3A) to protect the display panel 601 and transmit light emitted from the display panel 601 to the outside to provide visual information. The display 1000 may further include the coating layer 602, the first layer 691, the window 692, the second layer 693, and adhesive layers 603, 604, and 605 disposed between the first layer 691, the window 692, and the second layer 693.

According to an embodiment, the first support plate 611 and the second support plate 612 may be coupled to each other by the fastening part 620. According to an embodiment, the fastening part 620 may be an adhesive member such as a double-sided tape, but is not limited thereto, and the first support plate 611 and the second support plate 612 may be coupled by welding. The fastening part 620 may be disposed in a space formed by the extension region 612A of the first support plate 611 and the second support plate 612. The support region 612B of the second support plate 612 may support a part of the second region p2 and the third region p3 of the display panel 601. Under the second region p2, the shape of the support region 612B of the second support plate 612 may be guided by the support bar 650.

According to an embodiment, layers disposed in a direction where one surface of the first protection layer 680 facing the first support plate 611 and the second support plate 612 is facing may have a space. The space may be a space surrounded by at least a part of the first protection layer 680, the second protection layer 671, the third protection layer 670, the first support plate 611, the second support plate 612, the fastening part 620, or the adhesive layers 672 and 673 under the third region p3. The space may form a divided structure between layers disposed under the first region p1 and layers disposed under the second region p2. The space is expressed as being disposed under the third region p3, but is not limited thereto. For example, the space may be disposed under the first region p1 or the second region p2.

According to an embodiment, the cushion layer 1030 may be disposed on the first support plate 611. A part of the surface facing the first support plate 611 of the cushion layer 1030 may be in contact with the first support plate 611, and a remainder part distinguished from the part of the cushion layer 1030 may be in contact with the second support plate 612. The remainder part of the cushion layer 1030 may be disposed to overlap the extension region 612A of the second support plate 612. For another example, unlike shown in FIG. 10, the cushion layer 1030 may be disposed on a part of the extension region 612A and the support region 612B of the second support plate 612. For example, the cushion layer 1030 may be disposed under the first region p1 and the third region p3. The cushion layer 1030 may be in contact with the first support plate 611 under the first region p1, and may be in contact with the second support plate 612 under the third region p3. The cushion layer 1030 may prevent the impact transmitted to the cushion layer 1030 from being transmitted to the display panel 601 by surrounding most of the first region p1.

The cushion layer 1030 in contact with the second support plate 612 is not applied only to the modified example in FIG. 6A, but may also be applied to FIGS. 6A to 9C.

According to the above-described embodiment, the display 1000 may provide a cushion layer 1030 surrounding the first support plate 611 and the second support plate 612, thereby reducing the impact of the electronic device transmitted to the display panel 601. The display 1000 may provide a structure capable of preventing damage to the display panel 601 by reducing the impact transmitted to the display panel 601.

Figure 11A:
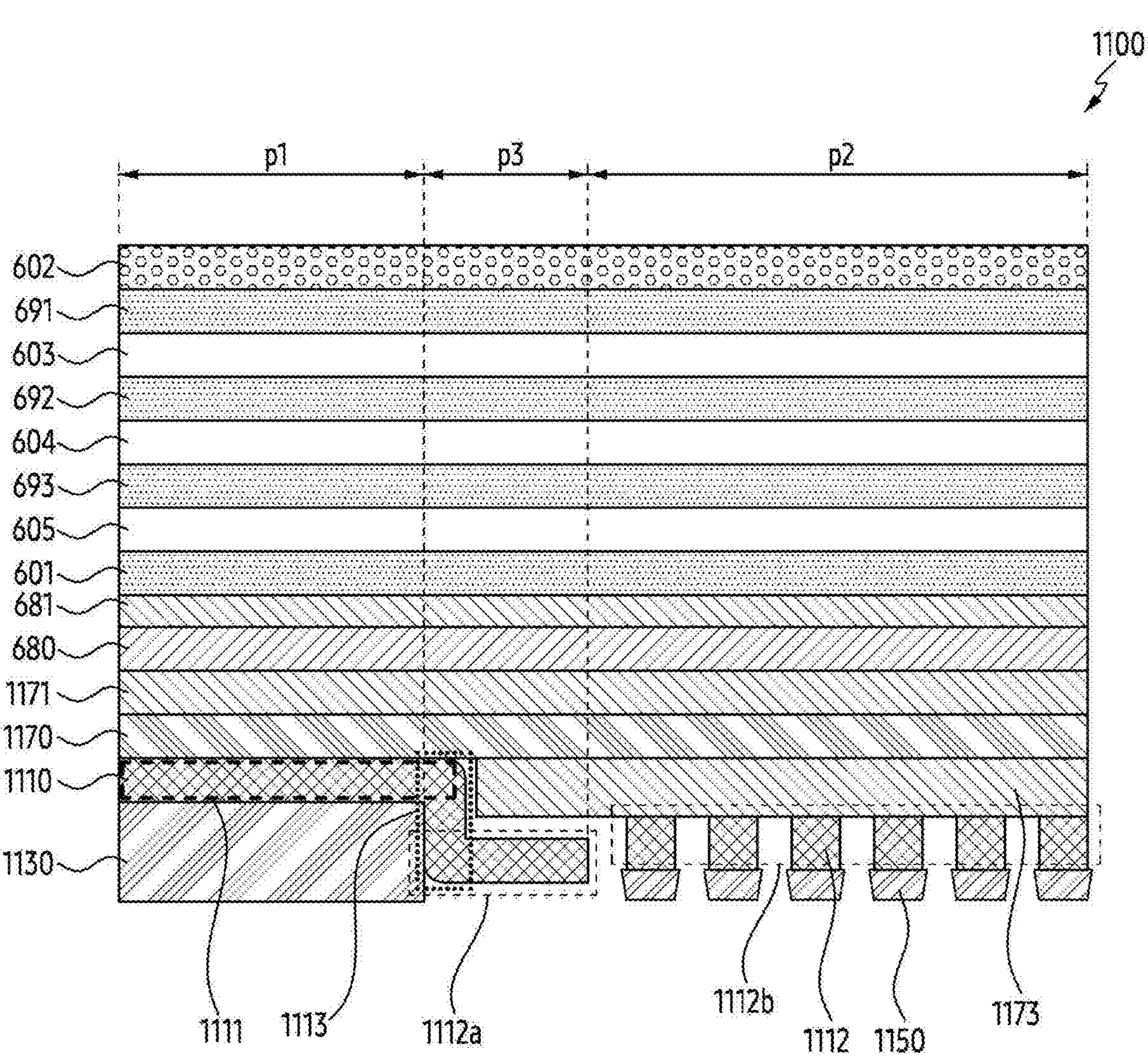
FIG. 11A illustrates an integrated support plate in a display according to an embodiment.
Figure 11B:
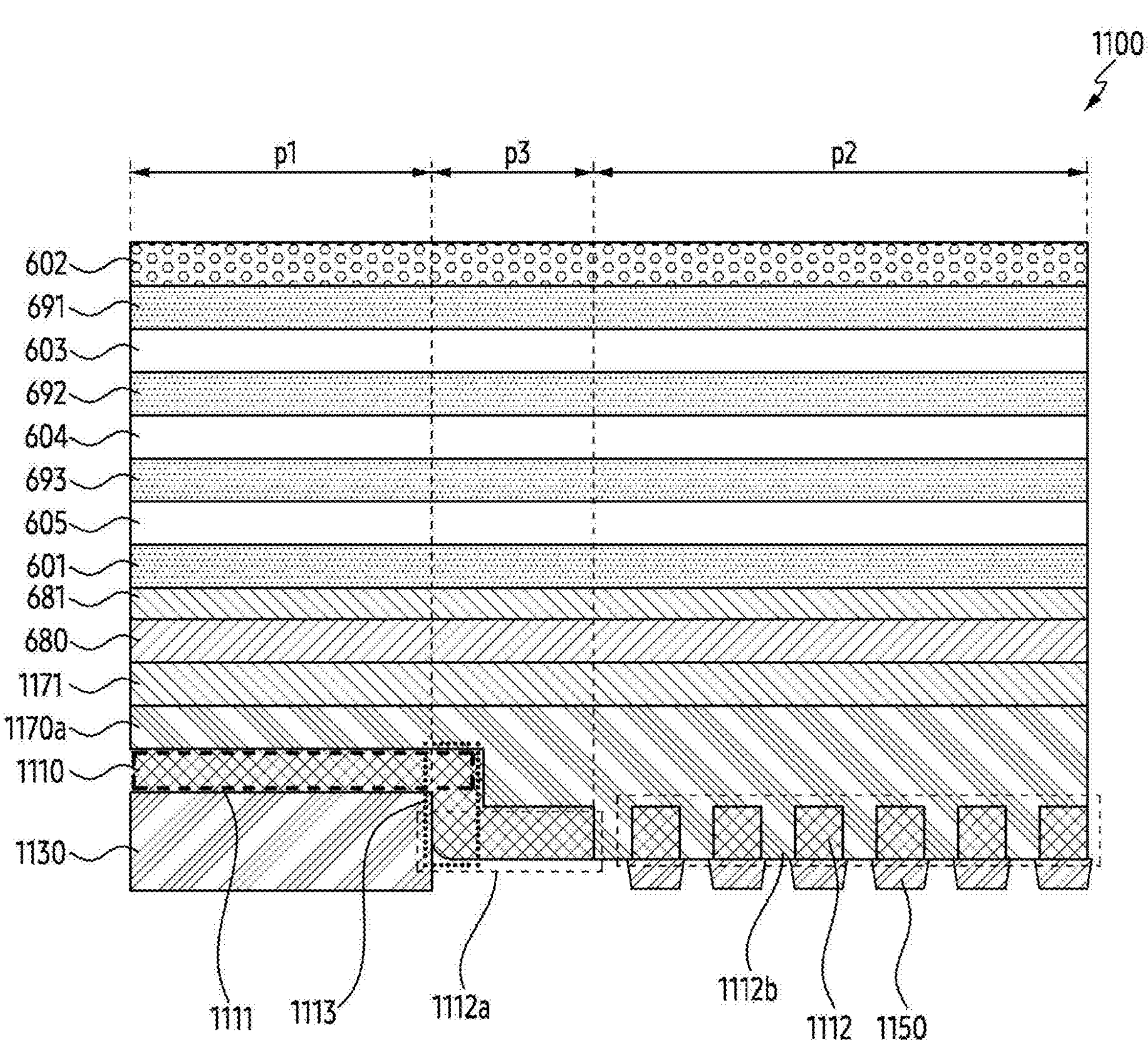
FIGS. 11B and 11C illustrate an example of a display including a fifth protection layer contacting the flexible part of FIG. 11A.
Figure 11C:
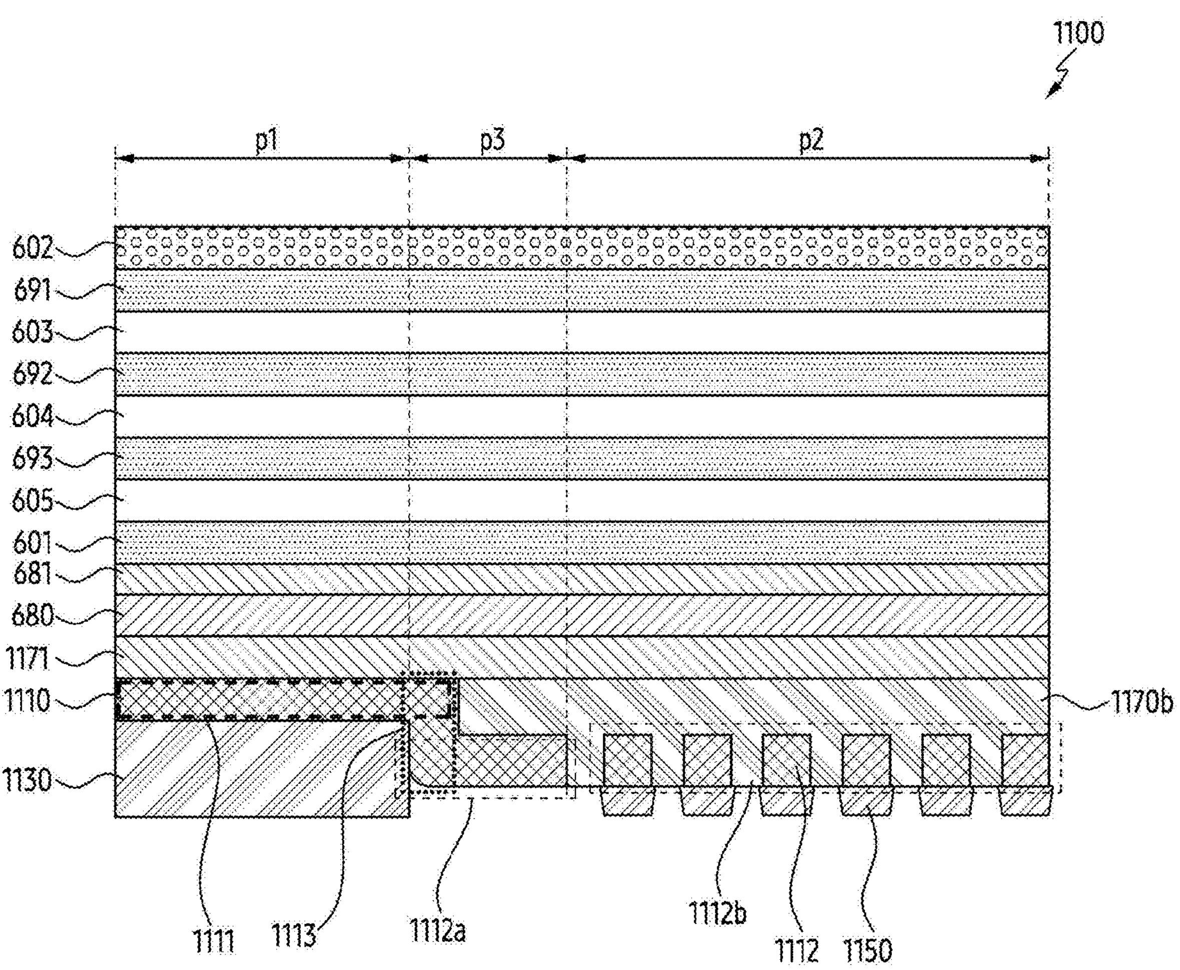

FIG. 11A illustrates an integrated support plate in a display according to an embodiment. FIGS. 11B and 11C illustrate an example of a display including a fifth protection layer contacting the flexible part of FIG. 11A. The embodiments of FIGS. 11A to 11C, i.e. the specifically disclosed arrangement of layers, may be combined with any of the aforedescribed embodiments unless such combination is not contradictory.

Referring to the embodiment of FIG. 11A, a display 1100 may include a display panel 601, a window 692, and a first protection layer 680.

The configurations of the display panel 601, the window 692, the first layer 691, the second layer 693, the adhesive layers 603, 604, 605, and the first protection layer 680 may be the same as those included in the displays 330, 700, 800, 900, and 1000 of FIGS. 6A to 10. A description of a configuration similar to the configuration described in FIGS. 6A to 10 will be omitted.

According to an embodiment, the window 692 may be disposed on one surface of the display panel 601 facing the outside of the electronic device (e.g., the electronic device 300 of FIG. 3A) to protect the display panel 601 and transmit light emitted from the display panel 601 to the outside to provide visual information. The display 1100 may further include a coating layer 602, a first layer 691, a window 692, a second layer 693, and adhesive layers 603, 604, and 605 disposed between the first layer 691, the window 692, and the second layer 693.

According to an embodiment, the display 1100 may further include a fifth protection layer 1170. The fifth protection layer 1170 may be disposed between the support plate 1110 and the first protection layer 680. An adhesive layer 1171 may be disposed between the fifth protection layer 1170 and the first protection layer 680. According to an embodiment, the fifth protection layer 1170 may be coupled to the first protection layer 680 by the adhesive layer 1171. The fifth protection layer 1170 may be coupled to the support plate 1110 by an adhesive layer 1173. The fifth protection layer 1170 may be formed of a polymer material having elasticity. For example, the fifth protection layer 1170 may include TPU, PET, PI, or a combination thereof. According to an embodiment, the support plate 1110 may include a rigid part 1111 disposed under the first region p1, a flexible part 1112 disposed under the second region p2 and the third region p3, and an extension part 1113 connecting the rigid part 1111 and the flexible part 1112. The rigid part 1111 of the support plate 1110 may support the display panel 601 of the first region p1. The flexible part 1112 of the support plate 1110 may be disposed under the second region p2 and the third region p3. The flexible part 1112 may include a first flexible part **1112*a* disposed under the third region p3 and a second flexible part 1112*b* disposed under the second region p2. The second flexible part 1112*b* may be formed of an opening formed parallel to a boundary between the first region p1 and the second region p2, a recess, or a combination thereof, and may be deformed based on a state of the electronic device 300, like the above-described second support plate (e.g., the second support plate 612 of FIG. 6A). The support bar 1150 may be disposed at a position corresponding to the second flexible part 1112*b*. The flexible part 1112 of the support plate 1110 may be in contact with the fifth protection layer 1170 through the adhesive layer 1173**.

According to an embodiment, a boundary between the first flexible part **1112*a* and the second flexible part 1112*b* is expressed as being disposed at a boundary between the second region p2 and the third region p3, but is not limited thereto. The boundary between the first flexible part 1112*a* and the second flexible part 1112*b* may be disposed under the first region p1 or under the third region p3**.

According to an embodiment, the extension part 1113 may be configured to connect the rigid part 1111 and the flexible part 1112. The support plate 1110 may have a shape that is bent from the rigid part 1111 to the flexible part 1112 through the extension part 1113. The thickness of the first flexible part **1112*a* may be different from the thickness of the second flexible part 1112*b*. For example, the first flexible part 1112*a* may be configured to have the same thickness as the rigid part 1111, and the second flexible part 1112*b* may be thicker than the first flexible part 1112*a*. The second flexible part 1112*b* may prevent the impact transmitted from the support bars 1150 from being transmitted to the display panel 601**.

A part of the support plate 1110 may be in contact with the cushion layer 1130. In an embodiment, the cushion layer 1130 may be disposed on the rigid part 1111 of the support plate 1110. However, the present invention is not limited thereto, and the cushion layer 1130 may be disposed on the rigid part 1111 and the first flexible part **1112*a*. For example, the cushion layer 1130 may be in contact with the support plate 1110 under the first region p1**.

Referring to the embodiment of FIG. 11B, the fifth protection layer **1170*a* may be disposed between the support plate 1110 and the adhesive layer 1171**.

According to an embodiment, the support plate 1110 may include the rigid part 1111, the first flexible part **1112*a*, and the second flexible part 1112. The support plate 1110 may further include the extension part 1113 connecting the first flexible part 1112*a* and the rigid part 1111**.

According to an embodiment, the fifth protection layer **1170*a* may be in contact with the extension part 1113 of the support plate 1110. For example, the fifth protection layer 1170*a* may be in contact with a side surface (e.g., the side surface facing the fifth protection layer 1170*a* of the rigid portion 1111 of the support plate 1110) of the rigid part 1111 of the support plate 1110. The fifth protection layer 1170*a* may have a step part in a region in contact with the side surface of the rigid part 1111. The fifth protection layer 1170*a* may include thermoplastic polyurethane (TPU), PET, PI, or a combination of them. The fifth protection layer 1170*a* may be integrally formed with the support plate 1110. For example, the fifth protection layer 1170*a* and the support plate 1110** may be formed by double injection.

According to an embodiment, the fifth protection layer **1170*a* may fill openings or spaced spaces formed in a substantially parallel direction from a boundary forming the second flexible part 1112*b* of the support plate 1110. For example, the fifth protection layer 1170*a* may protrude from a surface in contact with the second flexible part 1112*b* toward openings of the second flexible part 1112*b***.

According to an embodiment, the boundary between the first flexible part 1112*a* and the second flexible part 1112*b* is expressed as being disposed at a boundary between the second region p2 and the third region p3, but is not limited thereto. The boundary between the first flexible part 1112*a* and the second flexible part 1112*b* may be disposed under the first region p1 or under the third region p3.

A part of the support plate 1110 may be in contact with the cushion layer 1130. In an embodiment, the cushion layer 1130 may be disposed on the rigid part 1111 of the support plate 1110. However, the present invention is not limited thereto, and the cushion layer 1130 may be disposed on the rigid portion 1111 and the first flexible portion 1112*a*. For example, the cushion layer 1130 may be in contact with the support plate 1110 under the first region p1.

Referring to the embodiment of FIG. 11C, the support plate 1110 may include the rigid part 1111, the first flexible part 1112*a*, and the second flexible part 1112. The support plate 1110 may further include the extension part 1113 connecting the first flexible part 1112*a* and the rigid part 1111. The rigid part 1111 may be in contact with the first protection layer 680 through the adhesive layer 1171. The second flexible part 1112 may be in contact with the fifth protection layer 1170*b*. According to an embodiment, the fifth protection layer 1170*b* may be in contact with the extension part 1113 of the support plate 1110. For example, the fifth protection layer 1170*b* may be in contact with a side surface facing the fifth protection layer 1170*b* of the rigid part 1111 of the support plate 1110. The fifth protection layer 1170*b* may include thermoplastic polyurethane (TPU), PET, PI, or a combination thereof. The fifth protection layer 1170*b* may be integrally formed with the support plate 1110. The fifth protection layer 1170*a* may fill openings or spaced spaces formed in a substantially parallel direction from a boundary forming the second flexible part 1112*b* of the support plate 1110. According to an embodiment, the fifth protection layer 1170*b* may be integrally formed with the support plate 1110.

According to an embodiment, the fifth protection layer 1170*b* may be surrounded by the adhesive layer 1171, the side surface of the rigid part 1111 of the support plate 1110, the first flexible part 1112*a*, and the second flexible part 1112*b*. For example, one surface of the fifth protection layer 1170*b* may be in contact with the adhesive layer 1171. Another surface facing the one surface of the fifth protection layer 1170*b* may be in contact with the second flexible part 1112*b*.

According to an embodiment, the boundary between the first flexible part 1112*a* and the second flexible part 1112*b* is expressed as being disposed at the boundary between the second region p2 and the third region p3, but is not limited thereto. The boundary between the first flexible part 1112*a* and the second flexible part 1112*b* may be disposed under the first region p1 or under the third region p3.

A part of the support plate 1110 may be in contact with the cushion layer 1130. In an embodiment, the cushion layer 1130 may be disposed on the rigid part 1111 of the support plate 1110. However, the present invention is not limited thereto, and the cushion layer 1130 may be disposed on the rigid portion 1111 and the first flexible portion 1112*a*. For example, the cushion layer 1130 may be in contact with the support plate 1110 under the first region p1.

According to the above-described embodiment, the display 1100 may provide an integrated support plate 1110. Since the integral support plate 1110 has no boundary of the support plate, it is possible to reduce the viewing of the boundary region outside the display 1100. The thickness of the flexible part 1112 disposed under the second region p2 may be thicker by bending the support plate 1110 through the extension part 1113. Damage to the display panel 601 may be prevented by the thickened flexible portion 1112.

According to an embodiment, the integrated support plate 1110 may be manufactured as a single component, thereby reducing the number of components. Due to the reduced number of components, the tact time of the manufacturing process of the display may be reduced.

Figure 12A:
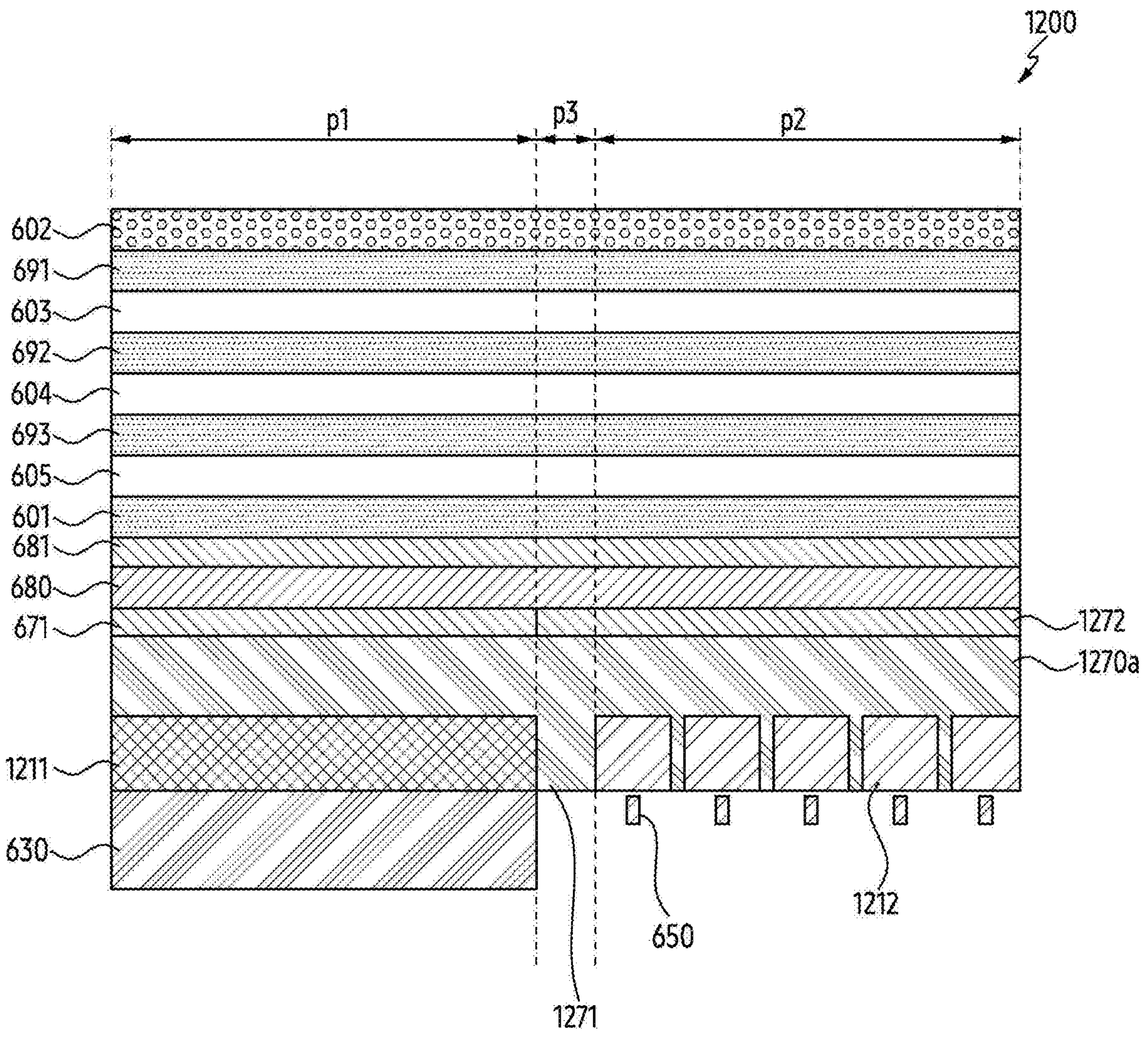
FIG. 12A illustrates an example of a display including a third protection layer disposed on separated support plates.
Figure 12B:
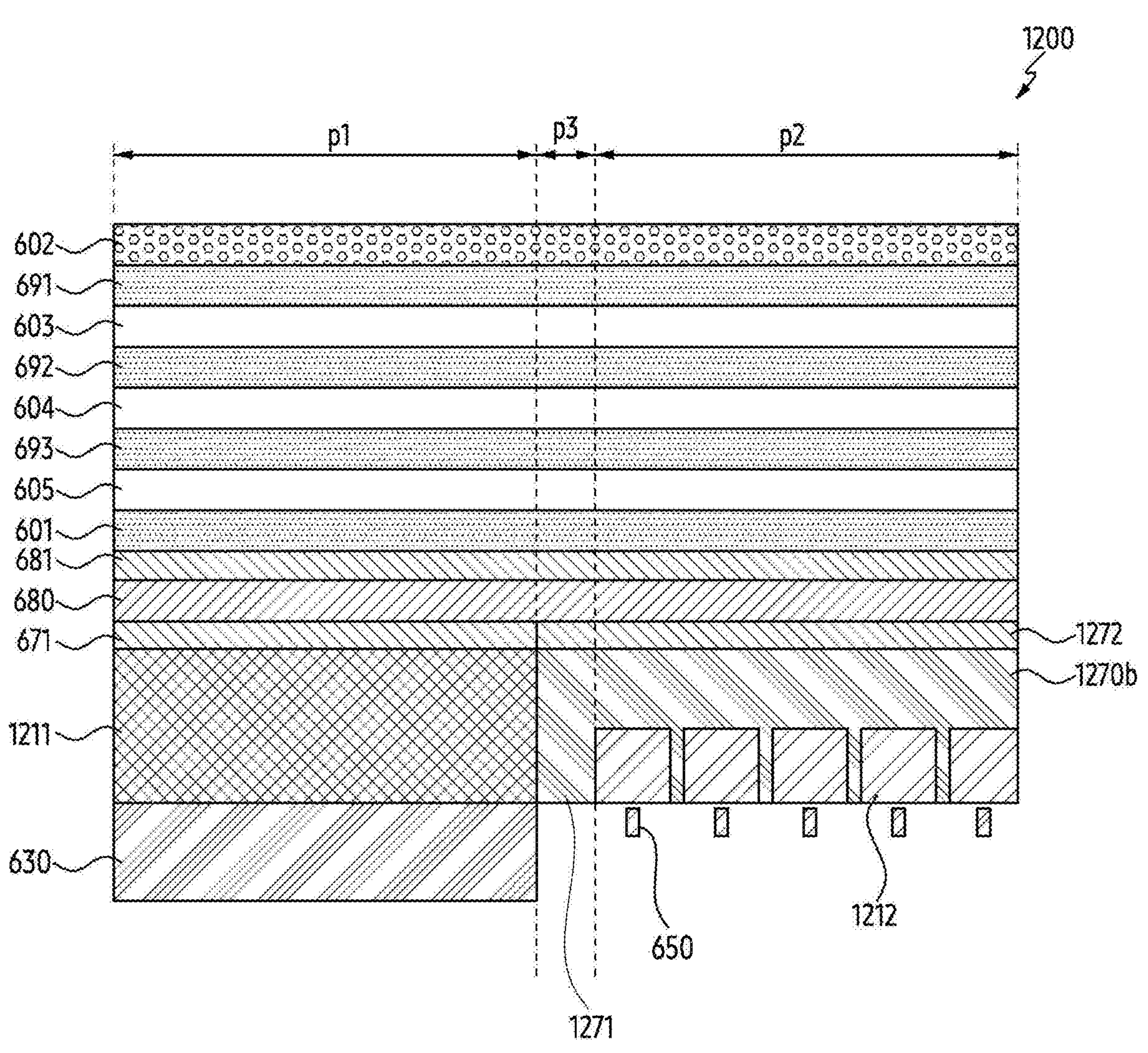
FIG. 12B illustrates an example of a display including a third protection layer disposed on the second support plate from among the separated support plates.
Figure 12C:
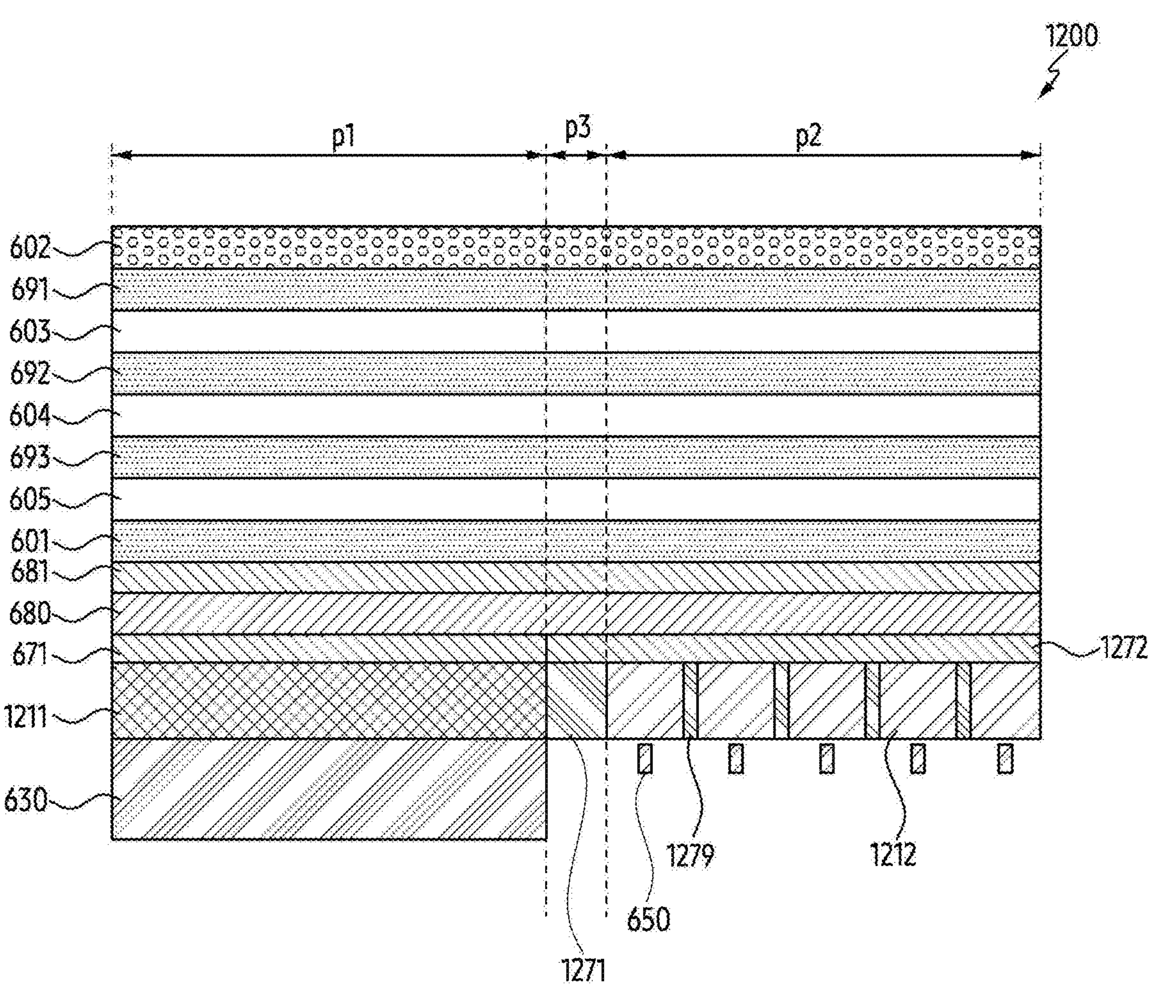
FIG. 12C illustrates an example of a display including a protective member disposed between the separated support plates.

FIG. 12A illustrates an example of a display including a third protection layer disposed on separated support plates. FIG. 12B illustrates an example of a display including a third protection layer disposed on the second support plate from among the separated support plates. FIG. 12C illustrates an example of a display including a protective member disposed between the separated support plates. The embodiments of FIGS. 12A to 12C, i.e. the specifically disclosed arrangement of layers, may be combined with any of the aforedescribed embodiments unless such combination is not contradictory.

Referring to the embodiment of FIG. 12A, a display 1200 may include a display panel 601, a window 692, and a first protection layer 680.

The configurations of the display panel 601, the window 692, the first layer 691, the second layer 693, the adhesive layers 603, 604, 605, the cushion layer 630, the support bar 650, and the first protection layer 680 may be similar to those included in the displays 330, 700, 800, 900, 1000, and 1100 of FIGS. 6A to 11C. A description of the same or similar configuration as described in FIGS. 6A to 11C will be omitted.

According to an embodiment, the window 692 may be disposed on one surface of the display panel 601 facing the outside of the electronic device (e.g., the electronic device 300 of FIG. 3A) to protect the display panel 601 and transmit light emitted from the display panel 601 to the outside to provide visual information. The display 1100 may further include the coating layer 602, the first layer 691, the window 692, the second layer 693, and adhesive layers 603, 604, and 605 disposed between the window 692 and the second layers 693.

According to an embodiment, the sixth protection layer 1270*a* may be integrally formed with the first support plate 1211 and the second support plate 1212. The sixth protection layer 1270*a* may include thermoplastic polyurethane (TPU), PET, PI, or a combination thereof.

According to an embodiment, the first support plate 1211 may support a plurality of layers disposed under the first region p1. The second support plate 1212 may support a plurality of layers disposed under the second region p2. According to an embodiment, the first support plate 1211 and the second support plate 1212 may be structures separated from each other. The first support plate 1211 may be formed of a material having rigidity to support the display 1200 or the first region p1 of the display panel 601.

The second support plate 1212 may include openings or spaced spaces formed in a direction substantially parallel to a boundary between the first region p1 and the second region p2. As another example, the second support plate 1212 may include, instead of an opening, a recess formed in a direction substantially parallel to the boundary. As still another example, the second support plate 1212 may include the mixed recess and the opening. The second support plate 1212 may be formed to be divided from each other by the openings or the spaced spaces. The openings of the second support plate 1212 may be connected to be deformable based on the state of the electronic device 300. For example, the divided parts of the second support plate 1212 may be linked to each other, such as chain coupling or hinge coupling. The divided parts of the second support plate 1212 may be deformed according to the state of the electronic device 300 to guide the shape of the second region p2.

According to an embodiment, the sixth protection layer 1270*a* may be disposed between the first support plate 1211 and the second protection layer 671 under the first region p1. The sixth protection layer 1270*a* may be disposed between the second support plate 1212 and the adhesive layer 1272 under the second region p2. The adhesive layer 1272 may extend to the side surface of the second protection layer 671. For example, the adhesive layer 1272 may be disposed under the second region p2 on the sixth protection layer 1270*a*, and may extend from the third region p3 to the side surface of the second protection layer 671 along the sixth protection layer 1270*a*. The sixth protection layer 1270*a* may include a protrusion 1271 filling a spaced space between the first support plate 1211 and the second support plate 1212. The protrusion 1271 may be disposed under the third region p3 that is a boundary region of the first region p1 and the second region p2.

According to an embodiment, the first support plate 1211, the second support plate 1212, and the sixth protection layer 1270*a* may be integrally formed. The first support plate 1211, the second support plate 1212, and the sixth protection layer 1270*a* may be formed by double injection. The sixth protection layer 1270*a* may fill a space between the first support plate 1211 and the second support plate 1212 and openings (or recesses) of the second support plate 1212.

Referring to the embodiment of FIG. 12B, a thickness of the first support plate 1211 may be different from a thickness of the second support plate 1212. The thickness of the first support plate 1211 may be greater than the thickness of the second support plate 1212. The first support plate 1211 may be in contact with the second protection layer 671.

According to an embodiment, the seventh protection layer 1270*b* may be disposed on the second support plate 1212. The seventh protection layer 1270*b* may be in contact with a part of the side surface of the first support plate 1211. A part of a side surface of the first support plate 1211 positioned higher than the second support plate 1212 may be in contact with the seventh protection layer 1270*b*.

According to an embodiment, when the first support plate 1211 and the second support plate 1212 have different thicknesses, the seventh protection layer 1270*b* may be disposed on the second support plate 1212. The seventh protection layer 1270*b* disposed under the second region p2 may reduce damage to the display panel 601 by the second support plate 1212 when the state of the electronic device 300 is changed.

Referring to the embodiment of FIG. 12C, when compared with FIG. 12A, the display 1200 may have only a protrusion 1271 and the protection layer 1270*a* or 1270*b* disposed on the second support plate may be removed. According to an embodiment, the first support plate 1211 may be in contact with the second protection layer 671. According to an embodiment, the second support plate 1212 may be in contact with the adhesive layer 1272.

According to an embodiment, the protrusion 1271 may be disposed between the second support plate 1212 and the first support plate 1211 under the third region p3. A polymer part 1279 including a polymer formed of the same or similar material as the protrusion part 1271 may be included in a recess or opening formed in the second support plate 1212.

According to an embodiment, in FIGS. 12A, 12B, and 12C, the cushion layer 630 may be disposed on the first support plate 1211. The cushion layer 630 may be disposed in contact with at least a part of the first support plate 1211 under the first region p1 to prevent damage to the display panel 601 of the display 1200 by preventing an impact from being transmitted to the first support plate 1211.

According to an embodiment, in FIGS. 12A, 12B, and 12C, a space (e.g., a space filled with the protrusion 1271) between the first support plate 1211 and the second support plate 1212 is shown to be disposed under the third region p3, but is not limited thereto. For example, a space between the first support plate 1211 and the second support plate 1212 may be disposed under the first region p1.

According to an embodiment, in FIGS. 12A and 12B, since an attachment using a separate fastening part (e.g., fastening part 620 in FIG. 6A) for connecting the first support plate 1211 and the second support plate 1212 is not required by integrally forming the first support plate 1211, the second support plate 1212, and the sixth protection layer 1270*a* or the seventh protection layer 1270*b*, the thickness of the display 1200 may be reduced.

In FIG. 12C, since an attachment using a fastening part for connection between the first support plate 1211 and the second support plate 1212 may be reduced by integrally forming the first support plate 1211, the second support plate 1212, the protrusion 1271, and the polymer portion 1279, the overall thickness of the display 1200 may be reduced.

Figure 13A:
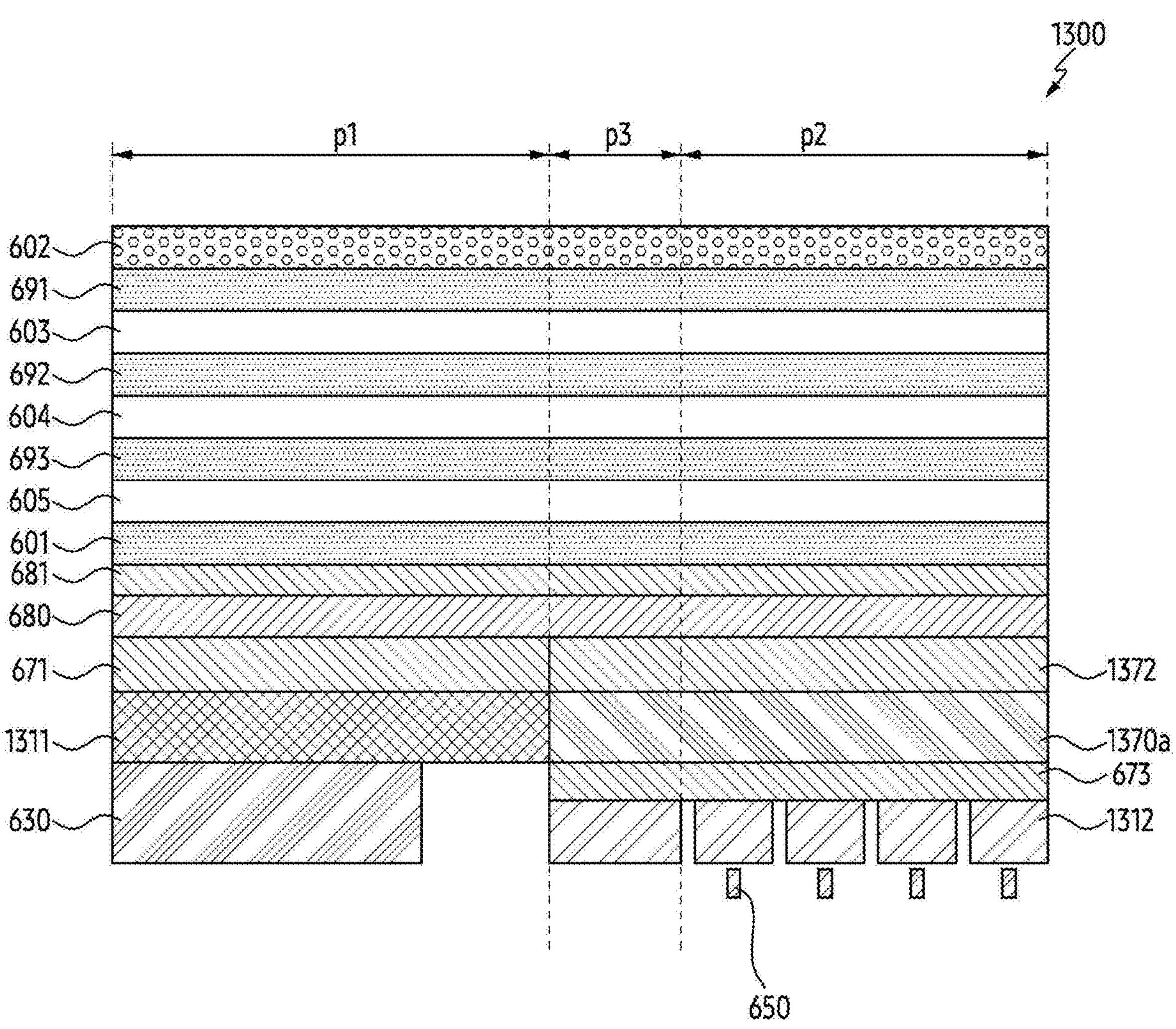
FIG. 13A illustrates a structure in which the boundaries of the first support plate and the second support plate are aligned in a display including separated support plates.
Figure 13B:
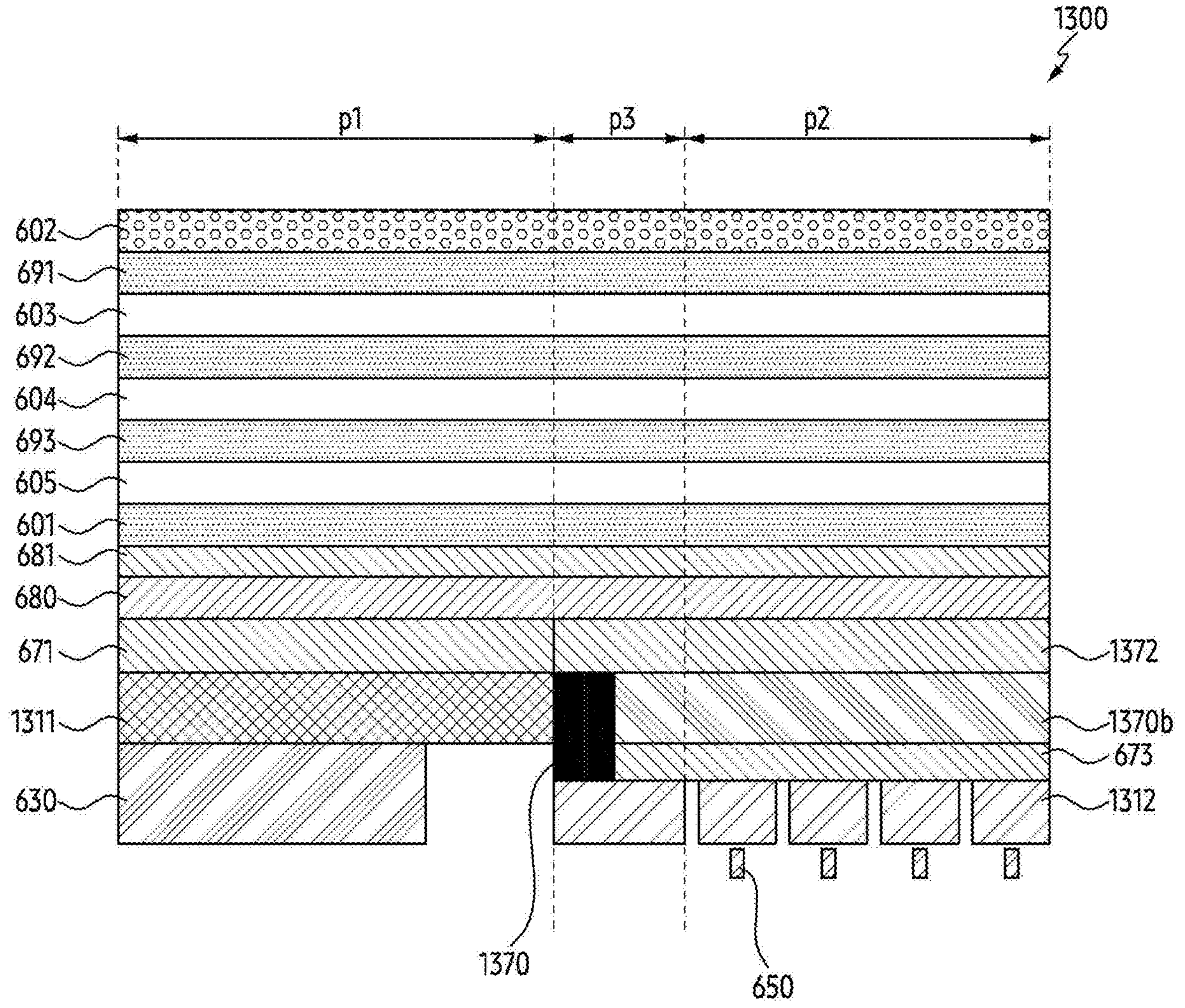
FIG. 13B illustrates an example of a display including a buffer member disposed between the support plates in a display including the separated support plates.

FIG. 13A illustrates a structure in which the boundaries of the first support plate and the second support plate are aligned in a display including separated support plates. FIG. 13B illustrates an example of a display including a buffer member disposed between the support plates in a display including the separated support plates. The embodiments of FIGS. 13A and 13B, i.e. the specifically disclosed arrangement of layers, may be combined with any of the aforedescribed embodiments unless such combination is not contradictory.

Referring to the embodiment of FIG. 13A, a display 1300 may include a display panel 601, a window 692, and a first protection layer 680.

The configurations of the display panel 601, the window 692, the first layer 691, the second layer 693, the adhesive layers 603, 604, 605, the first protection layer 680, the cushion layer 630, and the second protection layer 671 may be similar to those included in the displays 330, 700, 800, 900, 1000, 1100, 1200 of FIGS. 6A to 12C. A description of the same or similar configuration as described in FIGS. 6A to 12C will be omitted.

According to an embodiment, the window 692 may be disposed on one surface of the display panel 601 facing the outside of the electronic device (e.g., the electronic device 300 of FIG. 3A) to protect the display panel 601 and transmit light emitted from the display panel 601 to the outside to provide visual information. The display 1300 may further include the coating layer 602, the first layer 691, the window 692, and adhesive layers 603, 604, and 605 disposed between the window 692 and the second layers 693.

According to an embodiment, the third protection layer 1370*a* may be disposed on the second support plate 1312. The third protection layer 1370*a* may include thermoplastic polyurethane (TPU), PET, PI, or a combination thereof. The third protection layer 1370*a* may prevent the display panel 601 from being damaged due to the deformation of the electronic device when the state of the electronic device is changed. The third protection layer 1370*a* may be attached through each of the first protection layer 680 and the second support plate 1312 and adhesive layers 1372 and 673.

According to an embodiment, the first support plate 1311 may support a plurality of layers disposed under the first region p1. The second support plate 1312 may support a plurality of layers disposed under the second region p2 and the third region p3. According to an embodiment, the first support plate 1311 and the second support plate 1312 may be structures separated from each other. The first support plate 1311 may be formed of a material having rigidity to support the display 1300 or the first region p1 of the display panel 601.

The second support plate 1312 may include openings or spaced spaces formed in a direction substantially parallel to a boundary between the first region p1 and the second region p2. For another example, the second support plate 1312 may include a recess formed in a direction substantially parallel to the boundary, instead of an opening. As still another example, the second support plate 1312 may include the mixed recess and the opening. The second support plate 1312 may be formed to be divided by the openings or spaced spaces. The openings of the second support plate 1312 may be connected to be deformable based on the state of the electronic device 300. For example, the divided parts of the second support plate 1312 may be linked to each other, such as chain coupling or hinge coupling. The divided parts of the second support plate 1312 may be deformed according to the state of the electronic device 300 to guide the shape of the second region p2.

According to an embodiment, the adhesive layer 1372 may be in contact with the side surface of the second protection layer 671. The adhesive layer 1372 may extend to a side surface of the second protection layer 671 under the second region p2 and the third region p3 on the third protection layer 1370*a*. The second protection layer 671 may include an adhesive member. The adhesive member of the second protection layer 671 may have different properties, such as adhesive force or elastic modulus, of the adhesive layer 1372.

According to an embodiment, the third protection layer 1370*a* may include a colored material in order to improve a visibility according to a difference in reflectivity between the first support plate 1311 and the third protection layer 1370*a*. The color of the third protection layer 1370*a* may be a color similar to that of the first support plate 1311, or a color having a similar reflectivity. An opaque layer may be laminated, or an opaque coating liquid may be applied to the third protection layer 1370*a*.

According to an embodiment, the boundary between the first support plate 1311 and the second support plate 1312 is shown to be disposed at the boundary between the first region p1 and the third region p3, but is not limited thereto. For example, a boundary between the first support plate 1311 and the second support plate 1312 may be disposed under the first region p1 or the third region p3.

Referring to the embodiment of FIG. 13B, the first support plate 1311 and the third protection layer 1370*b* may be spaced apart from each other. A resin 1370 may be disposed in a space between the third protection layer 1370*b* and the first support plate 1311. The resin 1370 may fill a space between the third protection layer 1370*b* and the first support plate 1311. The resin 1370 may have a color similar to the color of the first support plate 1311 and the third protection layer 1370*b*, or may have a similar reflectivity. The resin 1370 having a reflectivity similar to that of the first support plate 1311 and the third protection layer 1370*a* may prevent the boundary between the first support plate 1311 and the second support plate 1312 under the third region p3 from being recognized from the outside.

According to an embodiment, the resin 1370 between the first support plate 1311 and the second support plate 1312 is shown to be disposed at a boundary of the third region p3, but is not limited thereto. For example, the resin 1370 may be disposed under the first region p1.

According to an embodiment, in FIGS. 13A and 13B, the cushion layer 630 may be disposed on the first support plate 1311. The cushion layer 630 may be disposed in contact with at least a part of the first support plate 1311 under the first region p1. The cushion layer 630 may prevent the impact from being transmitted to the first support plate 1311, thereby preventing damage to the display panel 601 of the display 1300.

According to the above-described embodiment, the display 1300 of FIG. 13A may match the boundary between the first support plate 1311 and the second support plate 1312, thereby reducing recognition of a step part by the boundary from the outside. The display 1300 of FIG. 13B may reduce the possibility of a step between the first support plate 1311 and the second support plate 1312 by disposing the resin 1370 between the first support plate 1311 and the second support plate 1312. The resin 1370 may prevent a boundary between the first support plate 1311 and the second support plate 1312 from being recognized from the outside by using a material having similar characteristics to the optical characteristics of the first support plate 1311 and the second support plate 1312.

According to the above-described embodiment, a flexible display device (e.g., the display 330 in FIG. 3) may include a display panel (e.g., the display panel 601 of FIG. 6A) including a planar region (e.g., the first region p1 of FIG. 6A), a deformable region (e.g., the second region p2 of FIG. 6A) and a boundary region (e.g., the third region p3 of FIG. 6A) between the planar region and the deformable region. The flexible display device may further include a window (e.g., the window 692 of FIG. 6A) disposed on a surface of the display panel. The flexible display device may further include a supporter (e.g., the supporter 610 of FIG. 6A) under the display panel 601 including a first support plate (e.g., the first support plate 611 of FIG. 6A) facing the planar region and a part of the boundary region and a second support plate (e.g., the second support plate 612 of FIG. 6A) facing. the boundary region and the deformable region and a fastening part (e.g., the fastening part 620 of FIG. 6A) connecting a part of the first support plate and a part of the second support plate. The flexible display device may further include at least one protection layer (e.g., the first protection layer 680 of FIG. 6A, the second protection layer 671 or the third protection layer 670) between the supporter and the display panel and including a gap under the boundary region. According to an embodiment, the at least one protection layer may include a first protection layer (e.g., the first protection layer 680 of FIG. 6A), a second protection layer (e.g., the second protection layer 671 of FIG. 6A) supporting the planar region and the part of the boundary region, a third protection layer (e.g., the third protection layer 670 of FIG. 6A) supporting the deformable region and another part of the boundary region. The second support plate may covers the gap g by including an extension region 612A attached to the fastening part 620 for the connection between the part of the first support plate 611 and the second support plate 612, and a support region (612B), extending from a part of the extension region 612A that is located under the gap g.

According to an embodiment, the second protection layer may be disposed between the first protection layer and the first support plate. The second protection layer may be located under a part of the boundary region and the planar region.

According to an embodiment, the third protection layer may be coupled to the first protection layer and the second support plate. The third protection layer may be positioned under a reminder part of the boundary region and the deformable region.

According to an embodiment, a boundary of the second protection layer and a boundary of the first support plate may be corresponding to a part of a periphery of the gap. According to an embodiment, a boundary of the third protection layer may be corresponding to a remainder part of the periphery of the gap.

According to an embodiment, the fastening part may include an adhesive member disposed between the extension region and a part of the first support plate under the part of the boundary region.

According to an embodiment, the first support plate may include a recess accommodating the fastening part under the part of the boundary region.

According to an embodiment, the second support plate may include a recess accommodating the fastening part under the part of the boundary region.

According to an embodiment, the second support plate may bent form the deformable region and extend to the planar region. The extension region of the second support plate may overlap a part of the support plate under the boundary region.

According to an embodiment, the first support plate may extend in a direction toward which another surface of the display panel faces under the boundary region, and be bent toward the deformable region. According to an embodiment, the first support plate may overlap a part of the support plate in the boundary region.

According to an embodiment, the fastening part may include a material of the first support plate and a material of the second support plate.

According to an embodiment, a periphery of the first support plate overlapping the second support plate and a periphery of the second support plate overlapping the first support plate may be chamfered or rounded.

According to an embodiment, a distance from the other surface of the display panel to the first support plate may be closer than a distance from the other surface of the display panel to the second support plate.

According to an embodiment, the flexible display device may further include an adhesive layer disposed between the first protection layer and the third protection layer and in contact with a side surface of the second protection layer.

According to an embodiment, the third protection layer may be extended between the second protection layer and the first support plate.

According to an embodiment, the flexible display device may further include a cushion layer supporting the first support plate. According to an embodiment, the third protection layer may be extended between the cushion layer and the first support plate.

According to an embodiment, the cushion layer may support the second support plate in the boundary region.

According to the above-described embodiment, an electronic device (e.g., the electronic device 300 of FIG. 3A) may include a first housing (e.g., the first housing 310 of FIG. 3A), a second housing (e.g., the second housing 320 of FIG. 3A) coupled to the first housing to be slidable in a first direction with respect to the first housing or in a second direction opposite to the first direction, and a display (e.g., the display 330 of FIG. 3A) coupled to the second housing, the display expanding as the second housing moves in the first direction, or contracting as the second housing moves in the second direction. According to an embodiment, the display may include a display panel (e.g., the display panel 601 of FIG. 6A) including a planar region (e.g., the first region p1 of FIG. 6A), a deformable region (e.g., the second region p2 of FIG. 6A), and a boundary region (e.g., the third region p3 of FIG. 6A) disposed between the planar region and the deformable region. The display may include a window (e.g., the window 692 of FIG. 6A) disposed on a surface of the display panel. The display may include at least one protection layer (e.g., the first protection layer 680 of FIG. 6A, the second protection layer 671, or the third protection layer 670) disposed between the supporter and the display panel and including a gap in a region corresponding to the boundary region. The display may include a supporter (e.g., supporter 610 of FIG. 6A) including a first support plate (e.g., the first support plate 611 of FIG. 6A) facing another surface of the display panel under the planar region and the boundary region and a second support plate (e.g., the second support plate 612 of FIG. 6A) facing the another surface of the display panel in the boundary region and the deformable region and including an opening or a recess, and a fastening part (e.g., the fastening part 620 of FIG. 6A) connecting at least part of the first support plate and at least part of the second support plate. According to an embodiment, the second plate may include an extension region extending from the deformable region to the boundary region. According to an embodiment, when the display panel is viewed from above, the extension region may overlap with a part of the first support plate, the gap and the fastening part.

According to an embodiment, the planar region may be a region exposed to outside of the electronic device in a first state in which the second housing is movable in the first direction among the first direction and the second direction. The deformable region may be covered by the second housing in the first state, and exposed to outside of the electronic device in a second state in which the second housing is movable in the second direction among the first direction and the second direction.

According to an embodiment, the at least one protection layer may include a first protection layer (e.g., the first protection layer 680 of FIG. 6A) supporting the display panel, a second protection layer (e.g., a second protection layer 671 of FIG. 6A) facing a portion of the planar region of the display, and a third protection layer (e.g., a third protection layer 670 of FIG. 6A) spaced apart from the second protection layer and supporting the defensible region of the display.

According to an embodiment, the third protection layer may be in contact with the first protection layer in a partial region of the deformable region and the planar region in contact with the deformable region. According to an embodiment, the second protection layer may be disposed between the first protection layer and the first support plate under the planar region and the part of the boundary region in contact with the planar region.

According to an embodiment, the third protection layer may be disposed between the first protection layer and the second support plate under the deformable region and the remainder part of the boundary region in contact with the deformable region.

According to an embodiment, the fastening part may include an adhesive member disposed between at least a part of the first support plate and at least a part of the second support plate.

According to an embodiment, the fastening part may include a material of the first support plate and a material of the second support plate.

According to an embodiment, the first support plate may include a recess accommodating the fastening part in a region overlapping the extension region of the second support plate when the display panel is viewed from above.

According to an embodiment, the second support plate may include a recess accommodating the fastening part in the extension region overlapping the first support plate, when the display panel is viewed from above.

According to an embodiment, the extension region of the second support plate may be extended in a direction toward which another surface of the display panel faces, be bent toward the planar region, and overlap a part of the second support plate under the boundary region.

According to an embodiment, the first support plate may be extended in a direction toward which the other surface of the display panel faces under the boundary region, be bent toward the deformable region. According to an embodiment, the first support plate may overlap a part of the second support plate under the boundary region.

According to an embodiment, a flexible display device (e.g., the display device 1200 of FIG. 12B) may include a flexible display device may include a display panel (e.g., the display panel 601 of FIG. 12B) including a planar region (e.g., the first region p1 of FIG. 12B), a deformable region (e.g., the second region p2 of FIG. 12B) and a boundary region (e.g., a third region p3 of FIG. 12B) disposed between the planar region and the deformable region; a window (e.g., window 692 of FIG. 12B) disposed on a surface of the display panel; a supporter including a first support plate (e.g., the first support plate 1211 of FIG. 12B) facing another surface of the display panel under the planar region and a second support plate (e.g., the second support plate 1212 of FIG. 12B) facing the another surface of the display panel under the boundary region and the deformable region and including an opening parallel to a boundary between the planar region and the deformable region; and at least one protection layer (e.g., the third protection layer 1270*b* of FIG. 12B) disposed between the second support plate and the display panel and including a color, and wherein the protection layer (e.g., the third protection layer 1270*b* of FIG. 12B) protrudes from a surface of the protection layer into a space between the first support plate and the second support plate.

According to an aspect of the disclosure, a flexible display device is comprising: a display panel including a planar region, a deformable region and a boundary region disposed between the planar region and the deformable region; a window disposed on a surface of the display panel; a supporter including a first support plate facing another surface of the display panel in the planar region and the boundary region and a second support plate facing the another surface of the display panel in the boundary region and the deformable region and including an opening or a recess; at least one protection layer disposed between the supporter and the display panel and including a gap in a region corresponding to the boundary region; and a fastening part connecting a part of the first support plate and a part of the second support plate; wherein the at least one protection layer includes: a first protection layer disposed between the another surface of the display panel and the supporter; a second protection layer supporting the planar region of the display panel and a part of the boundary region; a third protection layer supporting the deformable region of the display panel and a remainder part of the boundary region; wherein the second support plate includes an extension region extended from the deformable region to the boundary region, and wherein, when the display panel is viewed from above, the extension region overlaps with a part of the first support plate, the gap and the fastening part.

According to an aspect of the disclosure, the second protection layer is disposed between the first protection layer and the first support plate under the planar region and the part of the boundary region in contact with the planar region.

According to an aspect of the disclosure, the third protection layer is disposed between the first protection layer and the second support plate under the deformable region and the remainder part of the boundary region in contact with the deformable region.

According to an aspect of the disclosure, a boundary of the second protection layer and a boundary of the first support plate is corresponding to a part of a periphery of the gap, and a boundary of the third protection layer is corresponding to a remainder part of the periphery of the gap.

According to an aspect of the disclosure, the fastening part includes an adhesive member disposed between the extension region and a part of the first support plate overlapping the extension region of the second support plate when the display panel is viewed from above.

According to an aspect of the disclosure, the first support plate includes a recess accommodating the fastening part in a region overlapping the extension region of the second support plate when the display panel is viewed from above.

According to an aspect of the disclosure, the second support plate includes a recess accommodating the fastening part in the extension region overlapping the first support plate, when the display panel is viewed from above.

According to an aspect of the disclosure, the extension region of the second support plate extends in a direction toward which another surface of the display panel faces, is bent toward the planar region, and overlaps a part of the support plate in the boundary region.

According to an aspect of the disclosure, the first support plate extends in a direction toward which the another surface of the display panel faces within the boundary region, is bent toward the deformable region, and overlaps a part of the support plate in the boundary region.

According to an aspect of the disclosure, the fastening part includes a material of the first support plate and a material of the second support plate.

According to an aspect of the disclosure, an edge of the first support plate overlapping the second support plate and an edge of the second support plate overlapping the first support plate are chamfered or rounded.

According to an aspect of the disclosure, a distance from the another surface of the display panel to the first support plate is closer than a distance from the another surface of the display panel to the second support plate.

According to an aspect of the disclosure, the flexible display device is further comprising an adhesive layer disposed between the first protection layer and the third protection layer and in contact with a side surface of the second protection layer.

According to an aspect of the disclosure, the third protection layer extending between the second protection layer and the first support plate.

According to an aspect of the disclosure, the flexible display device is further comprising a cushion layer supporting the first support plate, wherein the third protection layer extending between the cushion layer and the first support plate.

According to an aspect of the disclosure, the cushion layer supporting the second support plate in the boundary region.

The aforedescribed features that specify the flexible display device (also referred to as "display") may be likewise applied to an electronic device comprising such flexible display device/display.

According to an aspect of the disclosure, an electronic device is comprising: a first housing; a second housing coupled to the first housing to be slidable in a first direction with respect to the first housing or in a second direction opposite to the first direction; and a display coupled to the second housing, the display expanding as the second housing moves in the first direction, or contracting as the second housing moves in the second direction, wherein the display includes: a display panel including a planar region, a deformable region and a boundary region disposed between the planar region and the deformable region; a window disposed on a surface of the display panel; a supporter including a first support plate facing another surface of the display panel under the planar region and the boundary region and a second support plate facing the another surface of the display panel in the boundary region and the deformable region and including an opening or a recess; at least one protection layer disposed between the supporter and the display panel and including a gap in a region corresponding to the boundary region; and a fastening part connecting at least part of the first support plate and at least part of the second support plate; wherein the second plate includes an extension region extending from the deformable region to the boundary region, when the display panel is viewed from above, the extension region overlaps with a part of the first support plate, the gap and the fastening part.

According to an aspect of the disclosure, the planar region is a region exposed to outside of the electronic device in a first state in which the second housing is movable in the first direction among the first direction and the second direction, wherein the deformable region is covered by the second housing in the first state, and exposed to outside of the electronic device in a second state in which the second housing is movable in the second direction among the first direction and the second direction.

According to an aspect of the disclosure, the at least one protection layer includes: a first protection layer disposed on another surface of the display panel; a second protection layer supporting the planar region of the display and a part of the boundary region; and a third protection layer supporting the deformable region of the display panel and a remainder part of the boundary region and spaced apart from the second protection layer.

According to an aspect of the disclosure, the second protection layer is disposed between the first protection layer and the first support plate under the planar region and the part of the boundary region in contact with the planar region.

According to an aspect of the disclosure, the third protection layer disposed between the first protection layer and the second support plate under the deformable region and the remainder part of the boundary region in contact with the deformable region.

According to an aspect of the disclosure, the fastening part including an adhesive member disposed between the extension region and a part of the first support plate overlapping the extension region of the second support plate, when the display panel is viewed from above.

According to an aspect of the disclosure, the fastening part includes a material of the first support plate and a material of the second support plate.

According to an aspect of the disclosure, the support plate includes a recess accommodating the fastening part in a region overlapping the extension region of the second support plate when the display panel is viewed from above.

According to an aspect of the disclosure, the second support plate includes a recess accommodating the fastening part in the extension region overlapping the first support plate, when the display panel is viewed from above.

According to an aspect of the disclosure, the extension region of the second support plate extends in a direction toward which another surface of the display panel faces, is bent toward the planar region, and overlaps a part of the first support plate in the boundary region.

According to an aspect of the disclosure, the first support plate extends in a direction toward which the another surface of the display panel faces within the boundary region, is bent toward the deformable region, and overlaps a part of the second support plate in the boundary region.

According to an aspect of the disclosure, a flexible display device is comprising: a display panel including a planar region, a deformable region and a boundary region disposed between the planar region and the deformable region; a window disposed on a surface of the display panel; a supporter including a first support plate facing another surface of the display panel under the planar region and a second support plate facing the another surface of the display panel in the boundary region and the deformable region and including an opening parallel to a boundary between the planar region and the deformable region; and at least one protection layer disposed between the second support plate and the display panel and including a color; wherein the protection layer protrudes from a surface of the protection layer into a space between the first support plate and the second support plate.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. An electronic device comprising:

a first housing and a second housing configured to move with respect to the first housing;

a display panel including:

a first region, a second region configured to be rolled into the first housing in accordance with the second housing moving with respect to the first housing and a third region between the first region and the second region;

a first protection layer disposed under the second region and a first portion of the third region of the display panel, spaced apart from a layer by a gap formed under the third region of the display panel; and a supporter including:

a first support plate disposed under the first region, and a second support plate including a supporting portion and an extension portion, wherein the supporting portion is disposed under the first protection layer and defines a plurality of openings, wherein the extension portion extends from the supporting portion, is disposed under the third region of the display panel, and is attached to the first support plate to cover the gap, and wherein the layer, spaced apart from the first protection layer, corresponds at least one of a second protection layer, disposed under the first region and a second portion of the third region of the display panel, or the first support plate.

2. The electronic device according to claim 1, wherein the first support plate is disposed under the second protection layer in the first region and the second portion of the third region.

3. The electronic device according to claim 1, wherein the second support plate is disposed under the second region and the first portion of the third region.

4. The electronic device according to claim 1, wherein a boundary of the second protection layer and a boundary of the first support plate is corresponding to a part of a periphery of the gap, and wherein a boundary of the first protection layer is corresponding to another part of the periphery of the gap.

5. The electronic device according to claim 1, further comprising:

a coupling part connecting the first support plate and the second support plate, wherein the coupling part includes an adhesive disposed between the extension portion and a part of the first support plate under the third region.

6. The electronic device according to claim 1, further comprising:

a coupling part connecting the first support plate and the second support plate, wherein the first support plate includes a recess accommodating the coupling part under the second portion of the third region.

7. The electronic device according to claim 1, further comprising:

a coupling part connecting the first support plate and the second support plate, wherein the second support plate includes a recess accommodating the coupling part under the first portion of the third region.

8. The electronic device according to claim 1, wherein the extension portion is bent from the second region and extends to the first region, and overlaps a part of the first support plate under the third region.

9. The electronic device according to claim 1, wherein an edge of the first support plate overlapping the second support plate and an edge of the second support plate overlapping the first support plate are chamfered or rounded.

10. The electronic device according to claim 1, wherein a distance from another surface of the display panel to the first support plate is shorter than a distance from the another surface of the display panel to the second support plate.

11. The electronic device according to claim 1, further comprising:

a third protection layer disposed on the second protection layer and the first protection layer; and an adhesive layer disposed between the first protection layer and the third protection layer and in contact with a side surface of the second protection layer.

12. The electronic device according to claim 1, wherein the first protection layer extends between the second protection layer and the first support plate.

13. The electronic device according to claim 1, further comprising:

a cushion layer supporting the first support plate, wherein the first protection layer extends between the cushion layer and the first support plate.

14. The electronic device according to claim 13, wherein the cushion layer supports the second support plate in the third region.

15. The electronic device according to claim 1, further comprising:

a coupling part, between the first support plate) and the second support plate including a material of the first support plate and a material of the second support plate.

16. An electronic device comprising:

a first housing;

a second housing coupled to the first housing to be slidable in a first direction with respect to the first housing or in a second direction opposite to the first direction; and a display coupled to the second housing, the display expanding as the second housing moves in the first direction, or contracting as the second housing moves in the second direction, wherein the display includes:

a display panel including a planar region, a deformable region and a boundary region disposed between the planar region and the deformable region, a supporter under the display panel, including a first support plate facing the planar region and facing a portion of the boundary region, including a second support plate facing at least portion of the boundary region and facing the deformable region and a fastening part connecting the first support plate with the second support plate under the boundary region, and at least one protection layer between the supporter and the display panel and including a gap under the boundary region, wherein the at least one protection layer includes:

a first protection layer, a second protection layer under the first protection layer, supporting the planar region and the portion of the boundary region, and a third protection layer under the first protection layer, supporting the deformable region and another portion of the boundary region, and wherein the second support plate covers the gap by including an extension region attached to the fastening part for the connection between a part of the first support plate and the second support plate, and a support region, extending from a part of the extension region that is located under the gap.

17. The electronic device according to claim 16, wherein the second protection layer is disposed between the first protection layer and the first support plate under the planar region and the portion of the boundary region.

18. The electronic device according to claim 16, wherein the third protection layer is disposed between the first protection layer and the second support plate under the deformable region and the another portion of the boundary region.

19. The electronic device according to claim 16, wherein the fastening part includes an adhesive member disposed between the extension region and a part of the first support plate under the portion of the boundary region.

20. An electronic device comprising:

a first housing and a second housing configured to move with respect to the first housing;

a display panel including:

a first region, a second region configured to be rolled into the first housing in accordance with the second housing moving with respect to the first housing, and a third region between the first region and the second region;

a supporter including:

a first support plate disposed under the first region of the display panel, and a second support plate disposed under the second region of the display panel, the second support plate having a plurality of openings; and at least one protection layer disposed between the second support plate and the display panel and including a color, wherein the at least one protection layer fills the plurality of openings of the second support plate and a gap between the first support plate and the second support plate.

* * * * *